US009612882B2

(12) United States Patent
Resch et al.

(10) Patent No.: US 9,612,882 B2
(45) Date of Patent: Apr. 4, 2017

(54) RETRIEVING MULTI-GENERATIONAL STORED DATA IN A DISPERSED STORAGE NETWORK

(71) Applicant: CLEVERSAFE, INC., Chicago, IL (US)

(72) Inventors: Jason K. Resch, Chicago, IL (US); Greg Dhuse, Chicago, IL (US); Ilya Volvovski, Chicago, IL (US); Wesley Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 14/638,175

(22) Filed: Mar. 4, 2015

(65) Prior Publication Data

US 2015/0319244 A1    Nov. 5, 2015

Related U.S. Application Data

(60) Provisional application No. 61/986,361, filed on Apr. 30, 2014.

(51) Int. Cl.
*G11C 29/00*    (2006.01)
*G06F 9/52*    (2006.01)
(Continued)

(52) U.S. Cl.
CPC ............... *G06F 9/526* (2013.01); *G06F 3/06* (2013.01); *G06F 3/061* (2013.01); *G06F 3/067* (2013.01);
(Continued)

(58) Field of Classification Search
None
See application file for complete search history.

(56) References Cited

U.S. PATENT DOCUMENTS 4,092,732 A    5/1978    Ouchi
5,454,101 A    9/1995    Mackay et al.
(Continued)

OTHER PUBLICATIONS

International Searching Authority; International Search Report and Written Opinion; International Application No. PCT/US15/19161; Jun. 10, 2015; 8 pgs.

(Continued)

*Primary Examiner* — Daniel McMahon
(74) *Attorney, Agent, or Firm* — Garlick & Markison; Timothy W. Markison; Harry S. Tyson, Jr.

(57) ABSTRACT

Methods for use by processing modules in a dispersed storage network (DSN) to retrieve a data object stored in one of a plurality of storage generations of the DSN, each of the storage generations including a plurality of storage units. In various examples, a first retrieval request is generated to retrieve metadata addressing information. Based on the metadata addressing information, a second retrieval request is generated to retrieve the metadata. Using the metadata, a third retrieval request is then generated to retrieve at least a portion of the data object. The metadata addressing information, the metadata, and the data object may be retrieved from differing storage generations. Each of the first, second, and third retrieval requests are formatted in accordance with a read request format of the DSN, the read request format including a storage generation identifier field.

24 Claims, 58 Drawing Sheets

(51) Int. Cl.
  *G06F 3/06* (2006.01)
  *G06F 11/10* (2006.01)
  *H04L 29/08* (2006.01)
(52) U.S. Cl.
  CPC ........ *G06F 3/0659* (2013.01); *G06F 11/1076* (2013.01); *H04L 67/1097* (2013.01); *Y10S 707/99938* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0214011 A1 | 9/2011 | Grube et al. |
| 2011/0261838 A1 | 10/2011 | Baptist et al. |
| 2011/0289565 A1 | 11/2011 | Resch et al. |
| 2012/0166757 A1 | 6/2012 | Volvovski et al. |
| 2013/0013958 A1 | 1/2013 | Leggette |
| 2013/0254624 A1 | 9/2013 | Dhuse et al. |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

distributed computing system 10

| DST allocation info 242 | | | | | | | |
|---|---|---|---|---|---|---|---|
| data partition info 320: data ID; No. of partitions; Addr. info for each partition; format conversion indication | | | | | | | |
| task execution info 322 | | | | intermediate result info 324 | | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

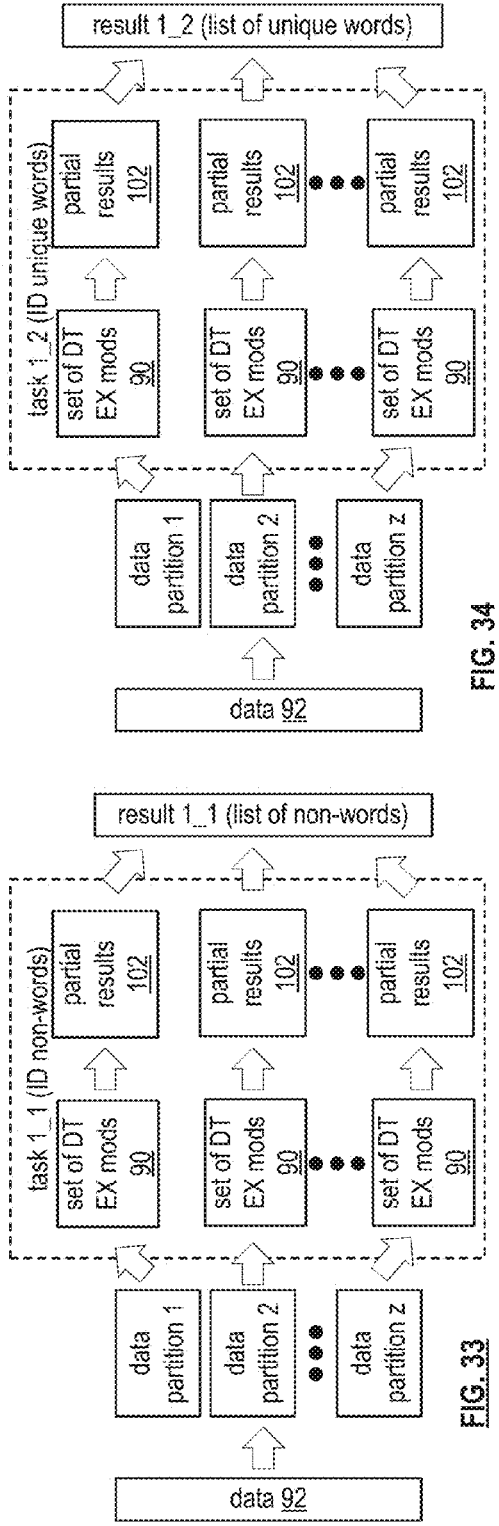
FIG. 33
FIG. 34
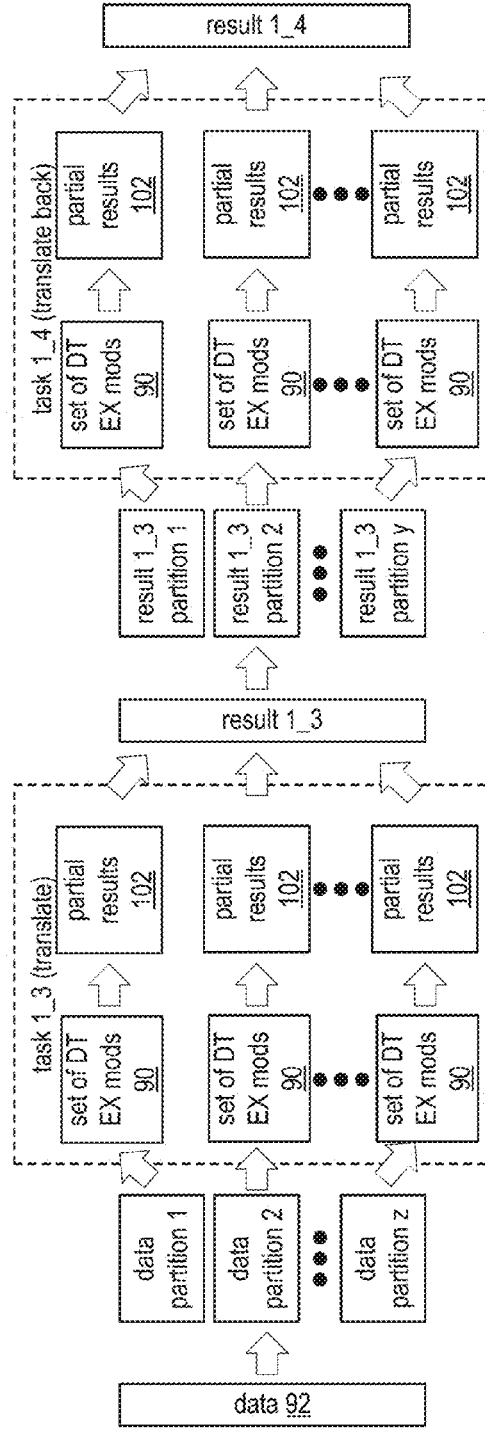
FIG. 35

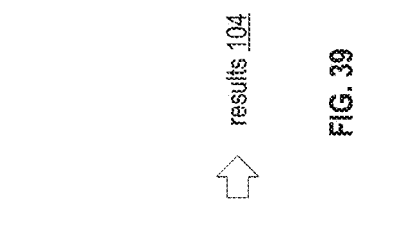
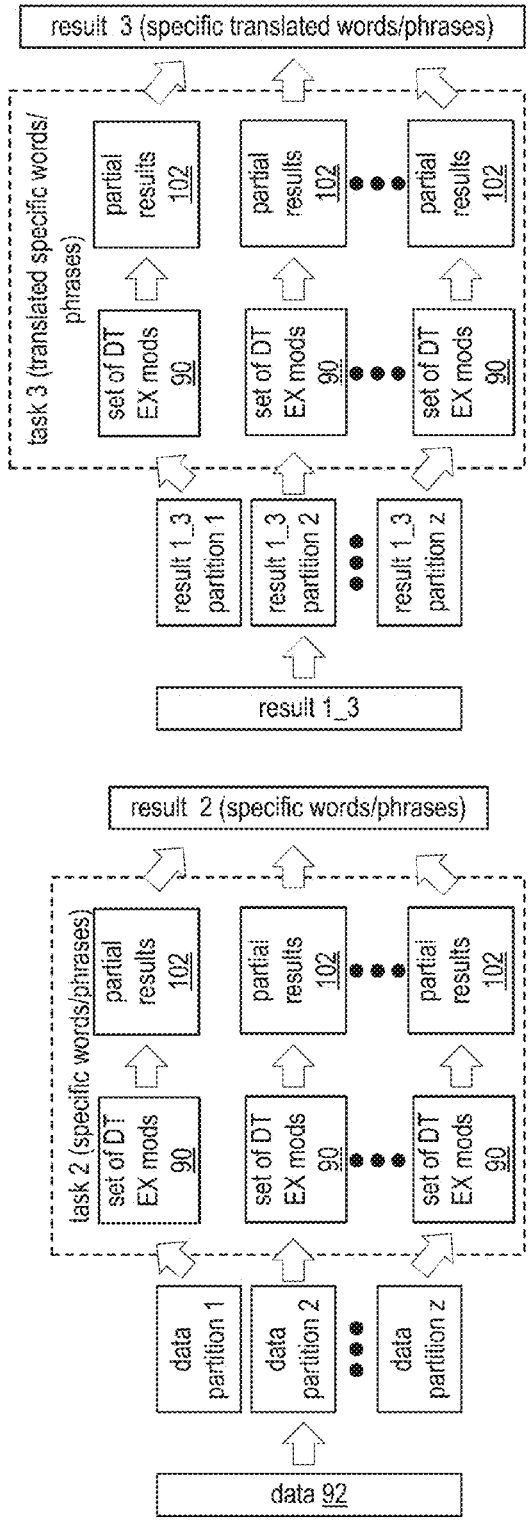
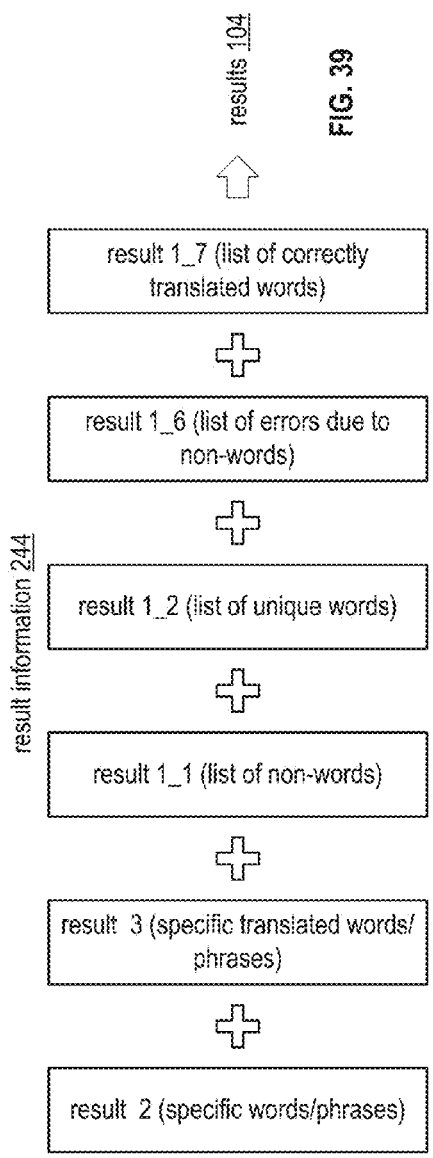

request sequencing 562

| storage unit 568 | lock owner 570 | received order of requests 572 |
|---|---|---|
| 1 | A | A, B, C, D |
| 2 | B | B, A, D, C |
| 3 | C | C, B, D, A |
| 4 | A | A, B, D, C |
| 5 | C | C, B, D, A | lock information 564

| priority order response to A | priority order response to B | priority order response to C | priority order response to D |
|---|---|---|---|
| A | A, B | A, B, C | A, B, C, D |
| B, A | B | B, A, D, C | B, A, D |
| C, B, D, A | C, B | C | C, B, D |
| A | A, B | A, B, D, C | A, B, D |
| C, B, D, A | C, B | C | C, B, D | shaded: successful locks deduced priority 566

| rank: priority order deduced by A | rank: priority order deduced by B | rank: priority order deduced by C | rank: priority order deduced by D |
|---|---|---|---|
| 1: A,C,B,D | 3: A,C,B,D or 3: C,A,B,D | 2: A,C,B,D | 4: A,C,B,D |

FIG. 47C

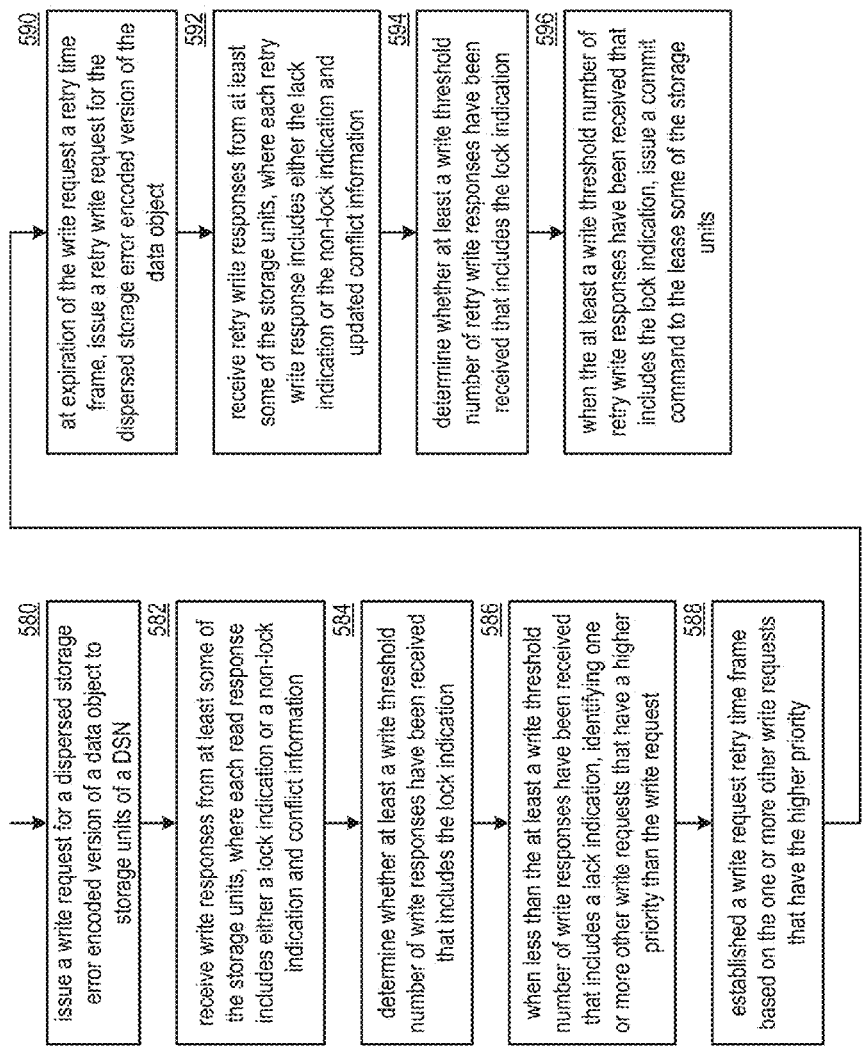

RETRIEVING MULTI-GENERATIONAL STORED DATA IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/986,361, entitled "ACCESSING METADATA IN A DISPERSED STORAGE NETWORK", filed Apr. 30, 2014, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 47C is a table illustrating an example of resolving write request conflicts in accordance with the present invention;

FIG. 47D is a flowchart illustrating an example of resolving write request conflicts in accordance with the present invention;

DETAILED DESCRIPTION OF THE INVENTION

Figure 1:
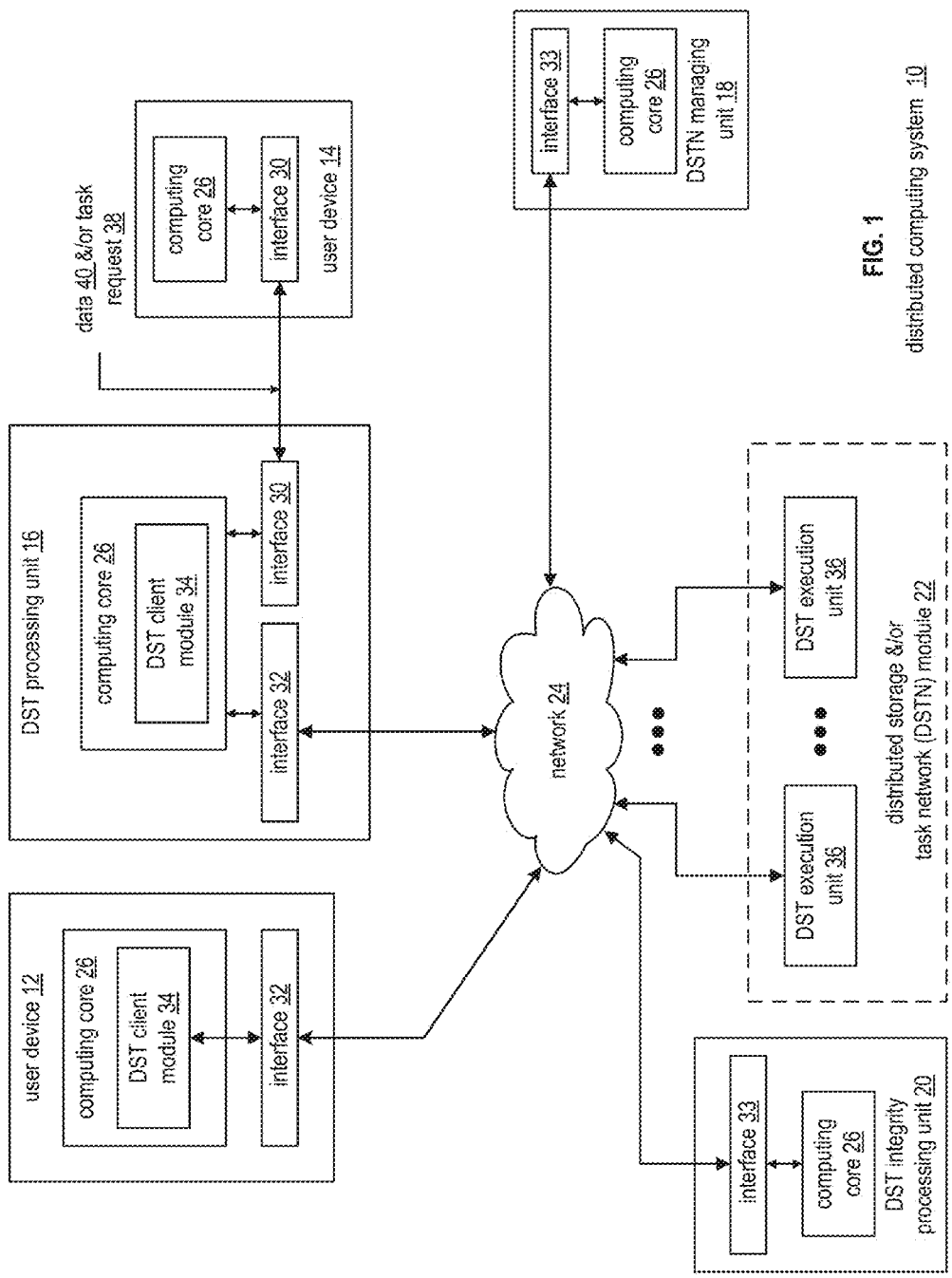
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
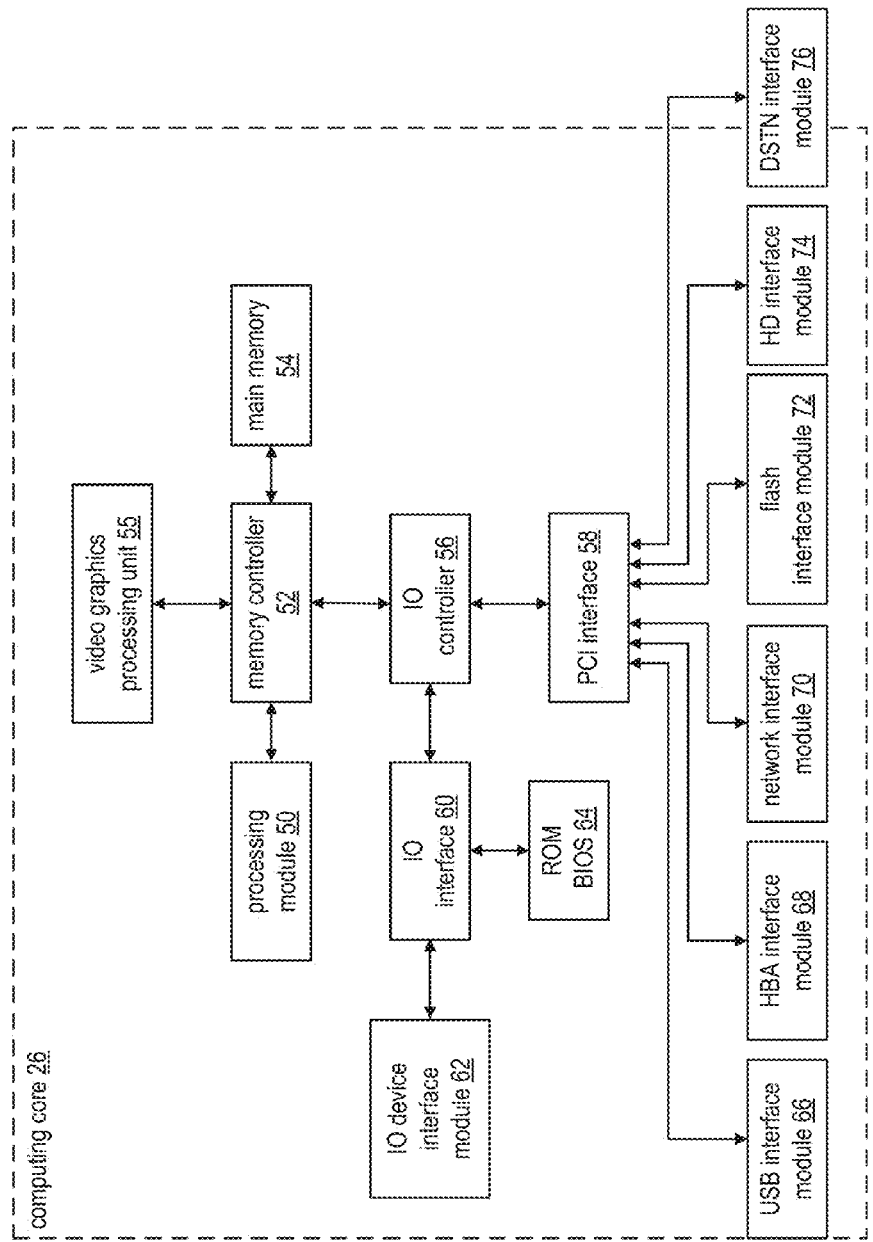
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
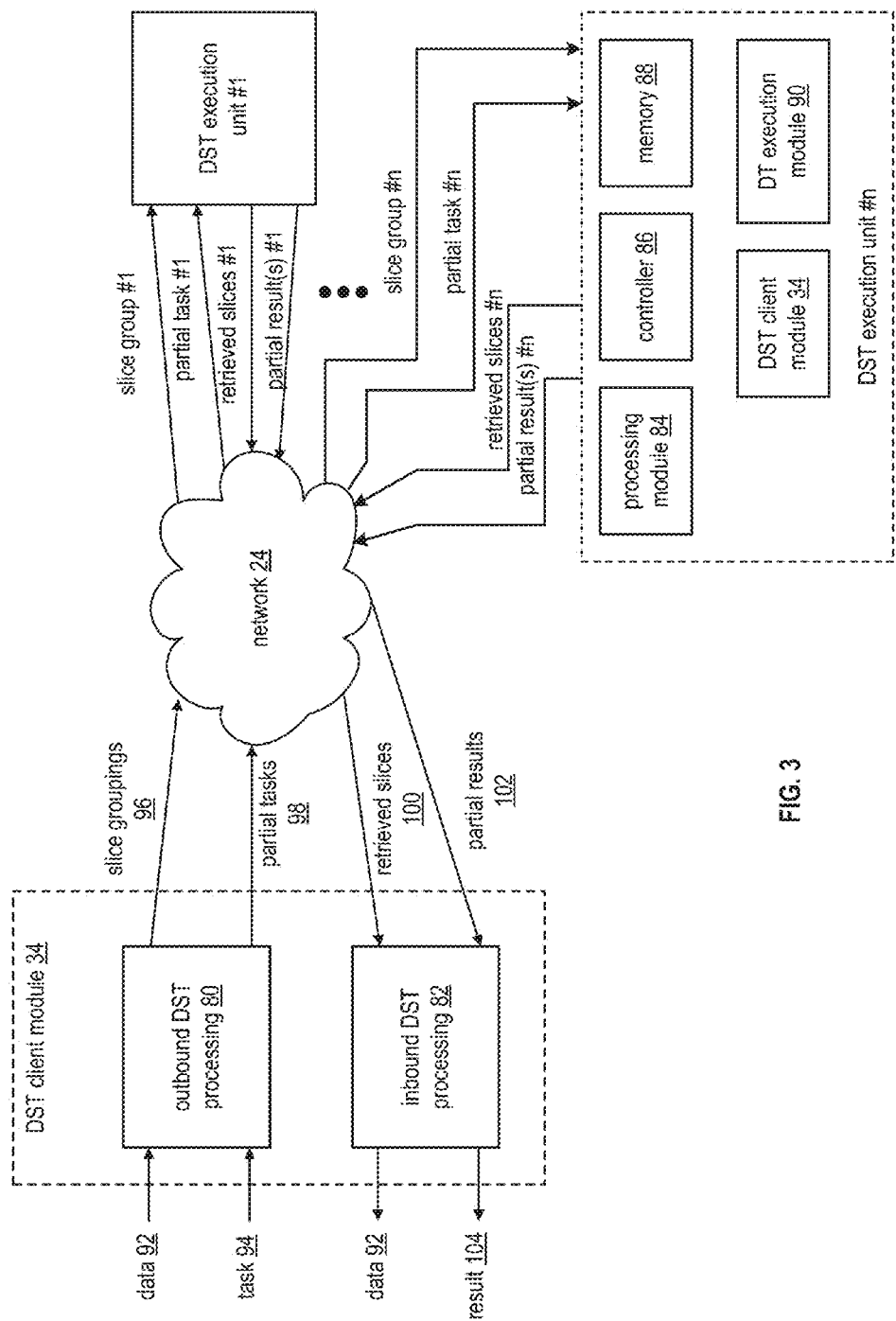
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
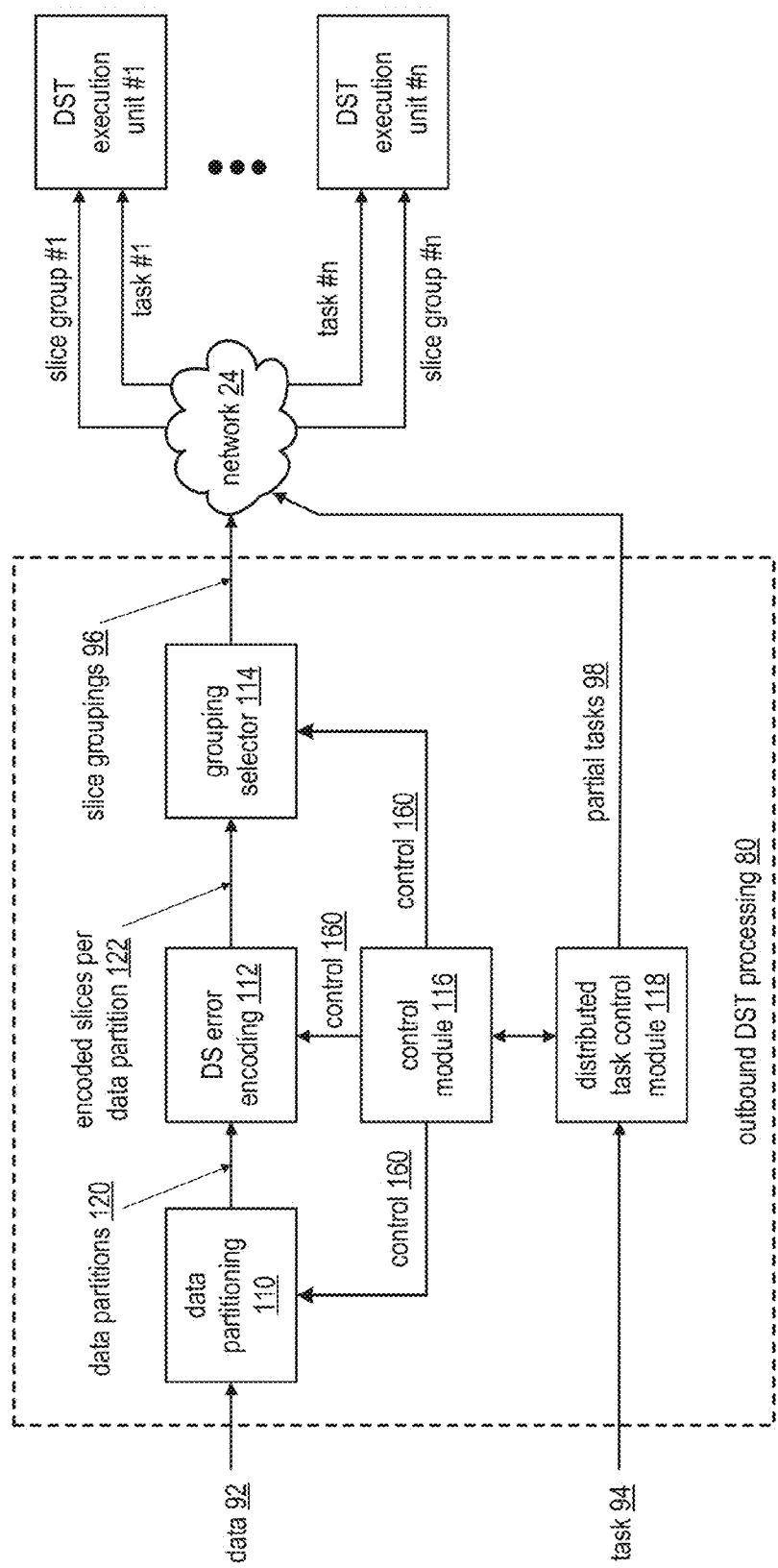
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selecting module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
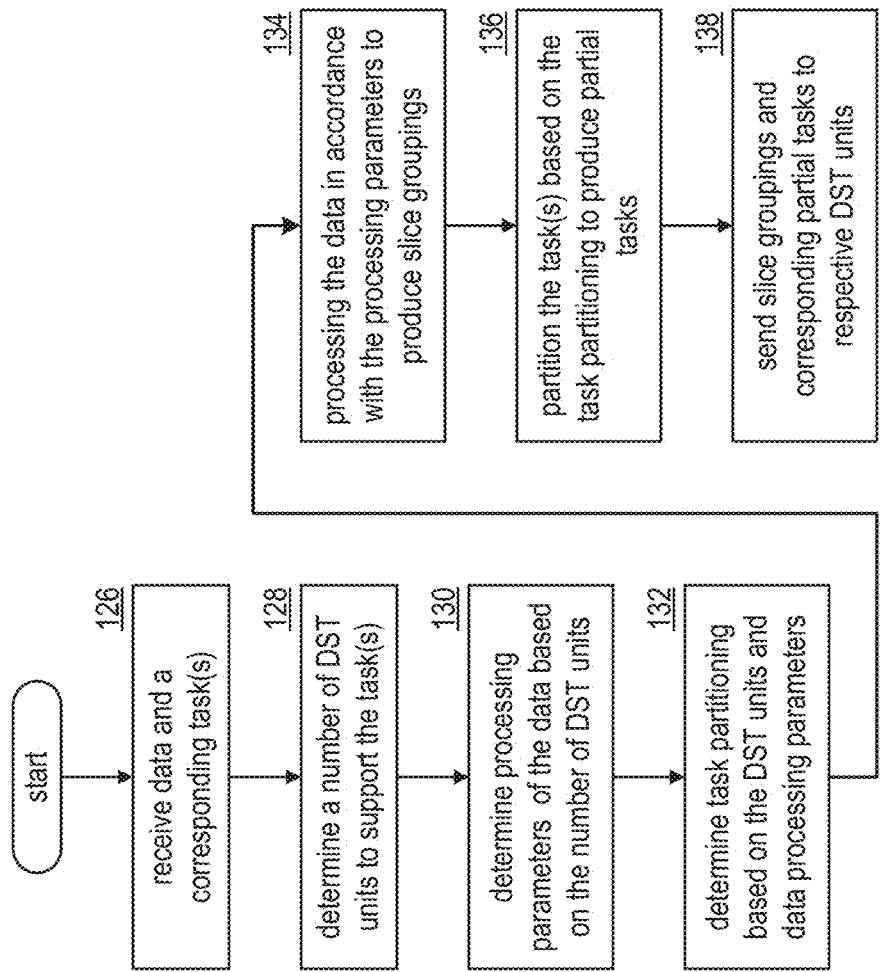
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
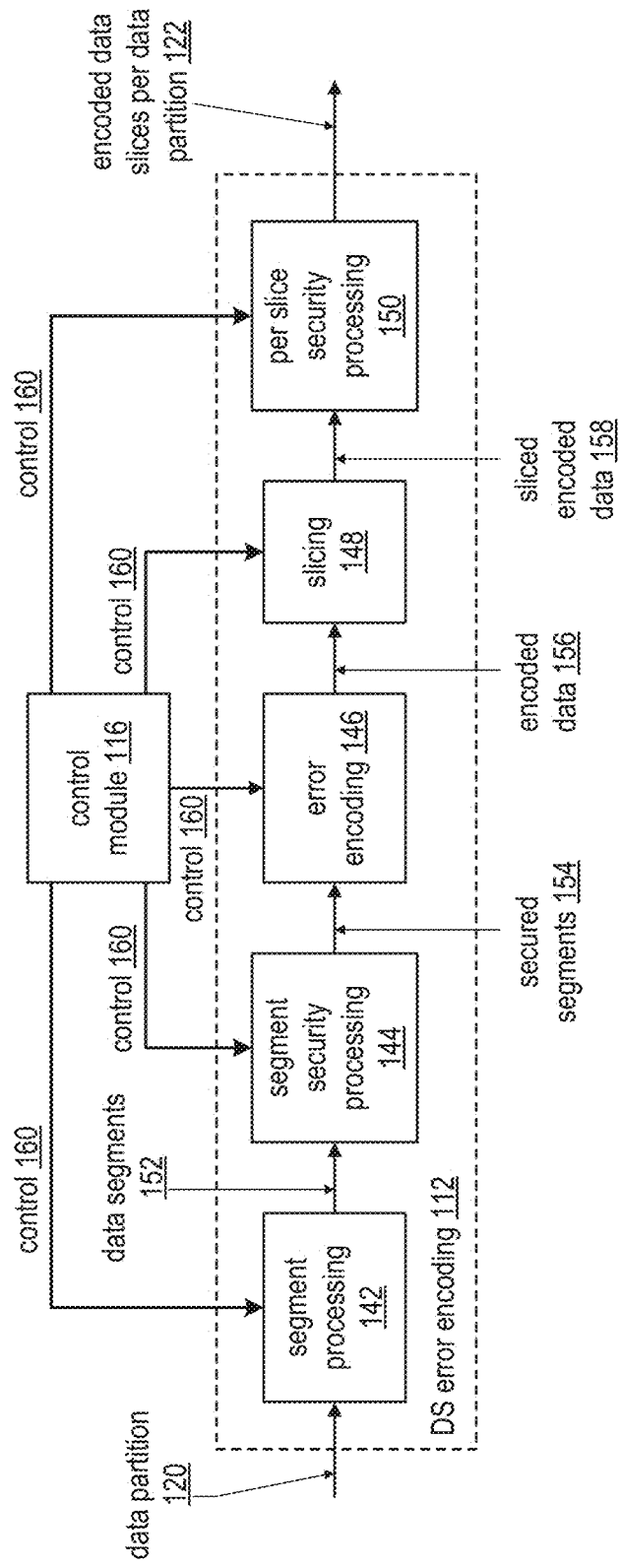
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
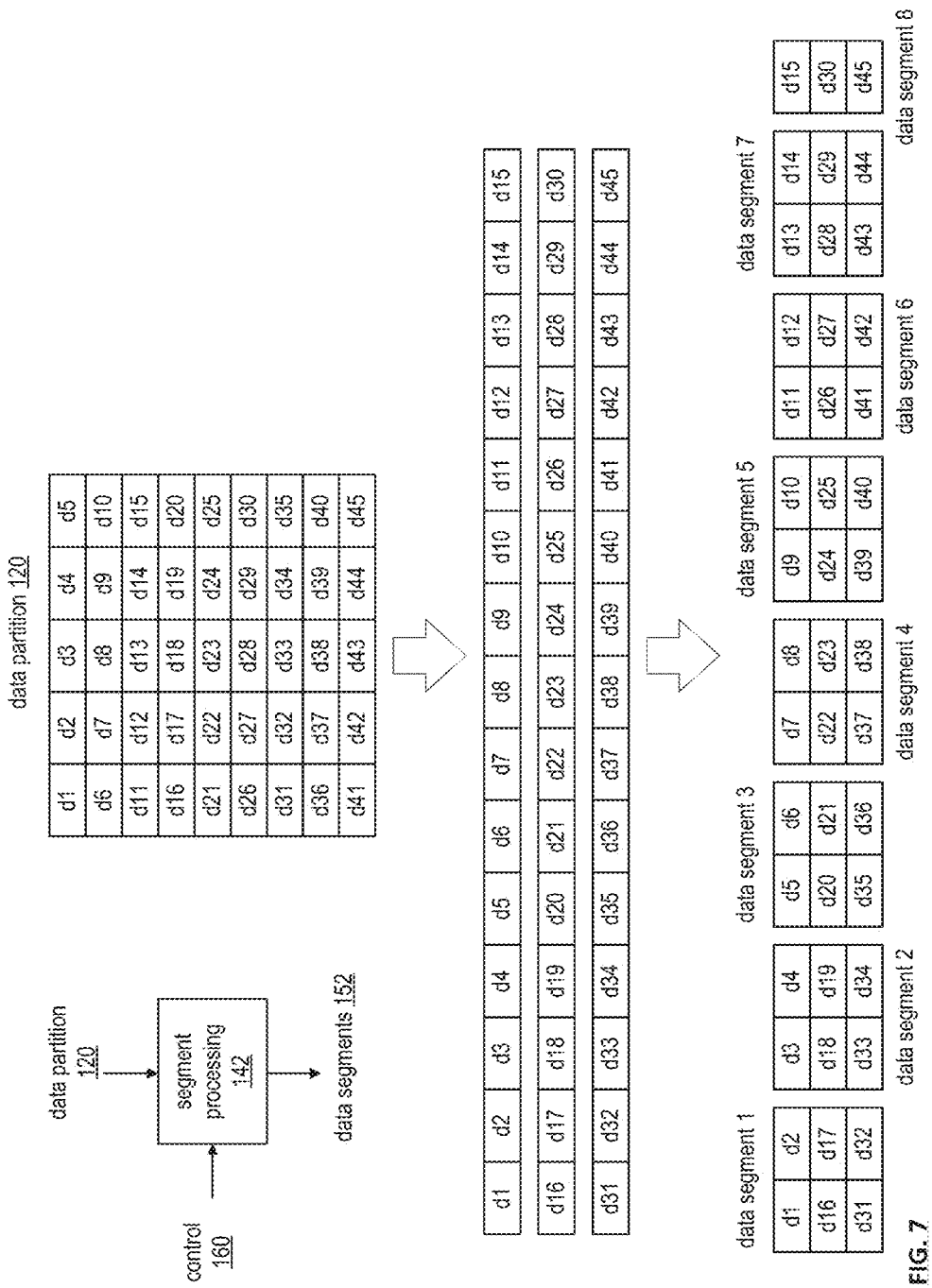
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
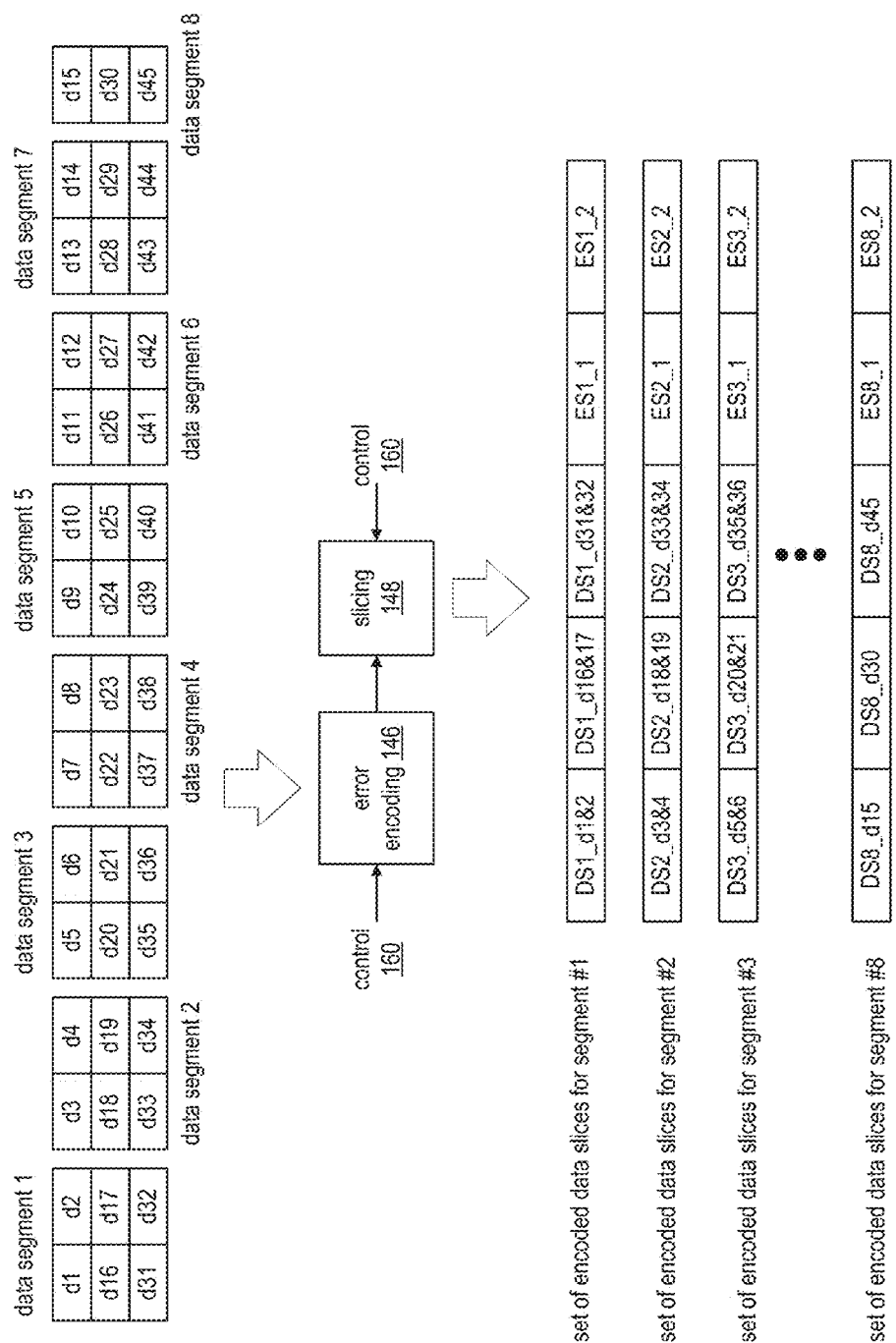
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_*d*1&2) of the first set of encoded data slices (e.g., corresponding to data segment 1) is substantially similar to content of the first word (e.g., d1 & d2); the content of the second encoded data slice (DS1_*d*16&17) of the first set of encoded data slices is substantially similar to content of the second word (e.g., d16 & d17); and the content of the third encoded data slice (DS1_*d*31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_*d*3&4) of the second set of encoded data slices (e.g., corresponding to data segment 2) is substantially similar to content of the first word (e.g., d3 & d4); the content of the second encoded data slice (DS2_*d*18&19) of the second set of encoded data slices is substantially similar to content of the second word (e.g., d18 & d19); and the content of the third encoded data slice (DS2_*d*33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
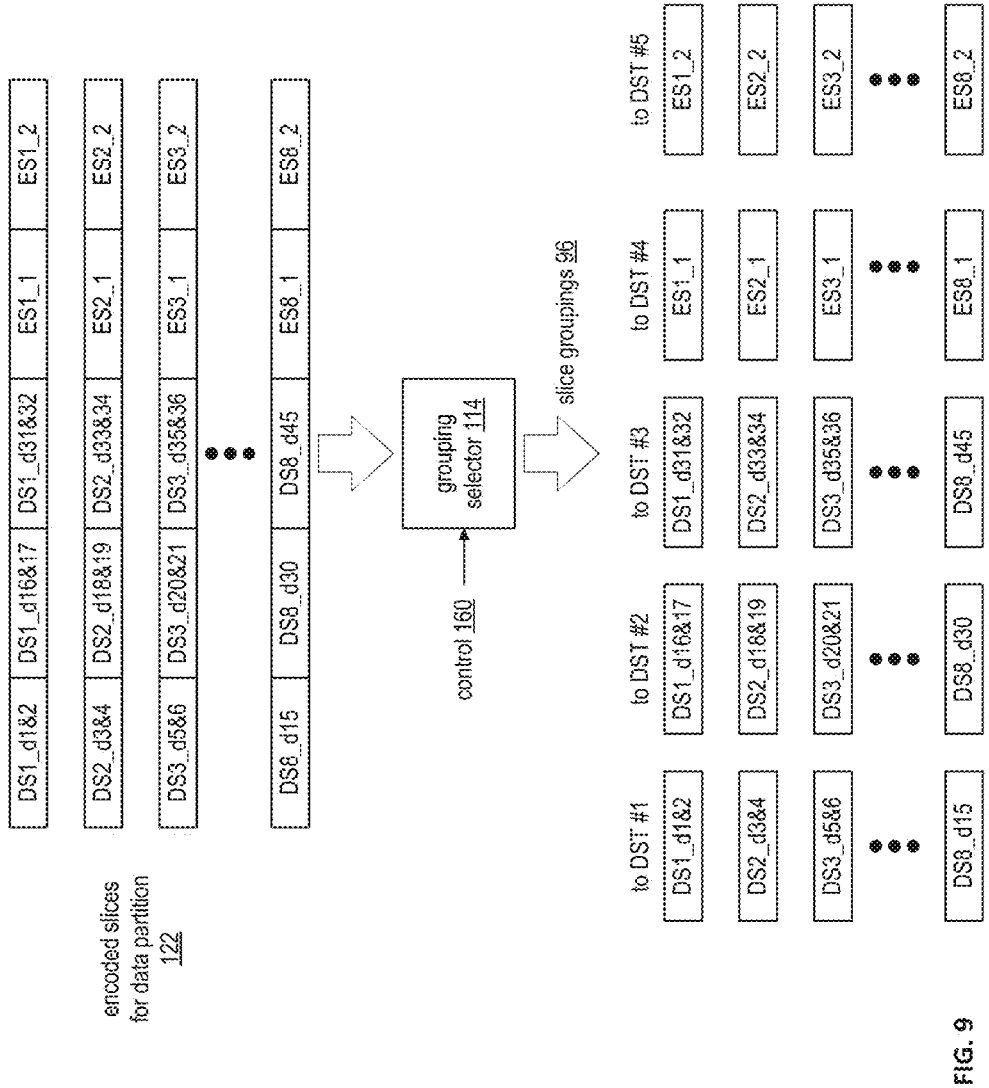
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
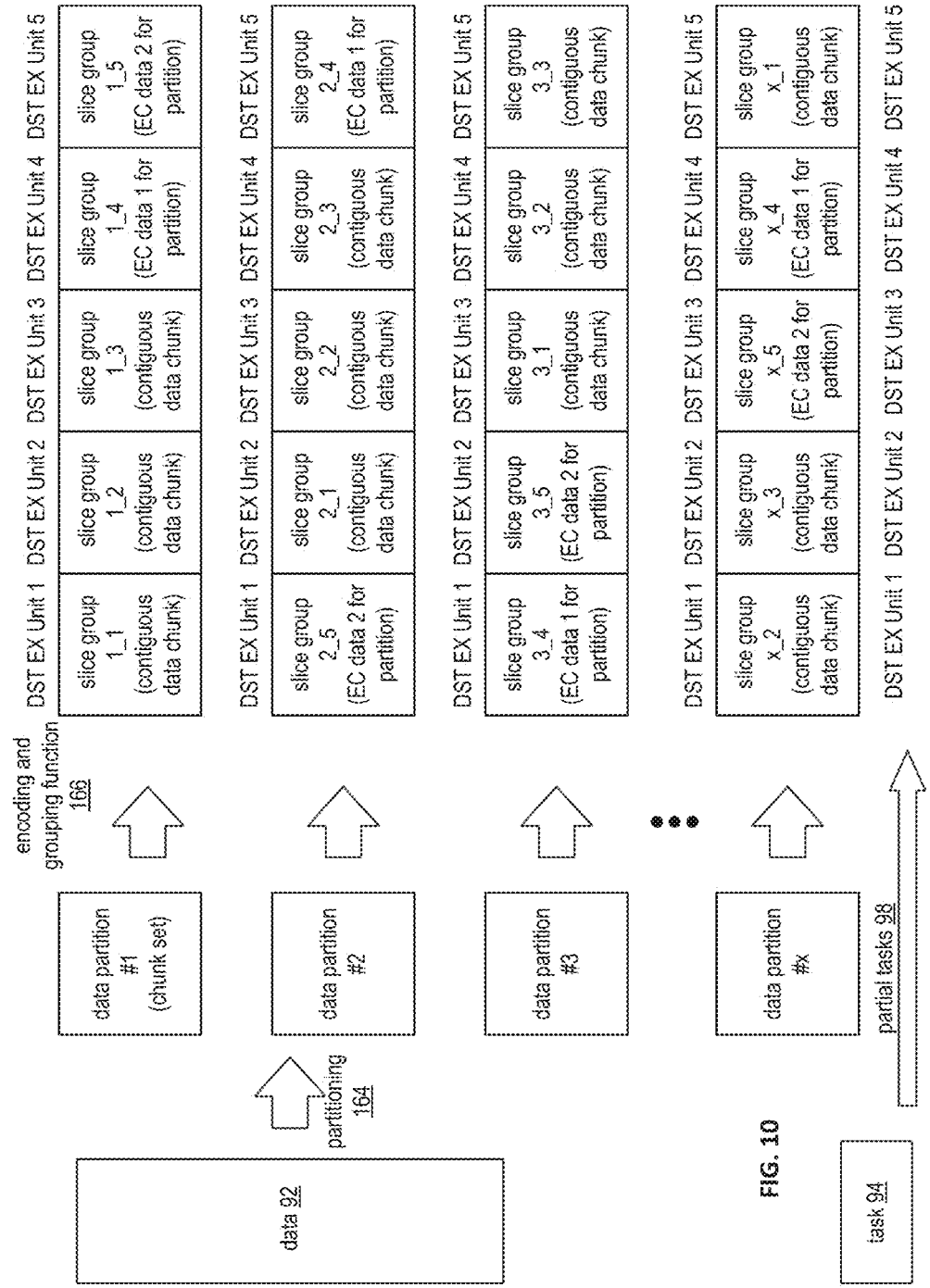
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
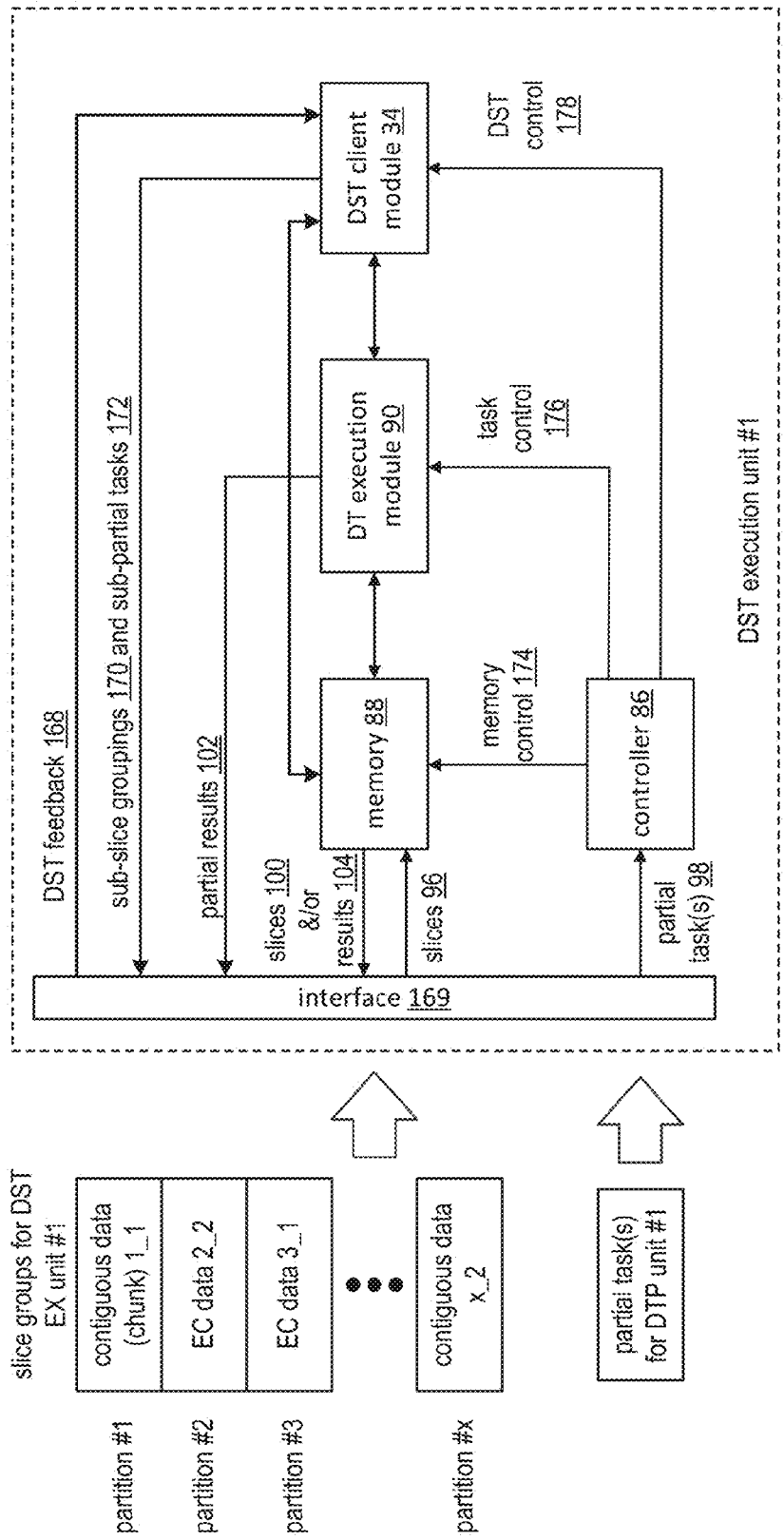
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
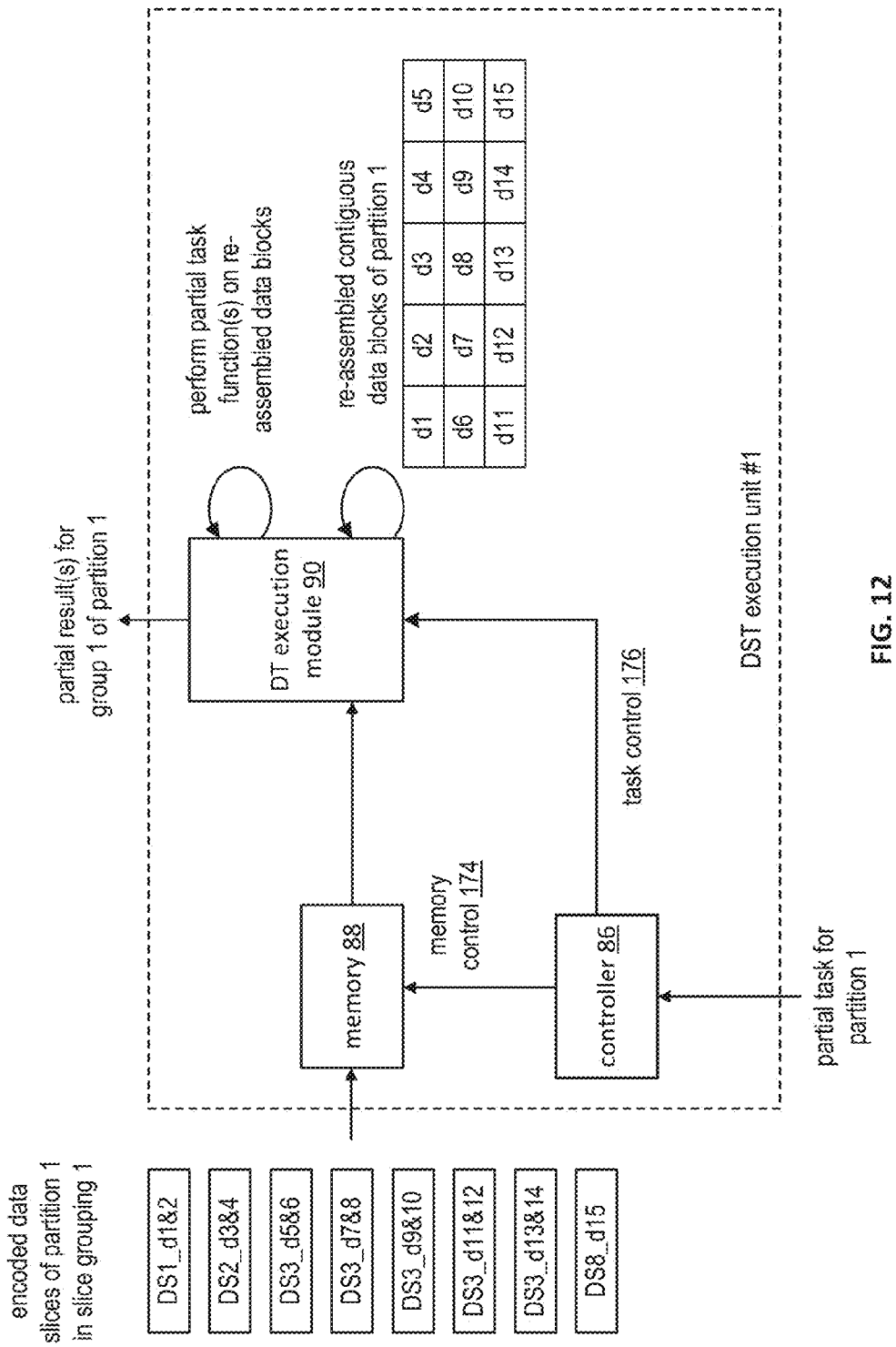
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
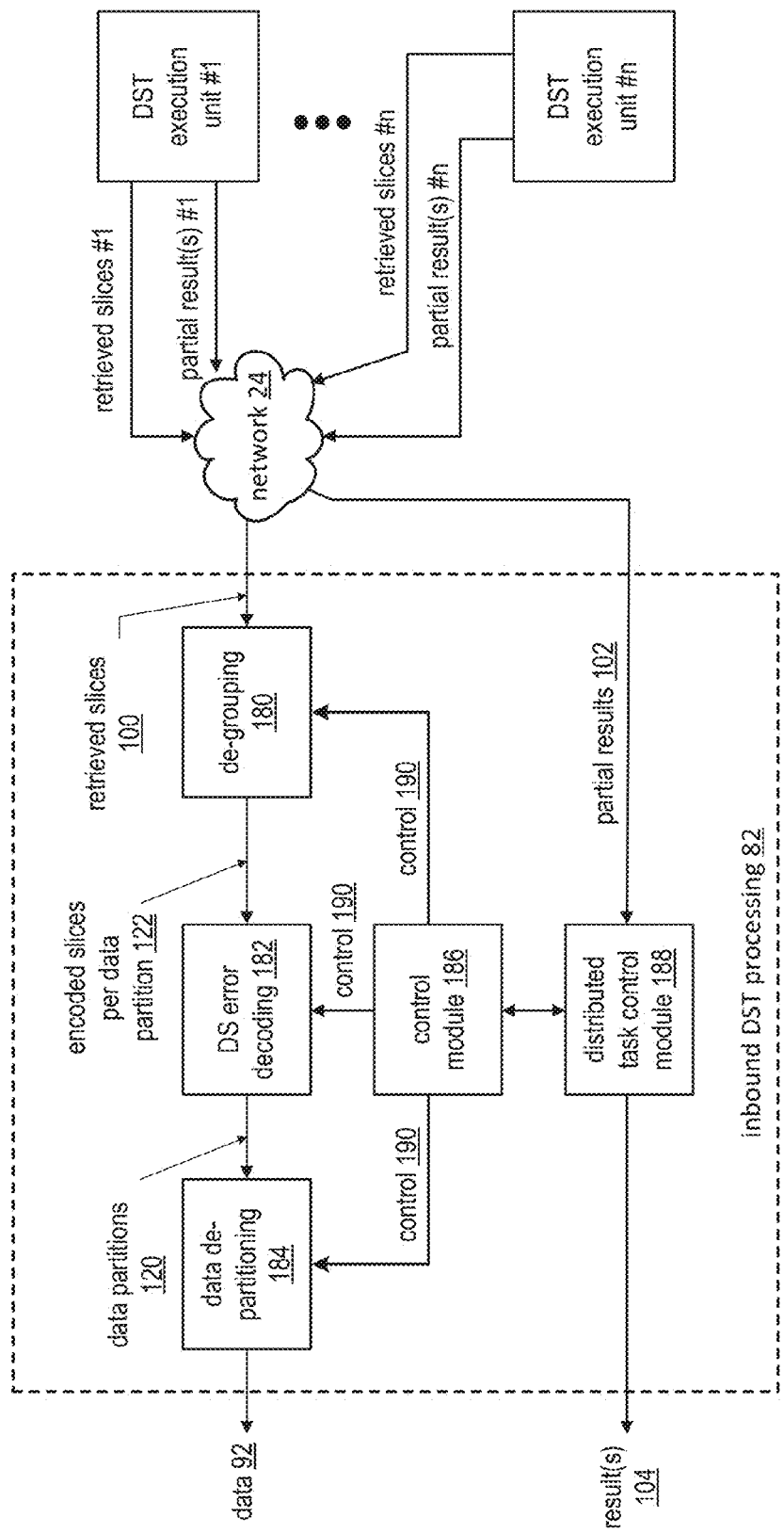
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
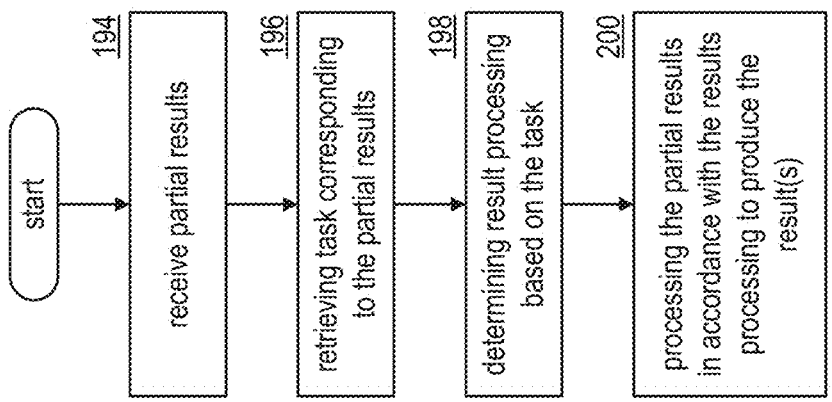
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
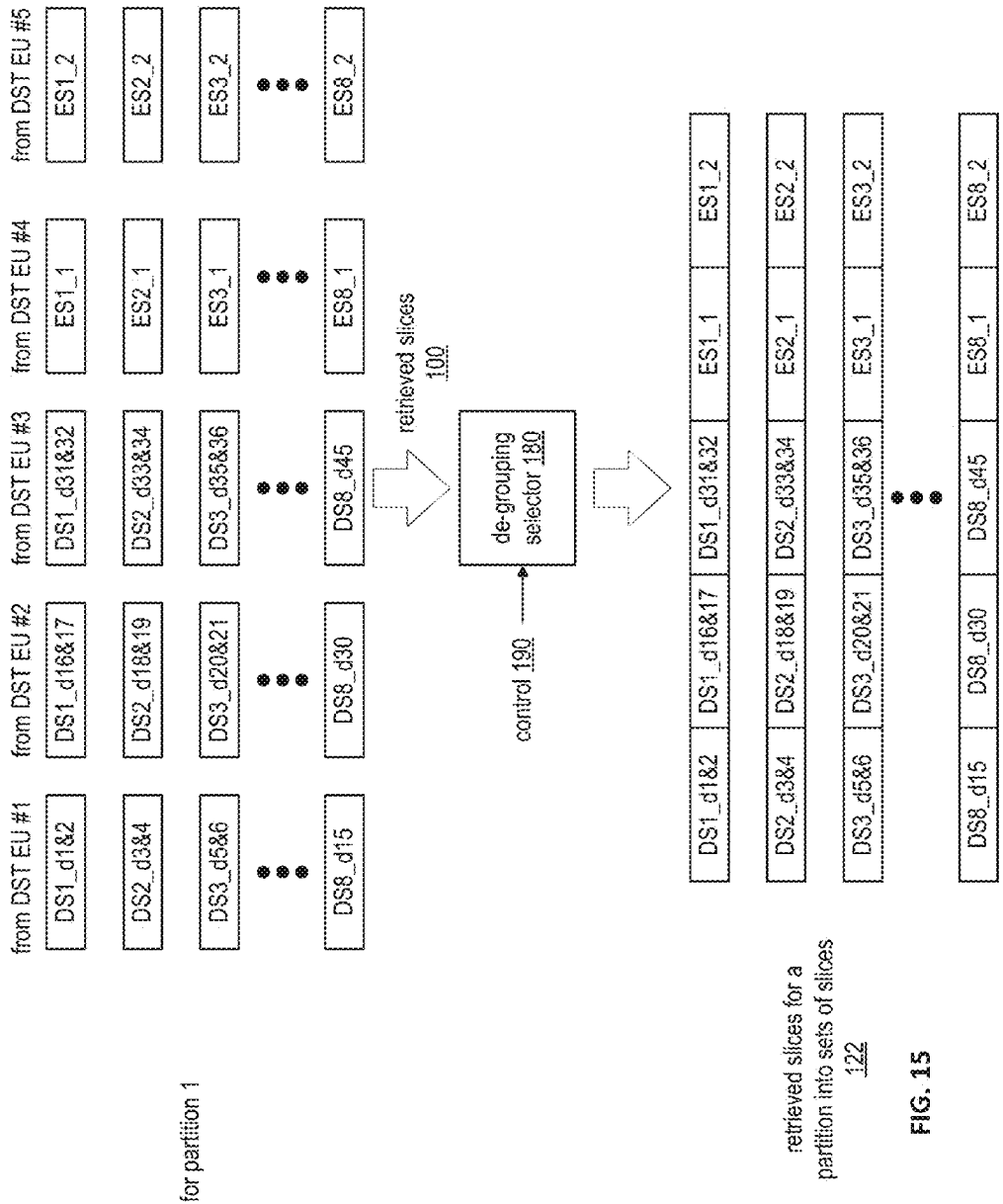
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
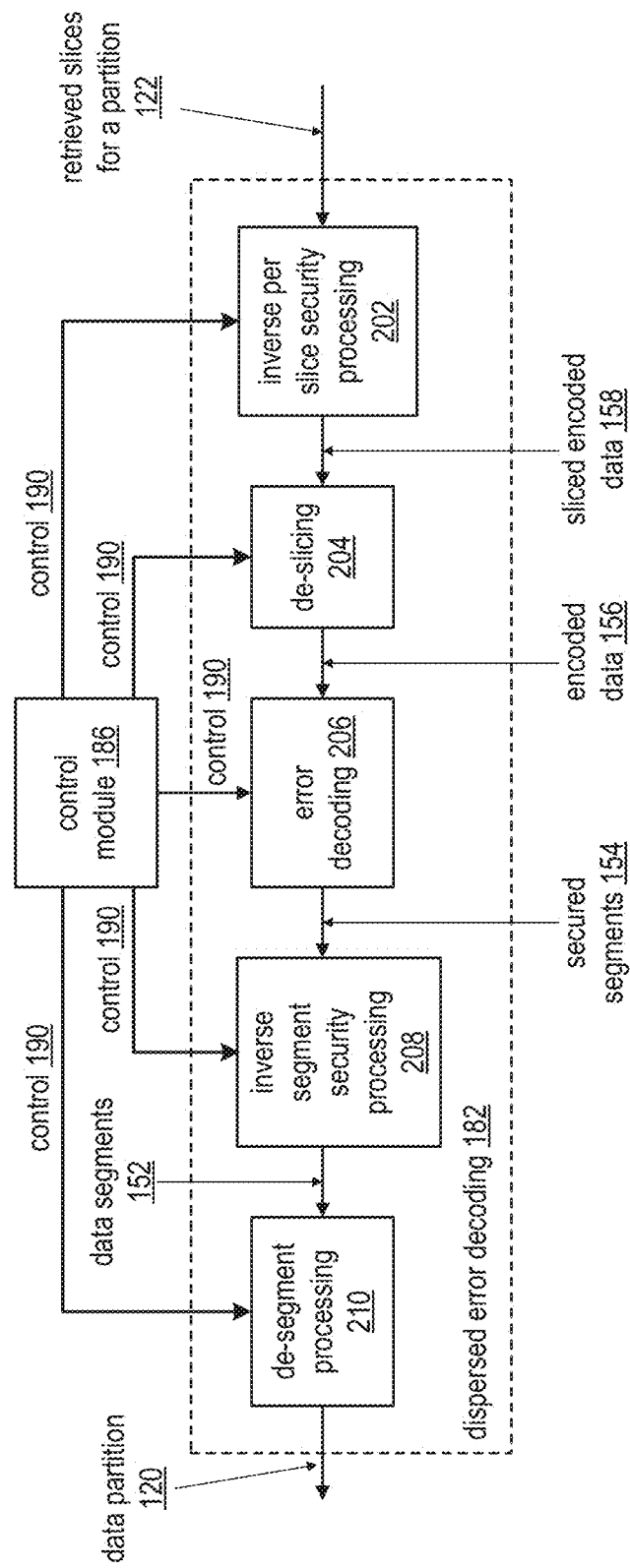
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
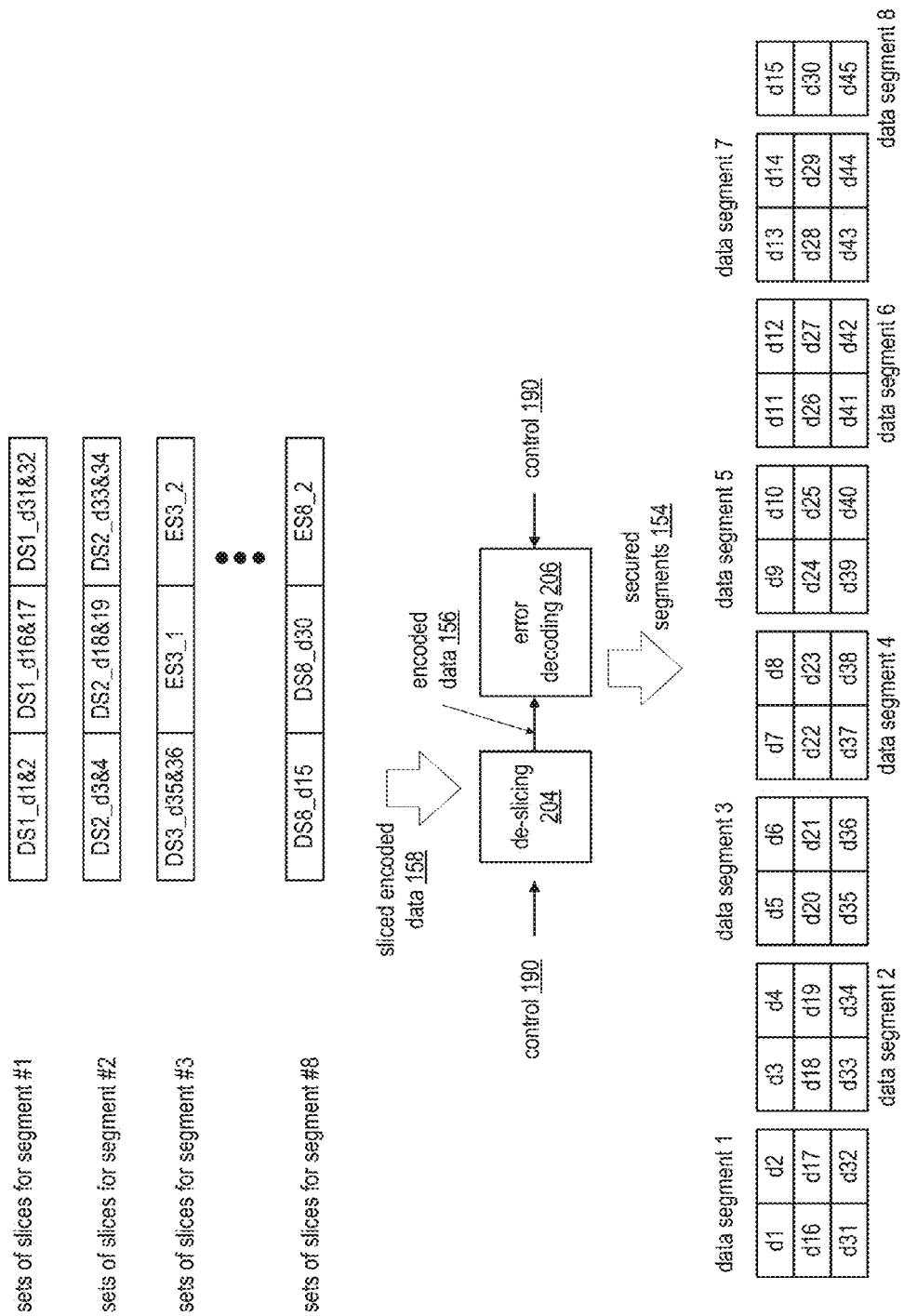
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
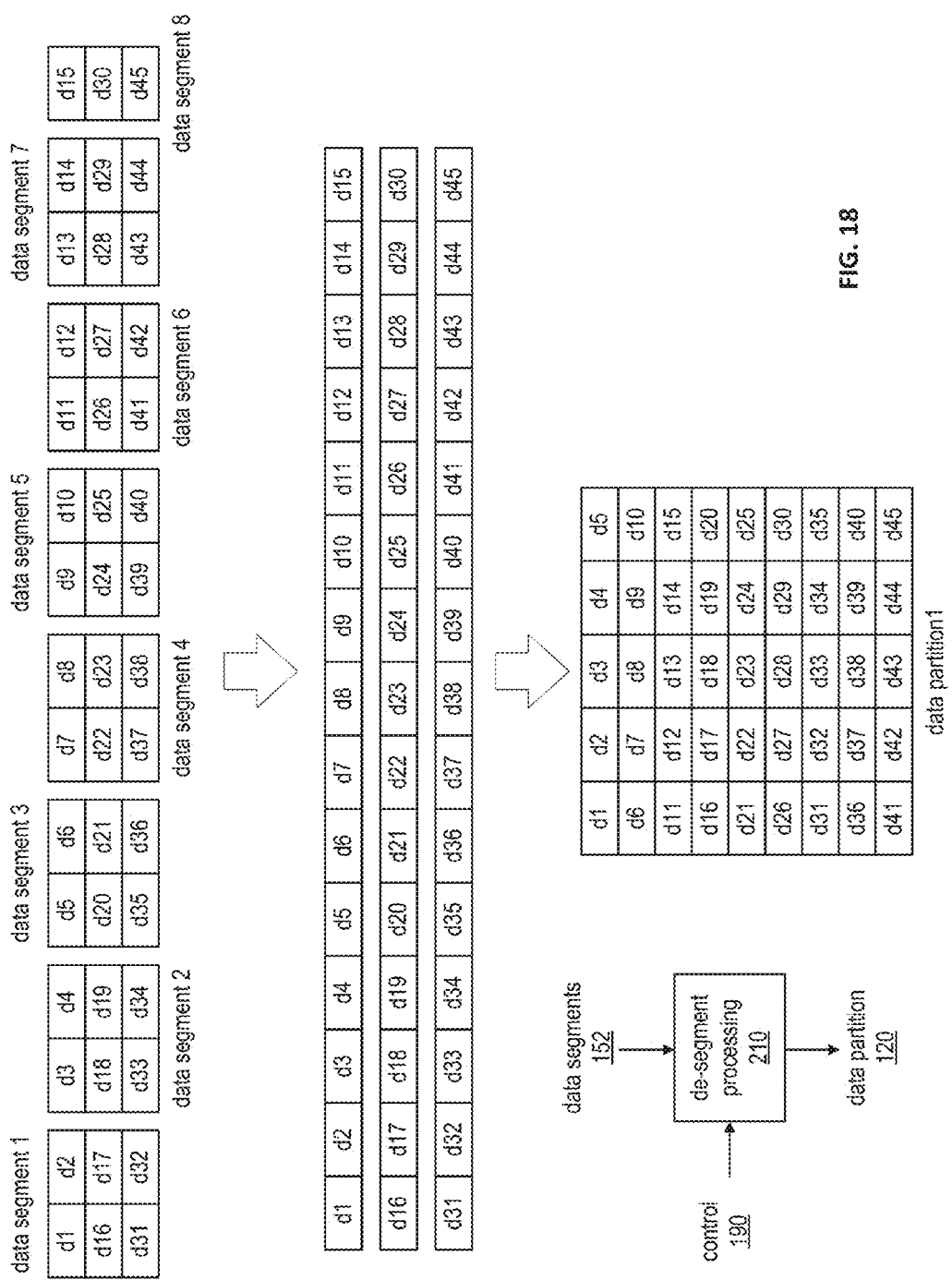
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
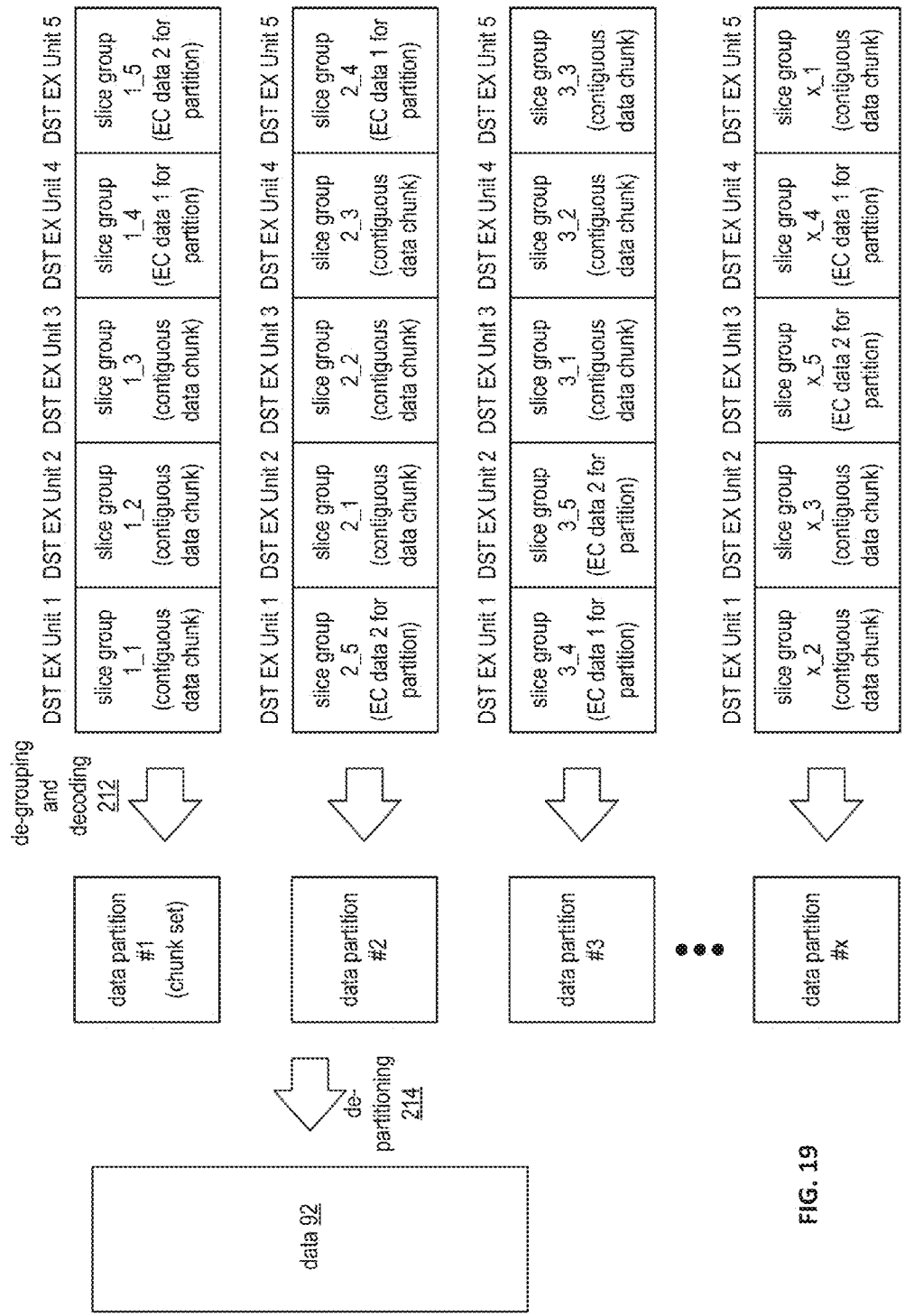
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
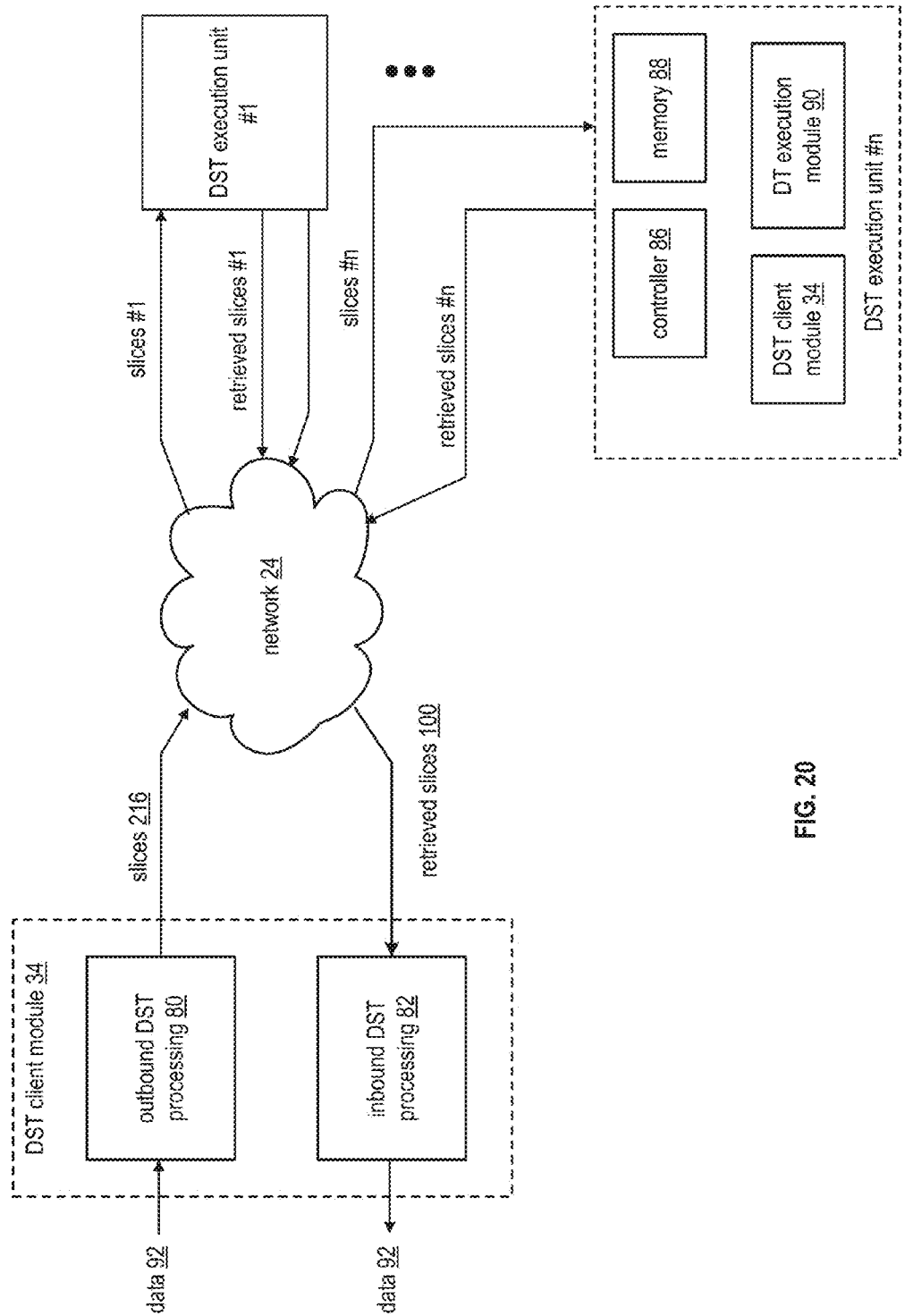
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
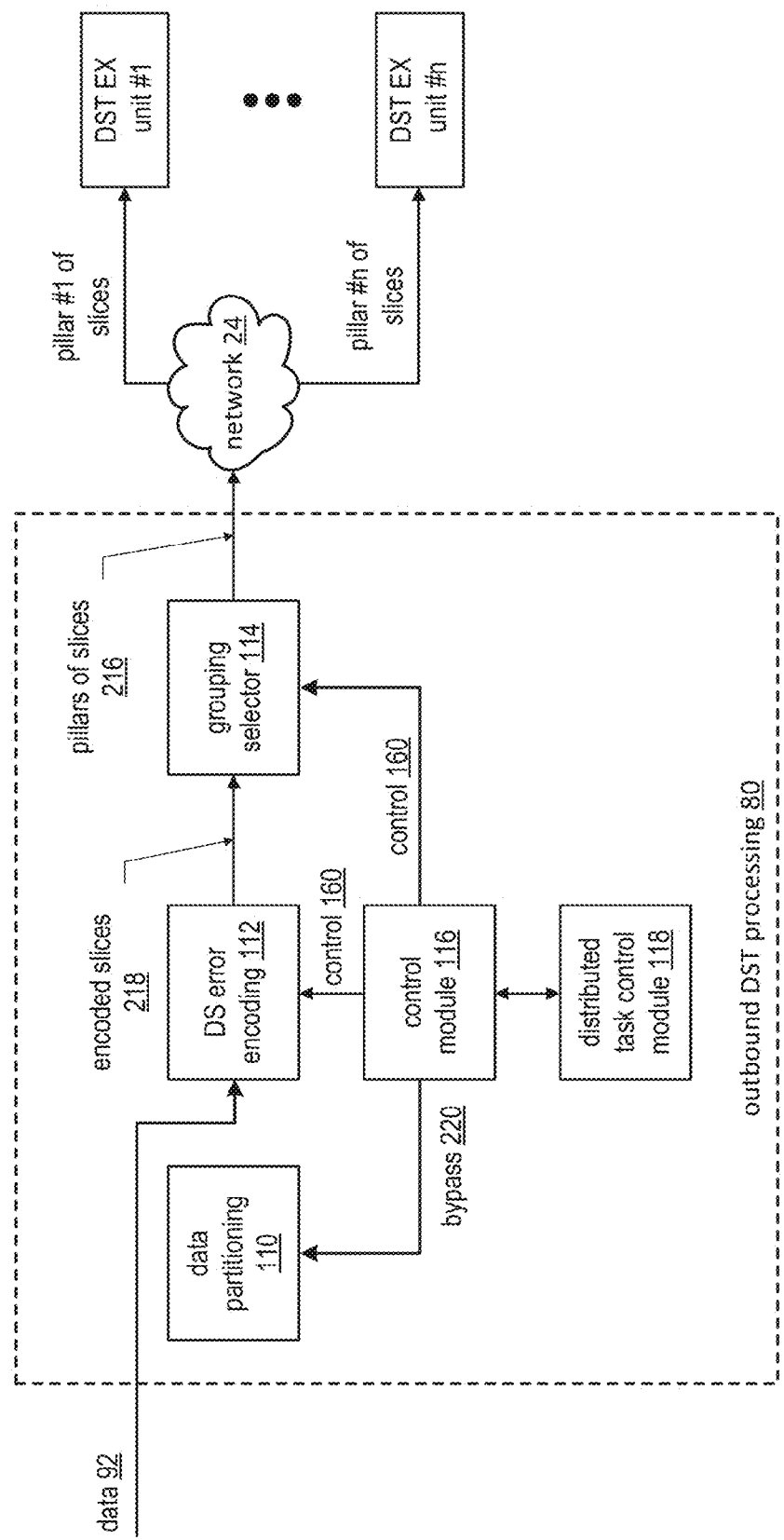
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
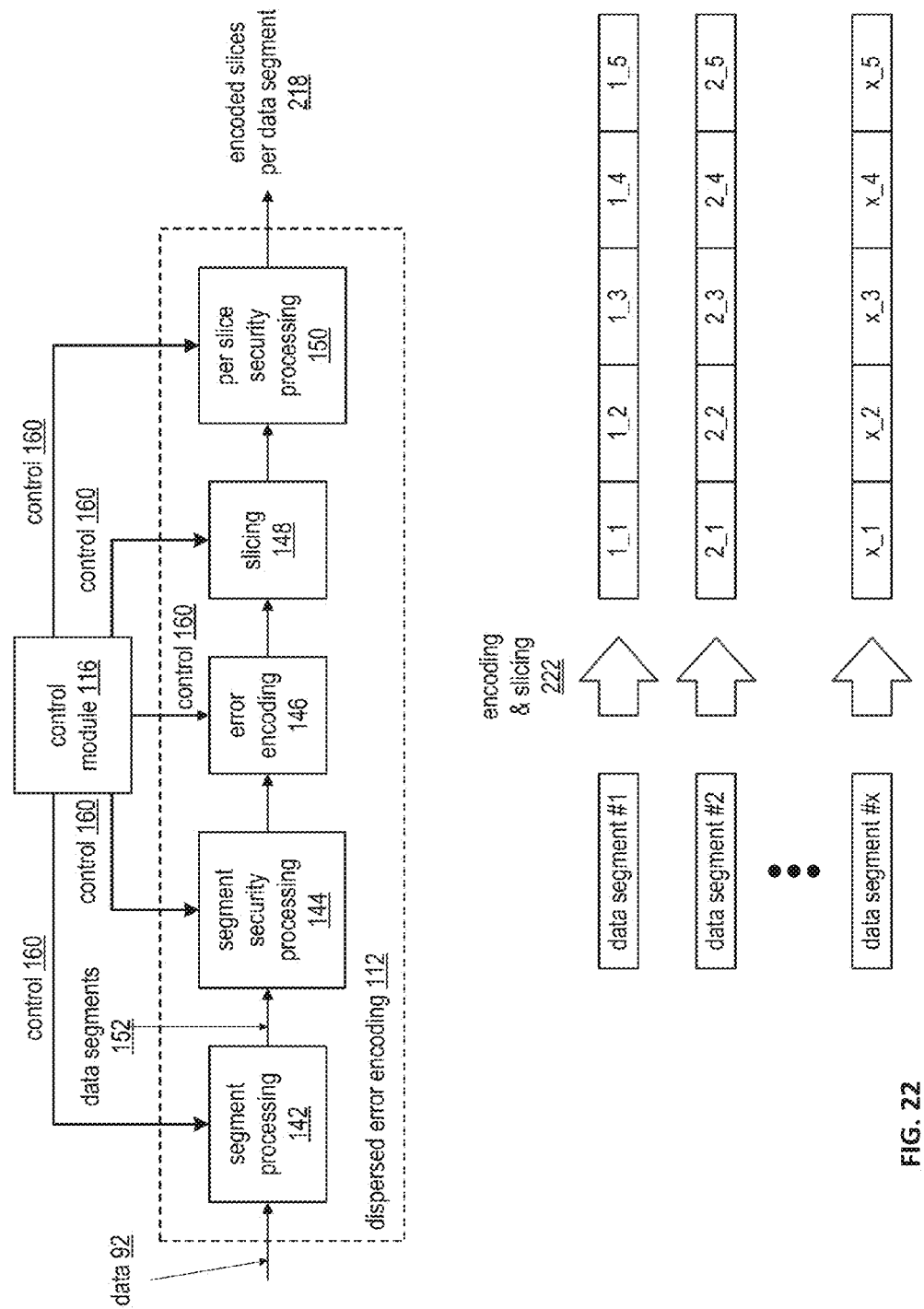
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
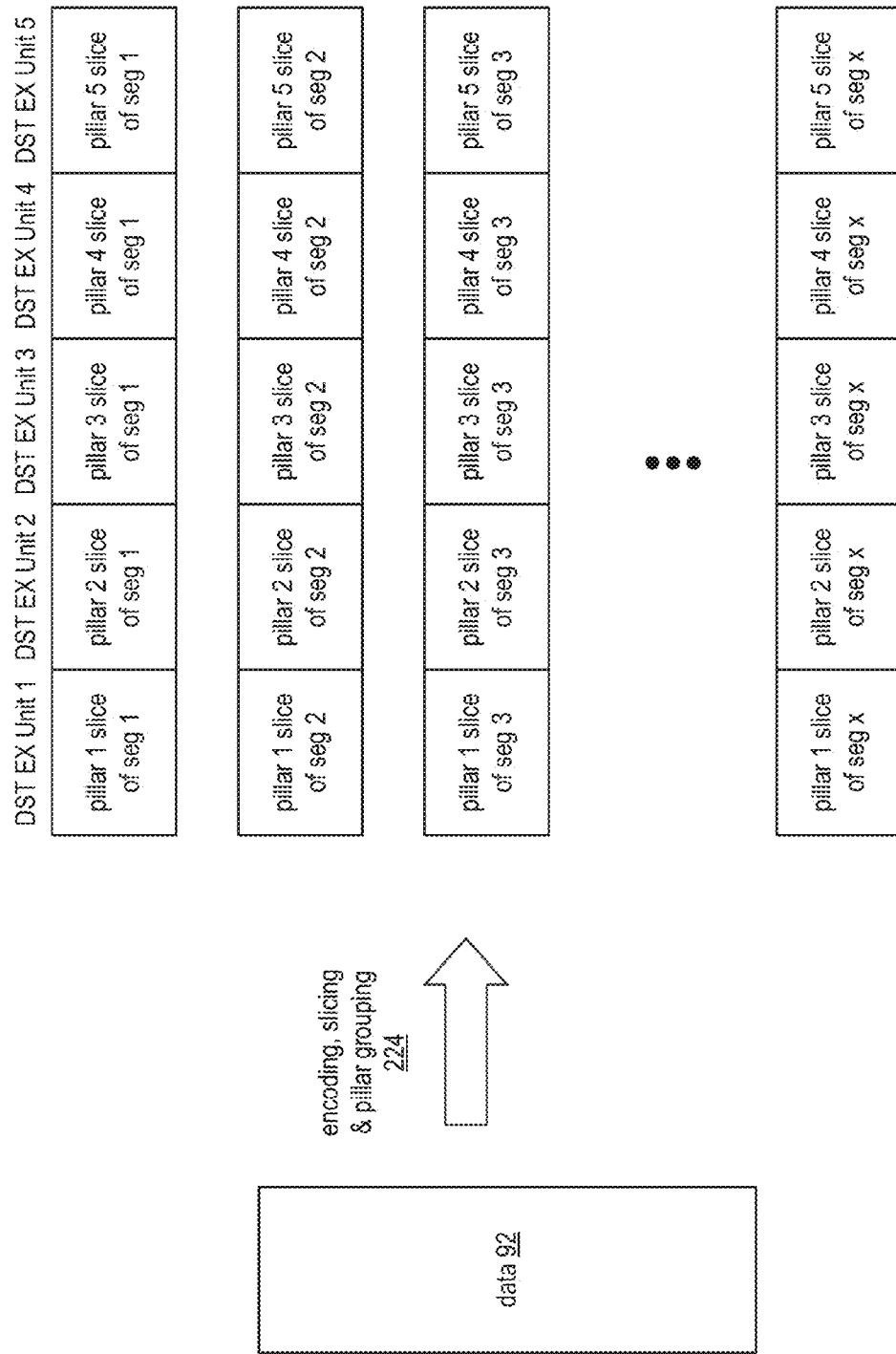
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
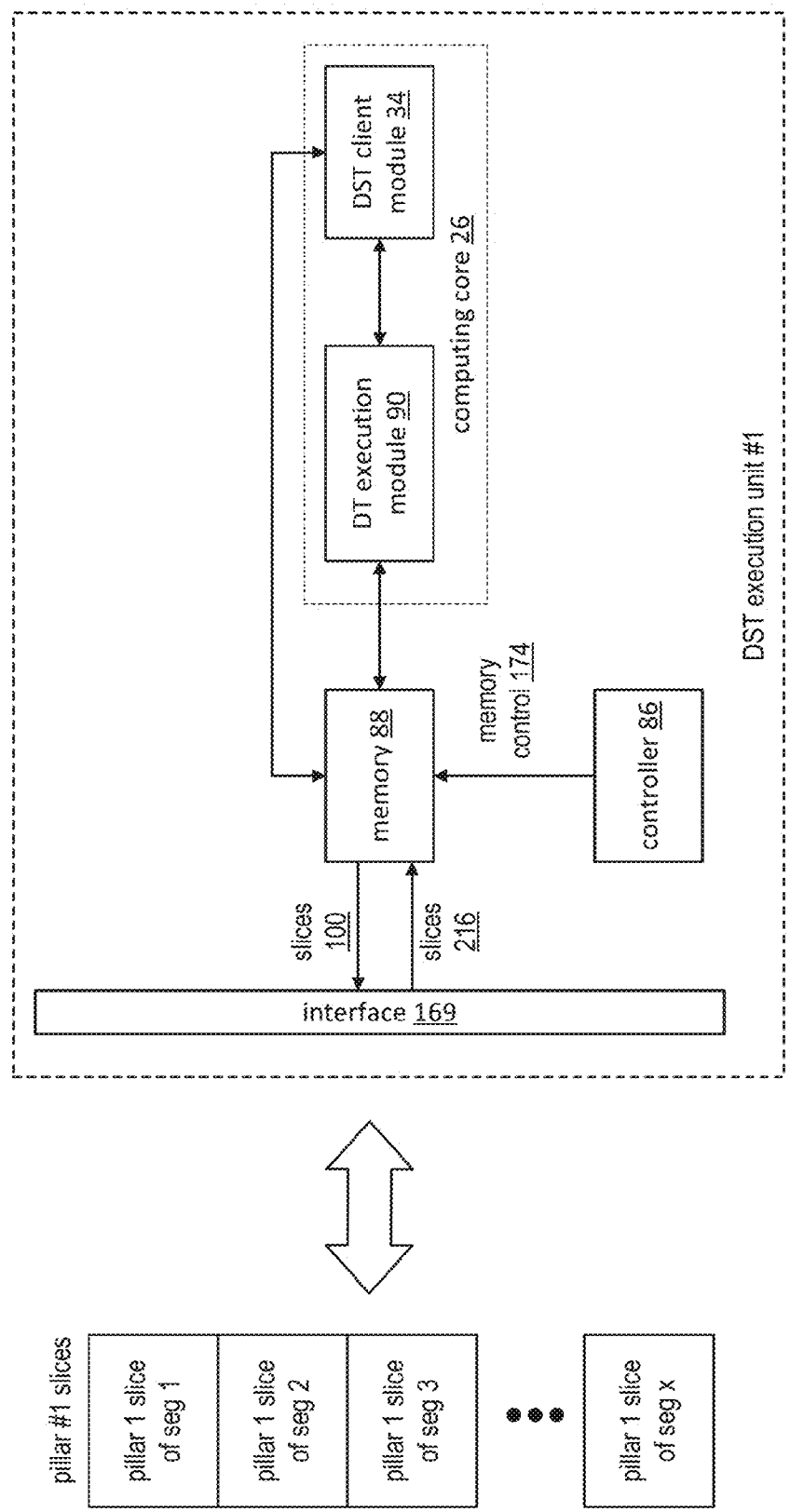
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
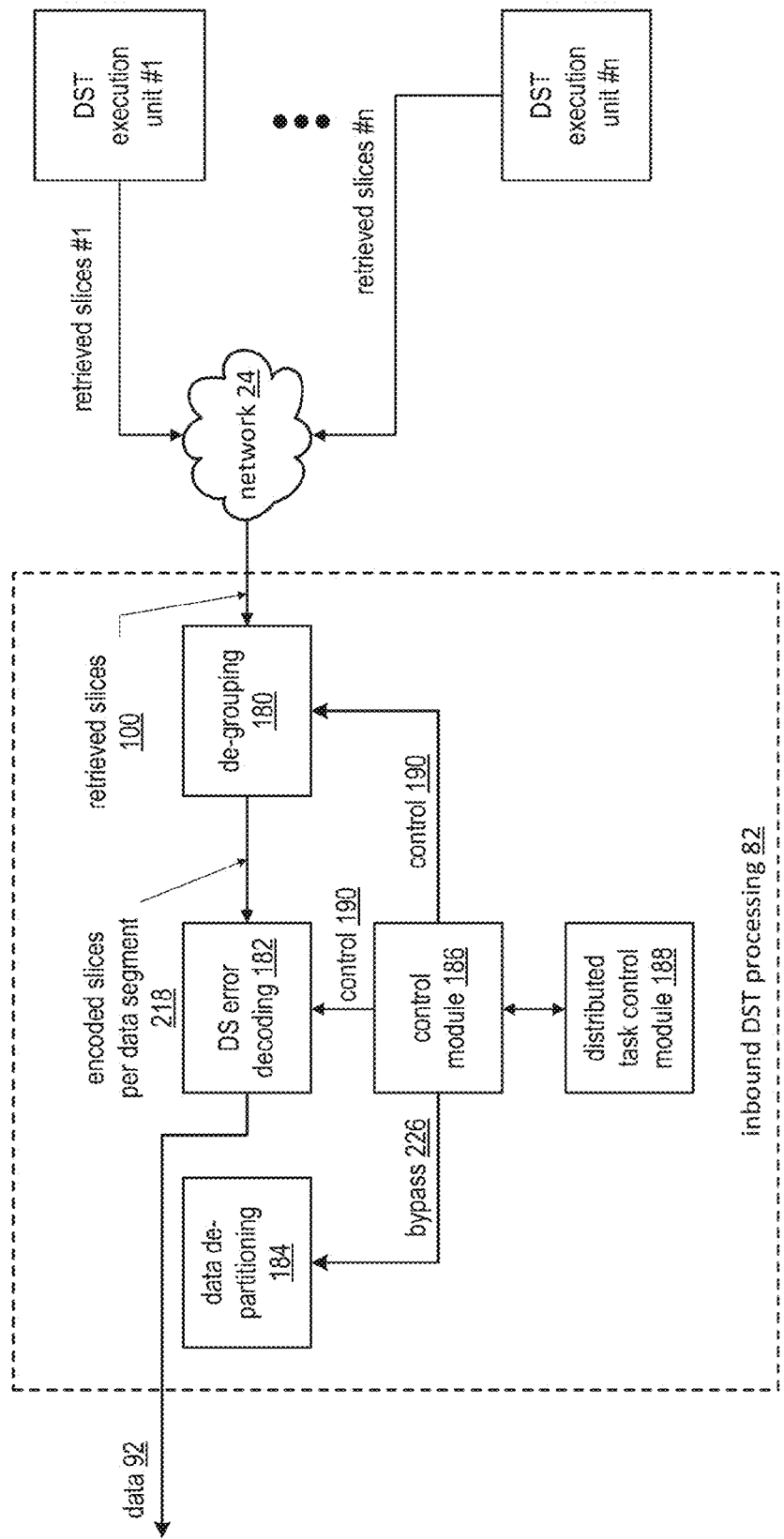
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
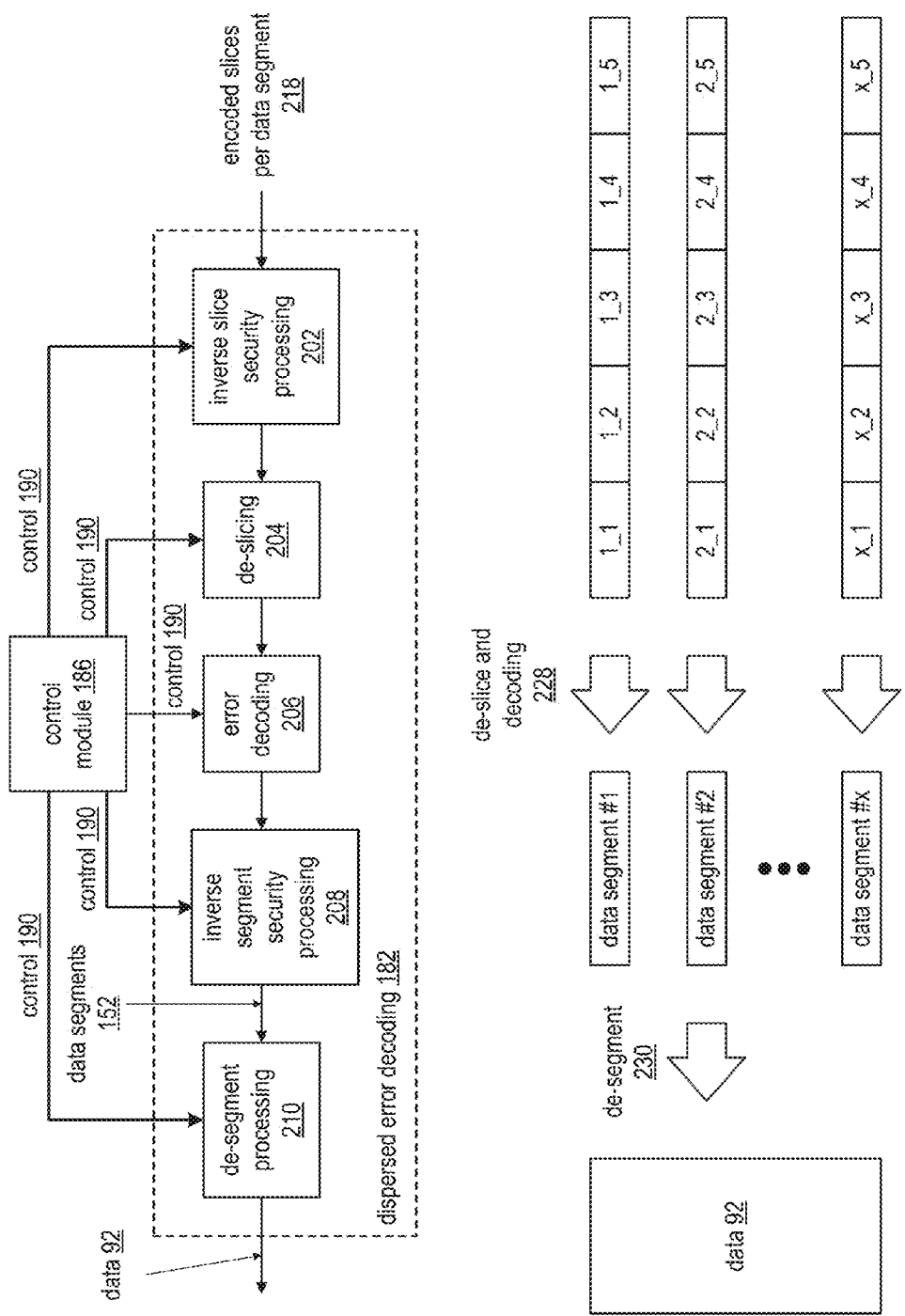
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
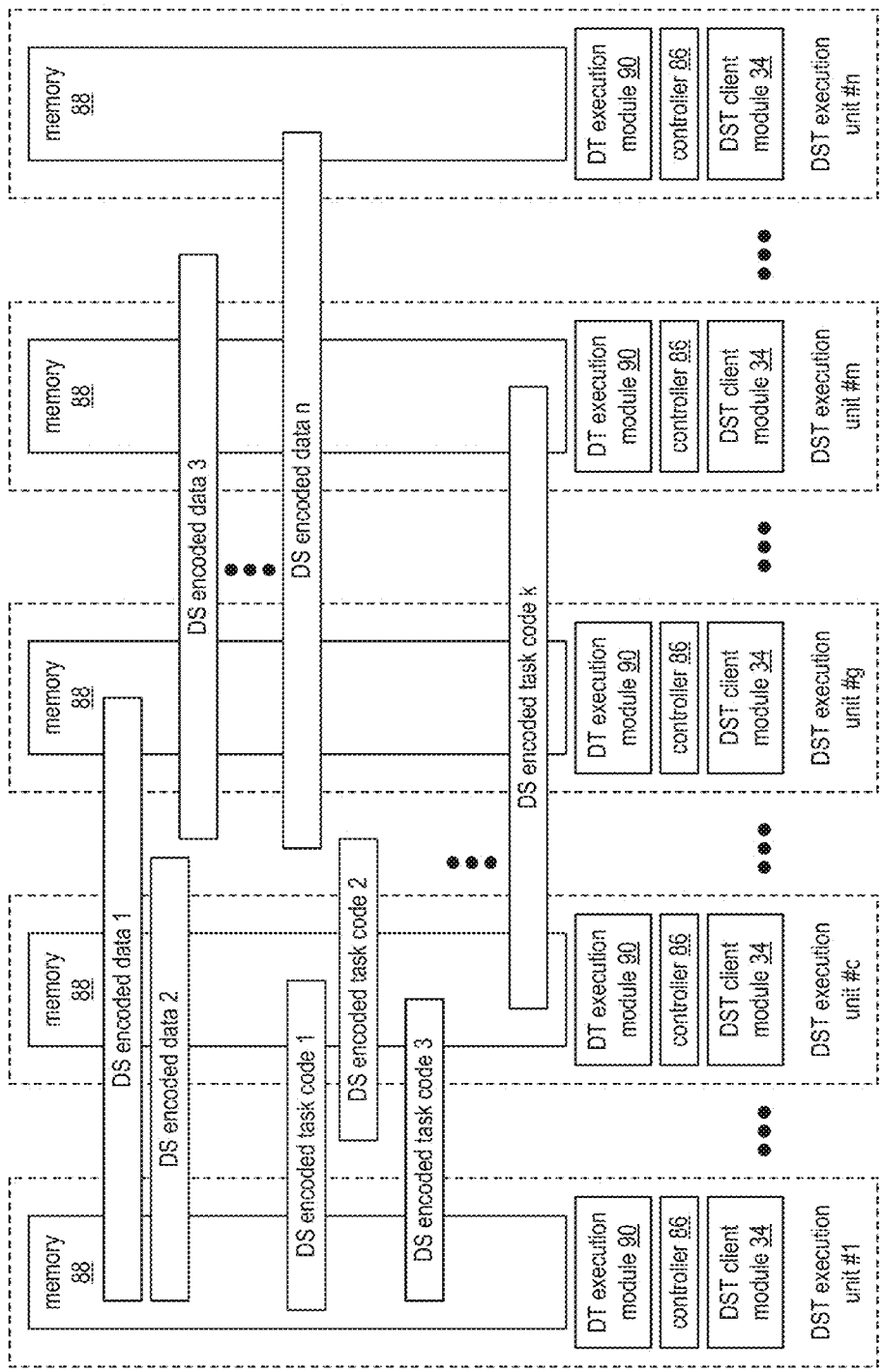
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
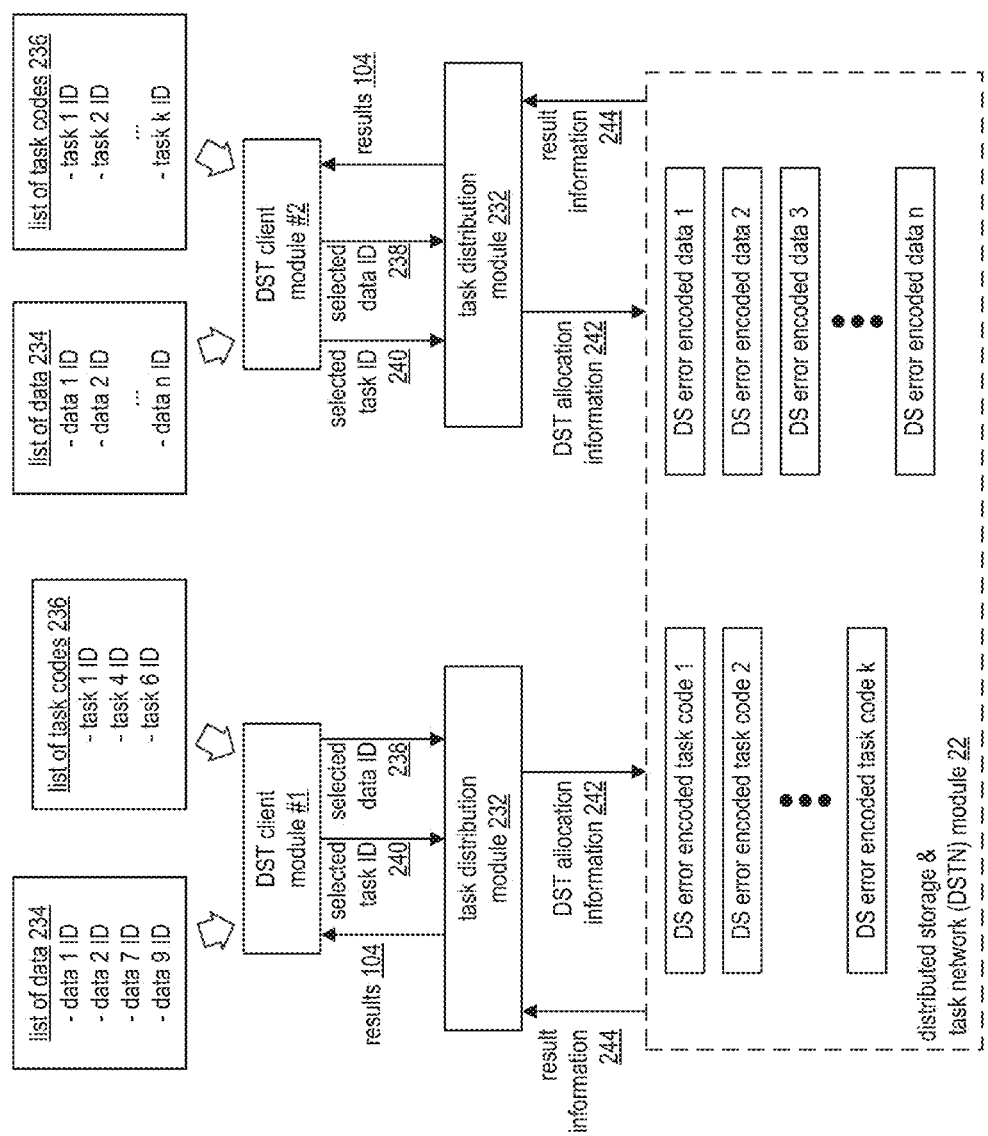
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
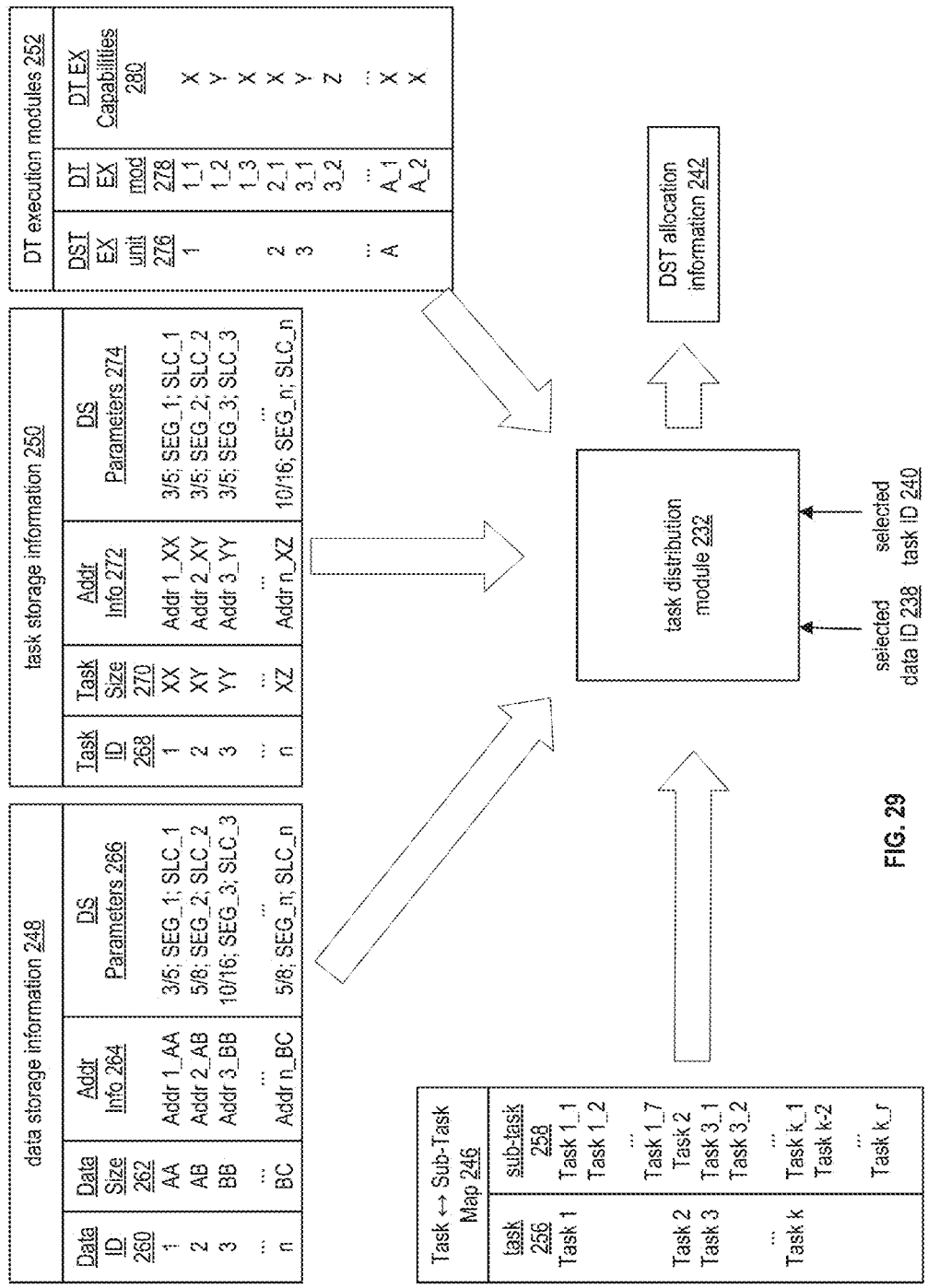
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ↔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
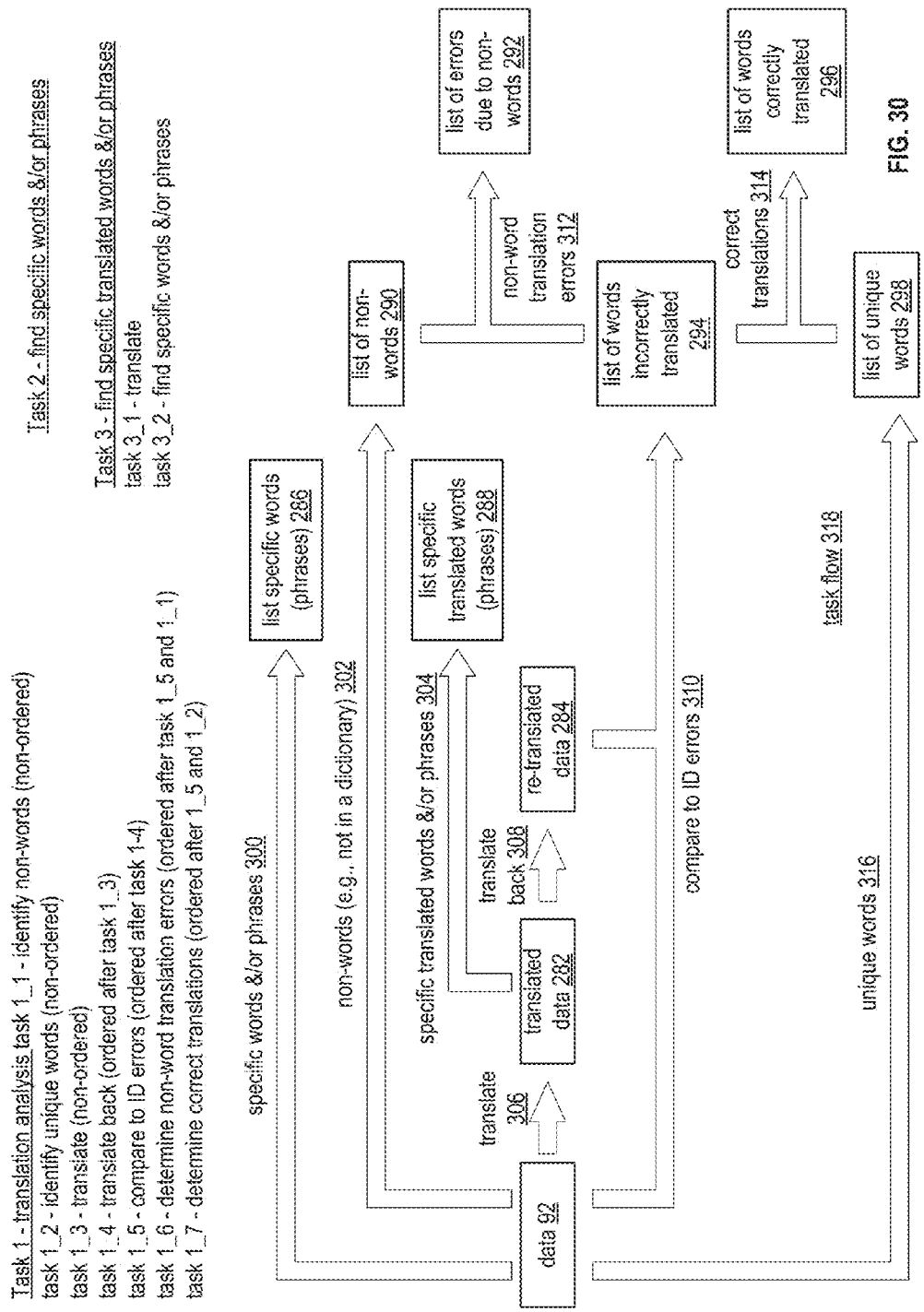
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4-translate back (ordered after task 1_3); task 1_5—compare to ID errors (ordered after task 1_4); task 1_6—determine non-word translation errors (ordered after task 1_5 and 1_1); and task 1_7-determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
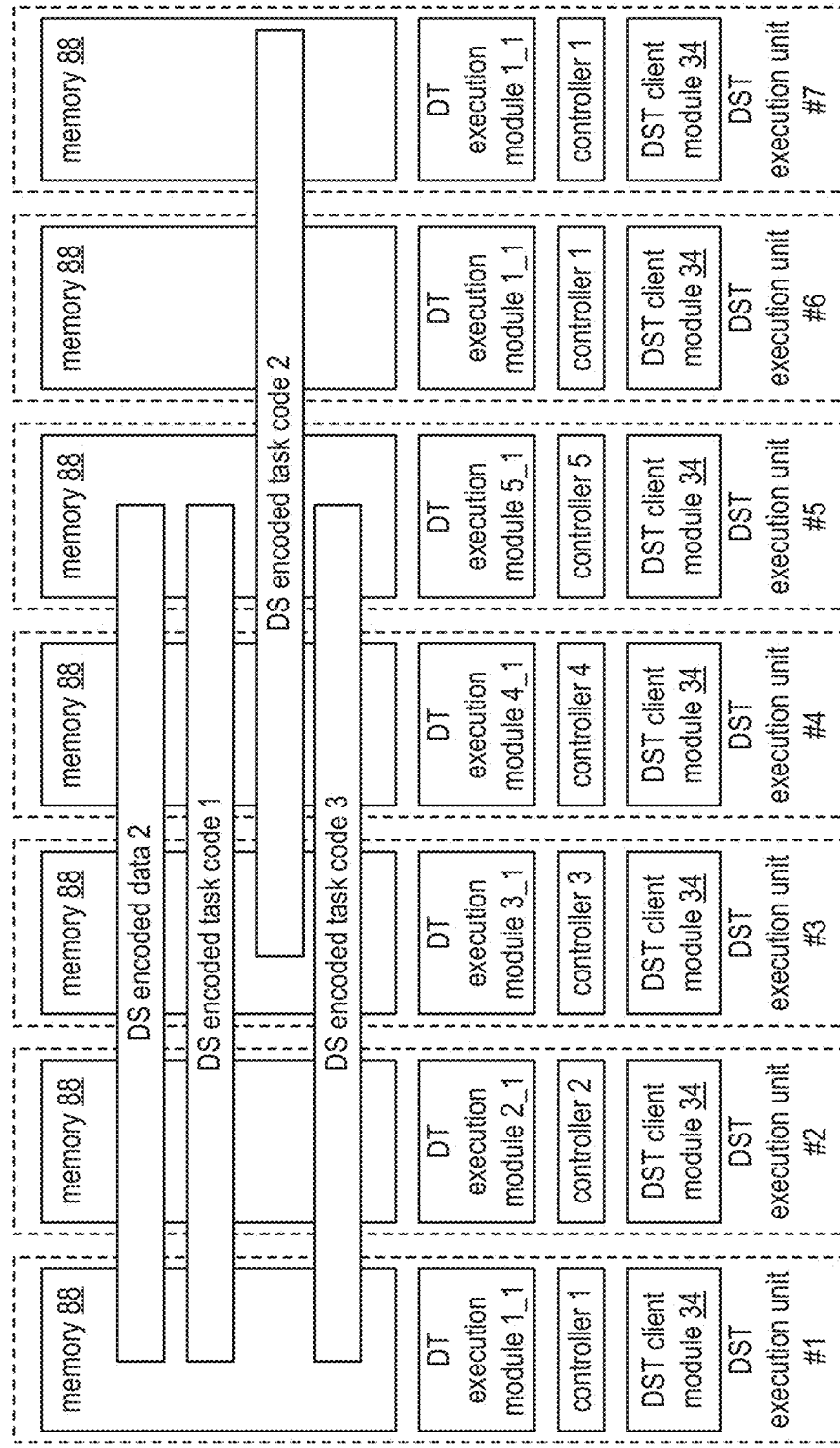
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
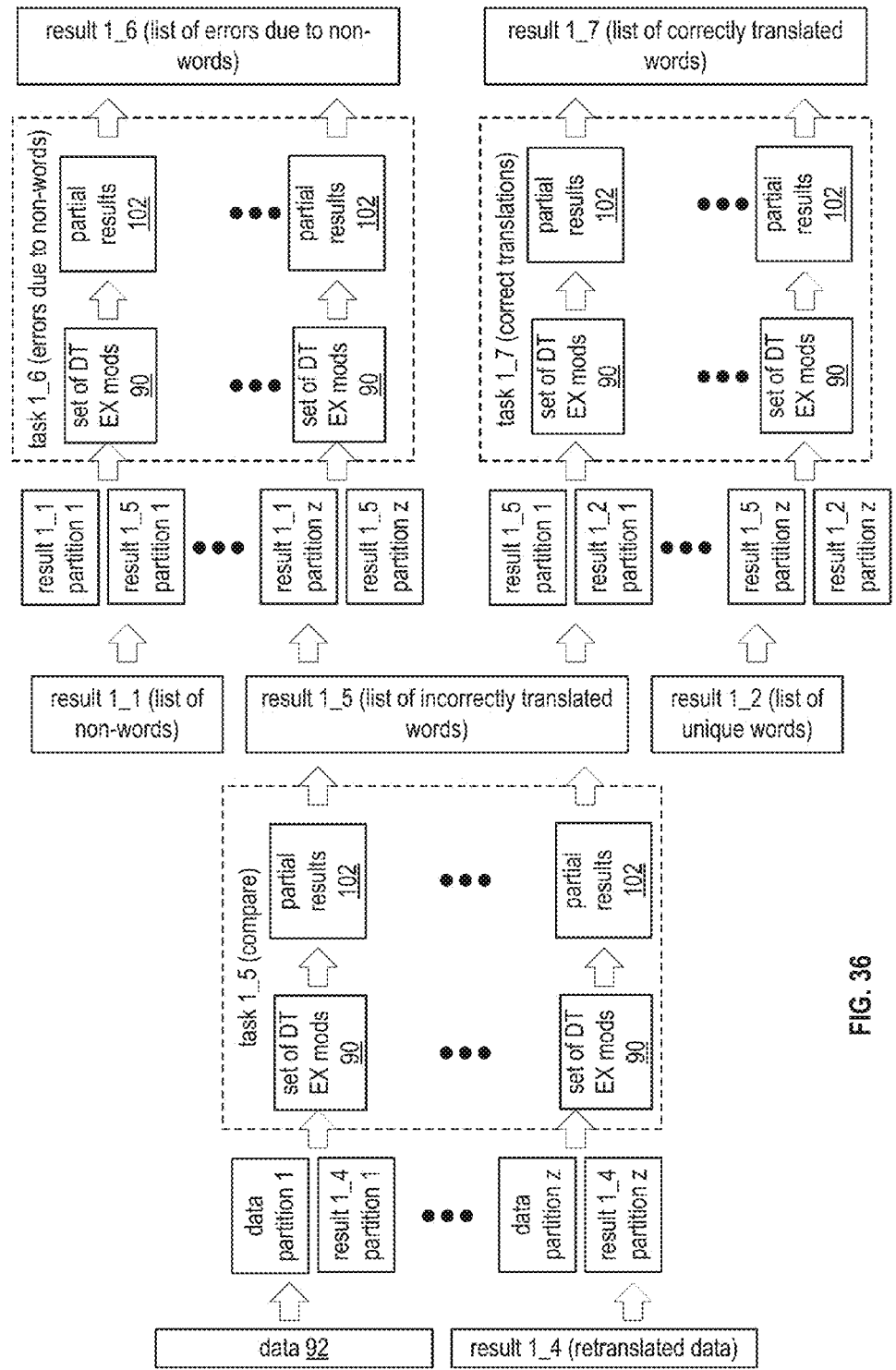

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
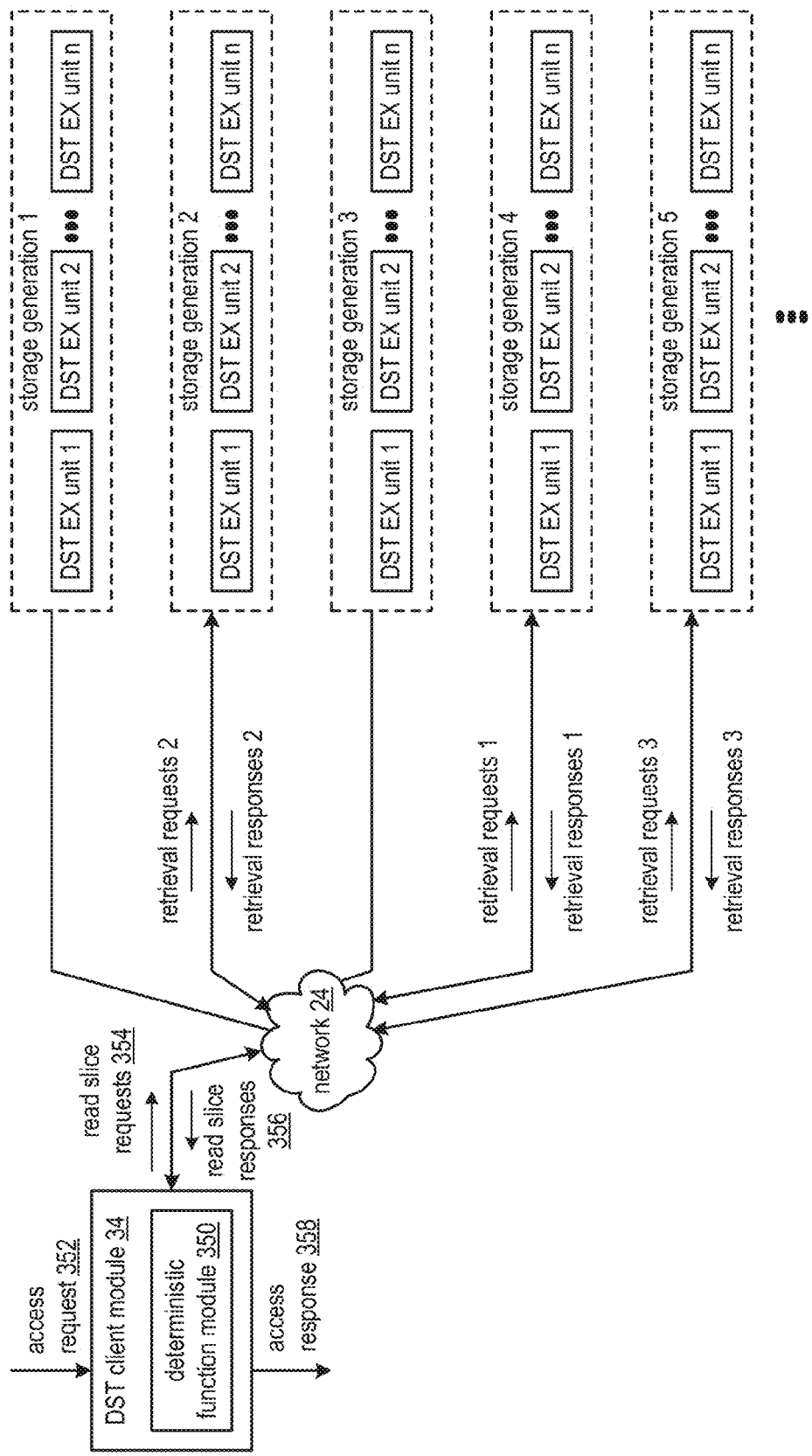
FIG. 40A is a schematic block diagram of an embodiment of a dispersed storage network (DSN) in accordance with the present invention.

FIG. 40A is a schematic block diagram of an embodiment of a dispersed storage network (DSN) that includes the distributed storage and task (DST) client module 34 of FIG. 1, the network 24 of FIG. 1, and a plurality of storage generations including storage generations 1-5. The DST client module 34 includes a deterministic function module 350. The deterministic function module 350 may be implemented utilizing the processing module 84 of FIG. 3. Each storage generation includes a set of DST execution (EX) units 1-*n*. Each DST execution unit may be implemented utilizing the DST execution unit 36 of FIG. 1.

The DSN functions to retrieve multi-generational stored data from the plurality of storage generations. In an example of operation of the retrieving of the multi-generational stored data, the DST client module 34 receives an access request 352 associated with a data object. The access request 352 includes one or more of a data object name (e.g., foo), a request type indicator (e.g., read, write, delete, update, list; i.e. a retrieval request), and a requesting entity identifier (ID). Having received the access request 352, the DST client module 34 obtains a vault identifier (ID) associated with the access request 352. The obtaining includes at least one of performing a lookup using the data object name and identifying an affiliation between the access request and the vault ID (e.g., a relationship between the requesting entity ID and the vault ID). For example, the DST client module 34 accesses system registry information using the requesting entity ID to look up the vault ID.

Having obtained the vault ID, the DST client module 34 generates, based on the data object name, a first retrieval request for retrieving metadata addressing information, where the first retrieval request is formatted in accordance with a read request format of the DSN (e.g., read slice requests 354). The generating includes generating a set of first level read requests (e.g., retrieval requests 1) for retrieving at least a decode threshold number of metadata addressing information slices, where the metadata addressing information includes addressing information regarding storage of metadata (e.g., a storage generation identifier) within the DSN, where the metadata addressing information was dispersed storage error encoded to produce a set of metadata addressing information slices, and where the decode threshold number of metadata addressing information slices represents a minimum number of metadata addressing information slices of the set of metadata addressing information slices that is required to recover the metadata addressing information. The generating further includes identifying a storage generation of the plurality of storage generations based on the access request 352. For example, the deterministic function module 350 performs a deterministic function on the data object name of the access request 352 to produce at least a portion of a DSN address associated with the set of first level read requests (e.g., identifying which fixed generation of the plurality of generations, i.e. generation 4). The deterministic function includes at least one of a hash based message authentication code, a hashing function, a mask generating function, and a sponge function. The operation of the deterministic function module 350 is discussed in greater detail with reference to FIG. 40B.

Having generated the set of first level read requests of the first retrieval request, the DST client module 34 sends, via the network 24, the retrieval requests 1 to the DST execution units of the storage generation 4 (e.g., the identified fixed generation associated with the data object name), receives read slice responses 356 that includes retrieval responses 1, and extracts the at least a decode threshold number of metadata addressing information slices from the read slice responses 356. Having produced the at least a decode threshold number of metadata addressing information slices, the DST client module 34 dispersed storage error decodes the least a decode threshold number of metadata addressing information slices to recover the metadata addressing information. Having recovered the metadata addressing information, the DST client module 34 extracts the addressing information regarding the storage of the metadata. For instance, the DST client module 34 extracts the addressing information regarding the storage of the metadata to identify the storage generation 2 (e.g., the metadata was previously stored in the storage generation 2).

Having retrieved the metadata addressing information, the DST client module 34 generates, based on the retrieved metadata addressing information, a second retrieval request for retrieving metadata (e.g., of the data object), where the second retrieval request is formatted in accordance with the read request format of the DSN. The metadata includes one or more of addressing information regarding storage of a plurality of sets of encoded data slices of the data object within the DSN (e.g., a source name of the data object, a plurality of sets of slice names of the data object, a virtual DSN address associated with storage of the data object), a data size indicator, a data type indicator, a data priority indicator, a data owner identifier, a data recipient identifier, an access control list of the data, a timestamp, the data object name, the vault identifier, a DSN address of a directory, a DSN address of an index node of a dispersed hierarchical index, a generation pointer DSN address (e.g., the DSN address associated with the set of first level read requests), and any other information that is associated with the data object.

The generating the second retrieval includes generating, based on the metadata addressing information, a set of second level read requests (e.g., retrieval request 2) for retrieving at least a decode threshold number of metadata slices (e.g., a same or different decode threshold number as the decode threshold number of metadata addressing information slices), where the metadata includes the addressing information regarding the storage of the plurality of sets of encoded data slices of the data object within the DSN, where the metadata was dispersed storage error encoded to produce a set of metadata slices, and where the decode threshold number of metadata slices represents a minimum number of metadata slices of the set of metadata slices that is required to recover the metadata.

Having generated the set of second level requests of the second retrieval request, the DST client module 34 sends, via the network 24, the retrieval requests 2 to the DST execution units of the storage generation 2 (e.g., as indicated by the metadata addressing information), receives further read slice response 356 that includes retrieval responses 2, and extracts the at least a decode threshold number of metadata slices from the further read slice responses 356. Having produced the at least a decode threshold number of metadata slices, the DST client module 34 dispersed storage error decodes the at least a decode threshold number of metadata slices to recover the metadata as retrieved metadata.

Having recovered the metadata, the DST client module 34 generates, based on the retrieved metadata, a third retrieval request for retrieving at least a portion of the data object associated with the data object name, wherein the third retrieval request is formatted in accordance with the read request format of the DSN. The generating the third retrieval request includes generating, based on the retrieved metadata, at least one set of third level read requests (e.g., retrieval request 3) for retrieving at least a decode threshold number of encoded data slices (e.g., a same or different decode threshold number as the decode threshold number is associated with the metadata addressing information and the metadata), where the data object was dispersed storage error encoded to produce a plurality of sets of encoded data slices that were stored in a corresponding storage generation, and where the decode threshold number of encoded data slices represents a minimum number of encoded data slices of a set of the plurality of sets of encoded data slices that is required to recover the portion of the data object.

Having generated the at least one set of third level read requests, the DST client module 34 sends, via the network 24, the retrieval requests 3 to the DST execution units of the storage generation 5 (e.g., as indicated by the metadata), receives still further read slice responses 356 that includes retrieval responses 3, and for each set of encoded data slices, extracts the at least a decode threshold number of encoded data slices from the still further read slice responses 356. Having produced, for each set of encoded data slices, the at least a decode threshold number of encoded data slices, the DST client module 34 dispersed storage error decodes, for each set of encoded data slices, the at least a decode threshold number of encoded data slices to recover the data object as a recovered data object. Having recovered the data object, the DST client module 34 issues an access response 358 that includes the recovered data object.

Figure 40B:
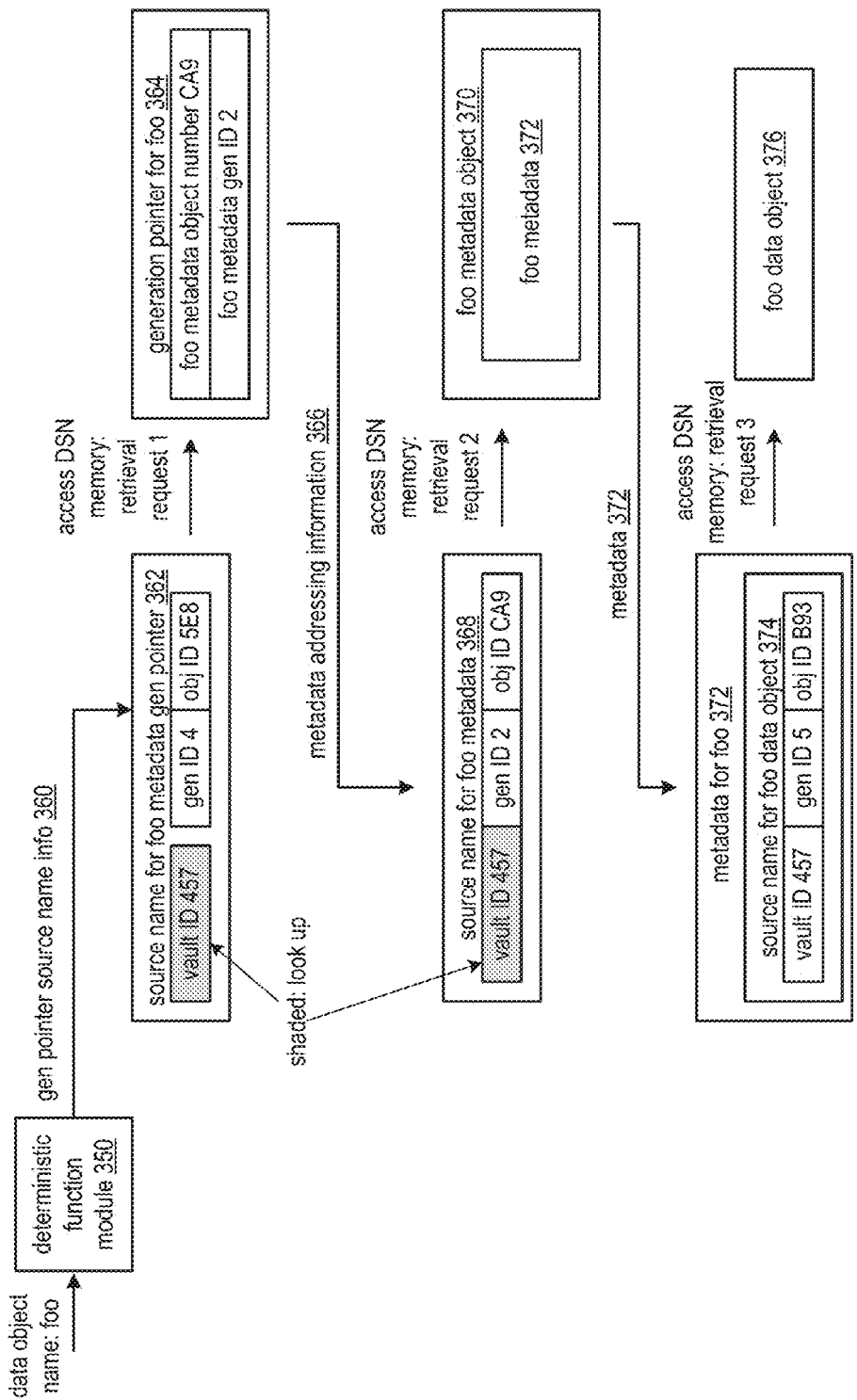
FIG. 40B is a schematic block diagram illustrating an embodiment of a deterministic function module utilized to retrieve data in accordance with the present invention.

FIG. 40B is a schematic block diagram illustrating an embodiment of the deterministic function module 350 of FIG. 40A utilized to retrieve data. As a still further example of operation of the retrieving of the multi-generational stored data as discussed with reference to FIG. 40A, the deterministic function module 350 performs the deterministic function on the data object name of the access request 352 to produce a digital value that includes generation pointer source name information 360. For example, the deterministic function module 350 performs a mask generating function on a data object name of foo to produce the digital value.

Having performed the deterministic function, the deterministic function module 350 (e.g., or hereafter, any other processing module) uses a first portion of the digital value as a generation identifier of the read request format of the DSN and uses a second portion of the digital value as an object identifier of the read request format of the DSN. For example, the deterministic function module 350 uses the first portion as a generation identifier (ID) 4 and the second portion as an object ID 5E8.

Having identified the generation ID and object ID, the deterministic function module 350 generates the first retrieval request by determining a vault identifier associated with the data object. For example, the deterministic function module 350 performs a system registry lookup utilizing an identifier of a requesting entity to identify a vault ID of 457. Having identified the vault ID, the deterministic function module 350 uses the vault identifier in a vault identifier field of the read request format of the DSN. For example, the deterministic function module 350 generates a source name for a foo metadata generation pointer 362 to include the vault ID of 457, the generation ID 4, and the object ID of 5E8; and generates the first retrieval request to include the foo metadata generation pointer 362.

Having generated the first retrieval request, the deterministic function module 350 accesses the DSN by sending the first retrieval request to the storage generation 4, receives metadata addressing information slices of a generation pointer for foo 364, and decodes the received metadata addressing information slices to reproduce metadata addressing information 366. The metadata addressing information 366 includes a foo metadata object number of CA9 and a foo metadata generation ID 2.

Having reproduced the metadata addressing information 366, the deterministic function module 350 generates the second retrieval request by extracting a generation identifier (e.g., generation 2) and an object identifier (e.g., CA9) from the metadata addressing information 366. Next, the deterministic function module 350 determines the vault identifier associated with the data object. Having determined the vault ID, the deterministic function module 350 generates a source name for foo metadata 368 of the second retrieval request by using the generation identifier (e.g., 2) in a generation identifier field of the read request format of the DSN, using the object identifier (e.g., CA9) in an object identifier field of the read request format of the DSN, and using the vault identifier (e.g., 457) in a vault identifier field of the read request format of the DSN.

Having generated the second retrieval request, the deterministic function module 350 accesses the DSN by sending a second retrieval request to the storage generation 2, receives metadata slices of a foo metadata object 370, and decodes the received metadata slices to reproduce the metadata 372 (e.g., for foo). The metadata for foo 372 includes a source name for the foo data object 374.

Figure 40C:
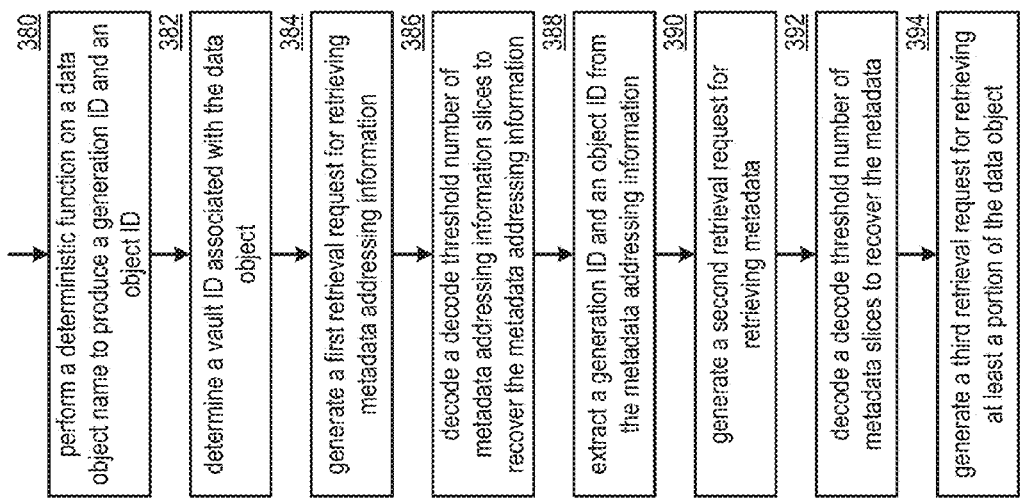
FIG. 40C is a flowchart illustrating an example of retrieving multi-generational stored data in accordance with the present invention.

Having reproduce the metadata for foo 372, the deterministic function module 350 generates the third retrieval request by using fields of the source name for foo data object 374 (e.g., vault ID 457, generation ID 5, object ID B93). Having generated the third retrieval request, the deterministic function module 350 accesses the DSN by sending the third retrieval request to the storage generation 5, receives encoded data slices of a stored foo data object 376, dispersed storage error decodes the received encoded data slices to reproduce the data object foo. FIG. 40C is a flowchart illustrating an example of retrieving multi-generational stored data. In particular, a method is presented for use in conjunction with one or more functions and features described in conjunction with FIGS. 1-39, 40A-B, and also FIG. 40C. The method begins at step 380 where a processing module of a computing device of one or more computing devices of a dispersed storage network (DSN) performs a deterministic function on a data object name of a data object for retrieval to produce a digital value. Having produced the digital value, the processing module uses a first portion of the digital value as a generation identifier (ID) of a read request format of the DSN for a first retrieval request and uses a second portion of the digital value as an object identifier of the read request format of the DSN of the first retrieval request.

The method continues at step 382 where the processing module determines a vault identifier associated with the data object. For example, the processing module utilizes a requesting entity ID to perform a system registry lookup to produce the vault ID. As another example, the processing module utilizes the data object name and performs a directory lookup to produce the vault ID. Having produced the vault ID, the processing module uses the vault identifier in a vault identifier field of the read request format of the DSN of the first retrieval request.

The method continues at step 384 where the processing module generates, based on the data object name, the first retrieval request for retrieving metadata addressing information, where the first retrieval request is formatted in accordance with the read request format of the DSN (e.g., the first retrieval request includes the vault ID, the generation ID, and the object ID corresponding to a DSN address associated with the metadata addressing information). The generating the first retrieval request includes generating a set of first level read requests for retrieving at least a decode threshold number of metadata addressing information slices, where the metadata addressing information includes addressing information regarding storage of the metadata within the DSN, where the metadata addressing information was dispersed storage error encoded to produce a set of metadata addressing information slices, and where the decode threshold number of metadata addressing information slices represents a minimum number of metadata addressing information slices of the set of metadata addressing information slices that is required to recover the metadata addressing information.

The method continues at step 386 where the processing module decodes the least a decode threshold number of metadata addressing information slices to recover the metadata addressing information. For example, the processing module sends the first level read requests to storage units of the DSN, receives the at least a decode threshold number of metadata addressing information slices, and dispersed storage error decodes the at least a decode threshold number of metadata addressing information slices to produce retrieved metadata addressing information.

The method continues at step 388 where the processing module extracts a generation identifier and an object identifier from the metadata addressing information. Having extracted the generation ID of the object ID, the processing module uses the generation identifier in a generation identifier field of the read request format of the DSN for a second retrieval request and uses the object identifier in an object identifier field of the read request format of the DSN for the second retrieval request. The processing module may further determine the vault identifier associated with the data object (e.g., with metadata) and use the vault identifier in a vault identifier field of the read request format of the DSN for the second retrieval request.

The method continues at step 390 where the processing module generates, based on the retrieved metadata addressing information, the second retrieval request for retrieving metadata, where the second retrieval request is formatted in accordance with the read request format of the DSN (e.g., the second retrieval request includes the vault ID of the metadata, the generation ID of the metadata, and the object ID of the metadata corresponding to a DSN address associated with the metadata). The generating the second retrieval request includes generating, based on the metadata addressing information, a set of second level read requests for retrieving at least a decode threshold number of metadata slices, where the metadata includes addressing information regarding storage of a plurality of sets of encoded data slices of the data object within the DSN, where the metadata was dispersed storage error encoded to produce a set of metadata slices, and where the decode threshold number of metadata slices represents a minimum number of metadata slices of the set of metadata slices that is required to recover the metadata.

The method continues at step 392 where the processing module decodes the at least a decode threshold number of metadata slices to recover the metadata. For example, the processing module sends the second level read requests to the storage units of the DSN, receives the at least a decode threshold number of metadata slices, and dispersed storage error decodes the at least a decode threshold number of metadata slices to produce retrieved metadata.

The method continues at step 394 where the processing module generates, based on the retrieved metadata (e.g., using the addressing information regarding the storage of the plurality of sets of encoded data slices of the data object), a third retrieval request for retrieving at least a portion of the data object associated with the data object name, where the third retrieval request is formatted in accordance with the read request format of the DSN. The generating includes the processing module generating, based on the metadata, at least one set of third level read requests for retrieving at least a decode threshold number of encoded data slices, where the data object was dispersed storage error encoded to produce a plurality of sets of encoded data slices, and where the decode threshold number of encoded data slices represents a minimum number of encoded data slices of a set of the plurality of sets of encoded data slices that are required to recover the portion of the data object. For example, the processing module sends the third level read requests to the storage units of the DSN, receives the at least a decode threshold number of encoded data slices for each set of the plurality of sets of encoded data slices, and dispersed storage error decodes each of the at least a decode threshold number of encoded data slices to produce a retrieved data object.

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

Figure 41A:
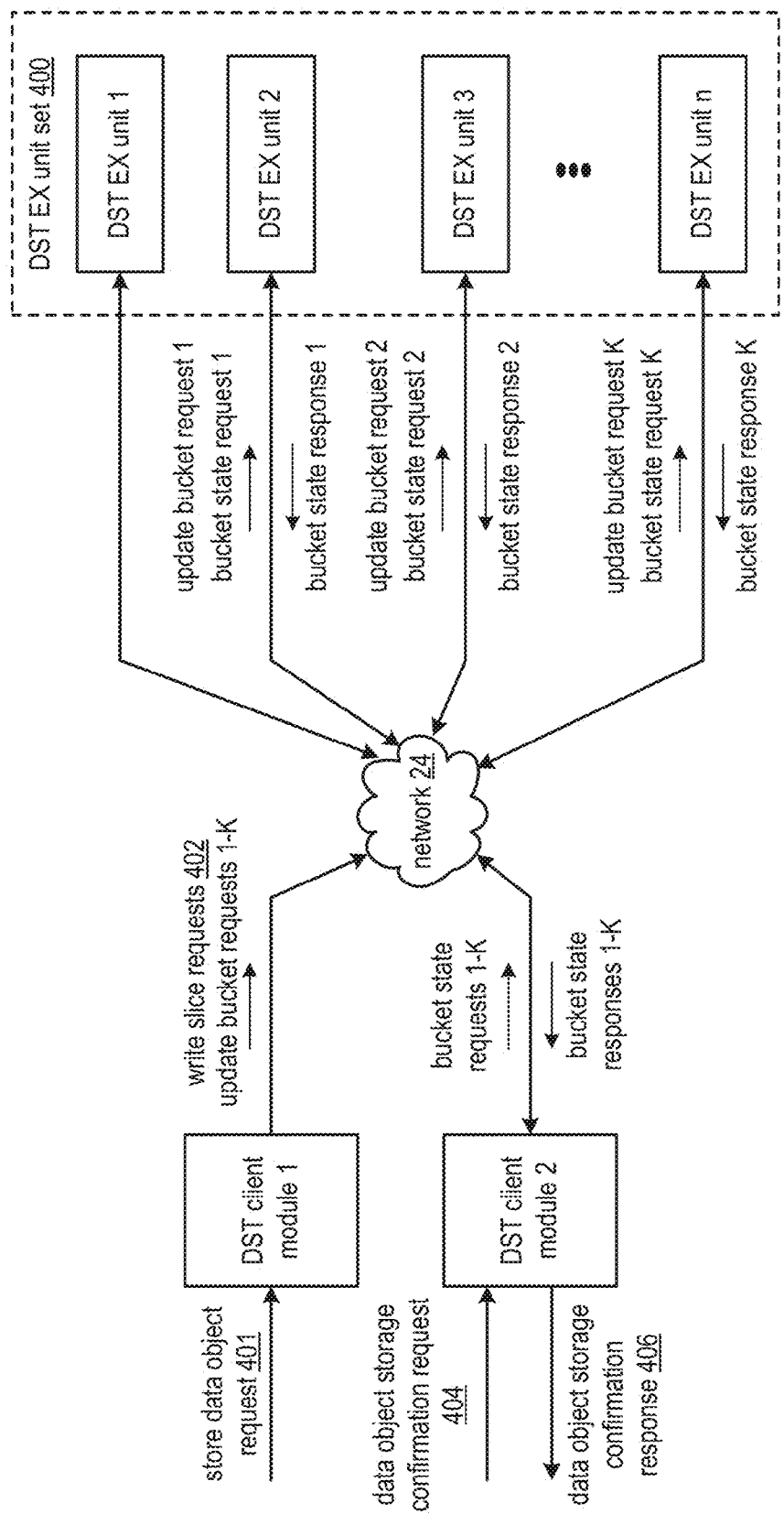
FIG. 41A is a schematic block diagram of another embodiment of a dispersed storage network (DSN) in accordance with the present invention.

FIG. 41A is a schematic block diagram of another embodiment of a dispersed storage network (DSN) that includes two or more distributed storage and task (DST) client modules 1-2, the network 24 of FIG. 1, and a DST execution (EX) unit set 400. The DST execution unit set 400 includes a set of DST execution units 1-$n$. Each DST execution unit may be implemented utilizing the DST execution unit 36 of FIG. 1. Each DST client module may be implemented utilizing the DST client module 34 of FIG. 1.

The DSN functions to store a data object in the DST execution unit set 400 and to provide confirmation of the storage of the data object in the DST execution unit set. In an example of operation to store the data object, the DST client module 1 receives a store data object request 401 that includes a data object and an object name of the data object. The DST client module 1 facilitates storage of the data object in the DST execution unit set 400. For example, the DST client module 1 dispersed storage error encodes the data object to produce a plurality of sets of encoded data slices, generates a plurality of sets of slice names to correspond to the plurality of sets of encoded data slices, generates one or more sets of write slice requests 402 that includes the plurality of sets of encoded data slices and the plurality of sets of slice names, sends, via the network 24, the one or more sets of write slice requests 402 to the set of DST execution units 1-n.

Having facilitated the storage of the data object in the DST execution unit set, the DST client module 1 applies K unique deterministic functions to the object name to produce K deterministic values 1-K, where each deterministic value ranges from 1-M and where M indicates a number of buckets. Each DST execution unit is associated with a portion of the deterministic range values of 1-M in accordance with a bucket mapping scheme. For example, each DST execution unit is associated with M/n buckets when the bucket mapping scheme includes even distribution. For instance, DST execution unit 1 is associated with a first nth amount of the deterministic range value 1-M, DST execution unit 2 is associated with a next and amount of the deterministic range values 1-M, etc.

For each deterministic value 1-K, the DST client module 1 identifies a corresponding DST execution unit of the set of DST execution units based on the deterministic value and the bucket mapping scheme. Having identified the corresponding DST execution unit for each of the deterministic values, the DST client module 1 issues update bucket requests 1-K to at least some of the DST execution units in accordance with the identified corresponding DST execution units. Each bucket request includes the corresponding deterministic value of the range 1-M.

The DST execution units (e.g., K or less) receives the update bucket requests 1-K and updates a value of a locally stored bucket to indicate an active state receiving an update bucket request that corresponds to a deterministic value associated with the bucket. For example, DST execution unit 2 receives the update bucket request 1 to update a bucket associated with a deterministic value of 150,000 when M=1 million buckets and n=10 DST execution units (e.g., and each DST execution unit is mapped to 100,000 buckets).

In an example of operation to provide the confirmation of storage of the data object, the DST client module 2 receives a data object storage confirmation request 404, where the data object storage confirmation request 404 includes the object name of the data object. The DST client module 2 applies the K unique deterministic functions to the received object name to produce the K deterministic values 1-K. For each deterministic value, the DST client module 2 identifies the corresponding DST execution unit in accordance with the bucket mapping scheme.

Having identified each corresponding DST execution unit, the DST client module 2 sends, via the network 24, bucket state requests 1-K to the corresponding DST execution units, where the bucket state requests 1-K includes the deterministic values 1-K. The DST client module 2 receives bucket state responses 1-K from the DST execution units, where each bucket state response indicates the state of the bucket (e.g., active, inactive).

Having received the bucket state responses, the DST client module 2 determines whether the data object is stored in the DST execution unit set based on the received bucket state responses. As a specific example, the DST client module 2 indicates that the data object is possibly stored when a number of the received bucket state responses that indicate the active state is greater than or equal to a high threshold level. For instance, the DST client module 2 indicates that the data object is possibly stored when the all K responses indicate the active state and the height threshold level is K. As another specific example, the DST client module 2 indicates that the data object is not stored when the number of the received bucket state responses indicates that indicate the inactive state is greater or equal to a than a low threshold level. For instance, the DST client module 2 indicates that the data object is not stored when just one of the K responses indicates the inactive state and the low threshold level is 1. Having determined whether the data object is stored, the DST client module 2 outputs a data object storage confirmation response 406 that includes the indication of possible storage or the indication of non-storage.

Figure 41B:
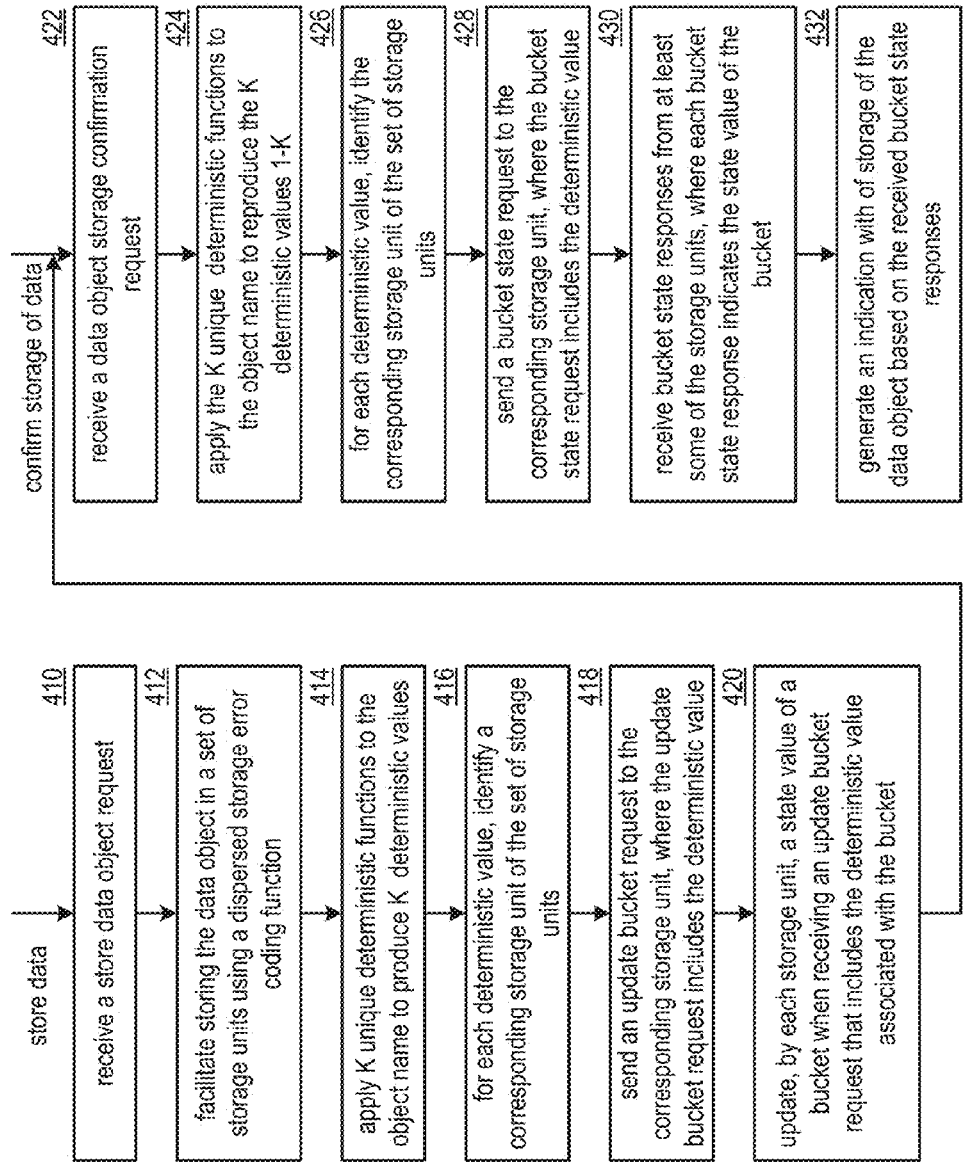
FIG. 41B is a flowchart illustrating an example of confirming storage of a data object in accordance with the present invention.

FIG. 41B is a flowchart illustrating an example of confirming storage of a data object. The method begins or continues, when storing data, at step 410 where a processing module (e.g., of a distributed storage and task (DST) client module) receives a store data object request that includes a data object and an object name of the data object. The method continues at step 412 where the processing module facilitates storing the data object in a set of storage units using a dispersed storage error coding function. The method continues at step 414 where the processing module applies K unique deterministic functions to the object name to produce K deterministic values. Each deterministic value falls within a range of 1-M.

For each deterministic value, the method continues at step 416 where the processing module identifies a corresponding storage unit of the set of storage units based on the deterministic value. For example, the processing module utilizes a bucket mapping scheme to identify each storage unit associated with each deterministic value. The method continues at step 418 where the processing module sends an update bucket request to the corresponding storage unit, where the update bucket request includes the deterministic value. The method continues at step 420 where each storage unit updates a state value of a bucket (e.g., to active) when receiving an update bucket request that includes the deterministic value associated with the bucket.

The method continues, when confirming storage of the data, at step 422 where the processing module receives a data object storage confirmation request. The data object storage confirmation request includes the object name of the data object. The method continues at step 424 where the processing module applies the K unique deterministic functions to the object name to produce the K deterministic values 1-K.

For each deterministic value, the method continues at step 426 where the processing module identifies the corresponding storage unit of the set of storage units based on the deterministic value and the bucket mapping scheme. The method continues at step 428 where the processing module sends a bucket state request to the corresponding storage unit, where the bucket state request includes the deterministic value.

The method continues at step 430 where the processing module receives bucket state responses from at least some of the storage units, where each bucket state response indicates the state value of the bucket. The method continues at step 432 where the processing module generates an indication of storage of the data object based on the received bucket state responses.

Figure 42A:
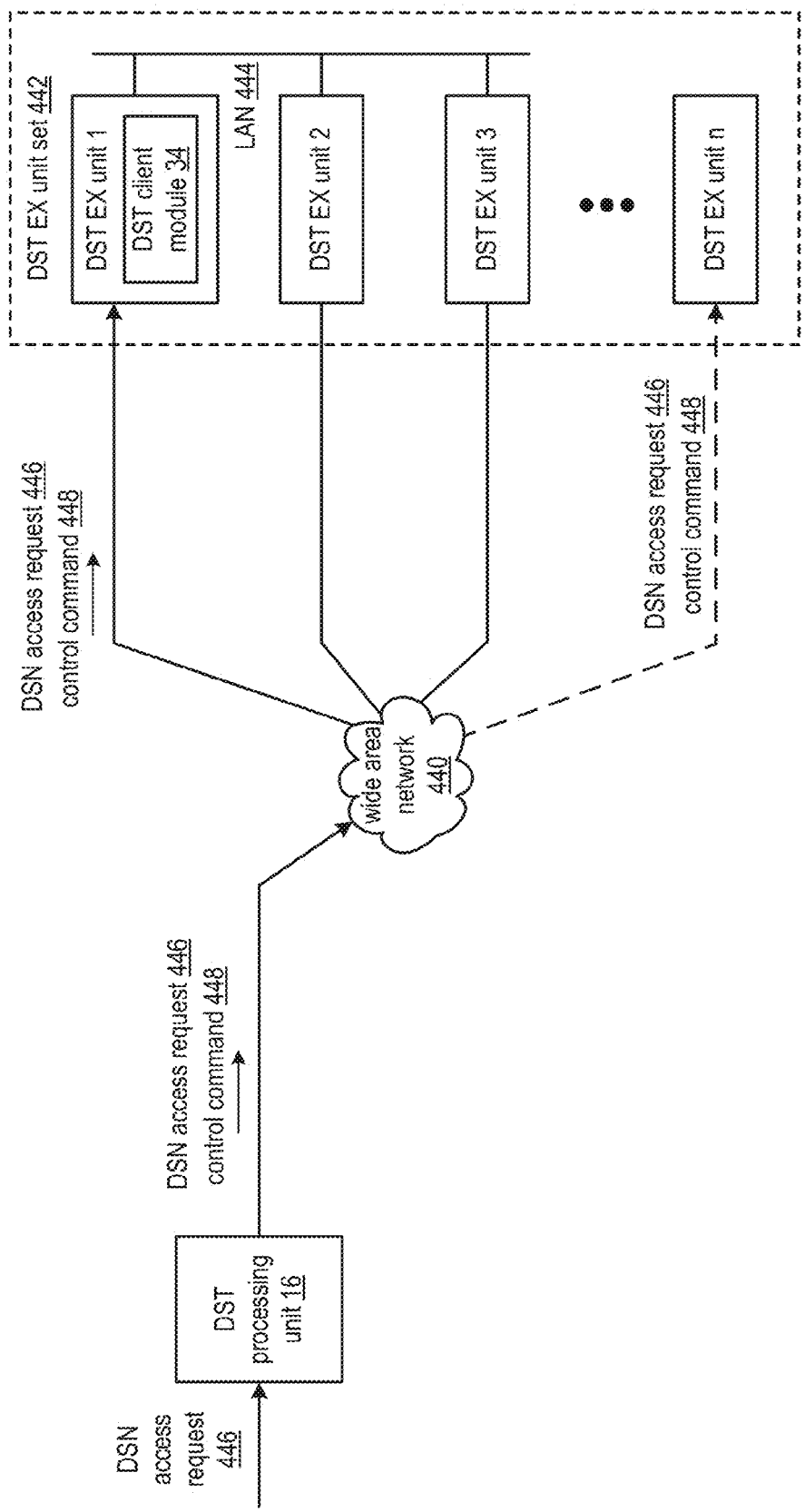
FIGS. 42A and 42B are a schematic block diagram of another embodiment of a dispersed storage network (DSN) in accordance with the present invention.
Figure 42B:
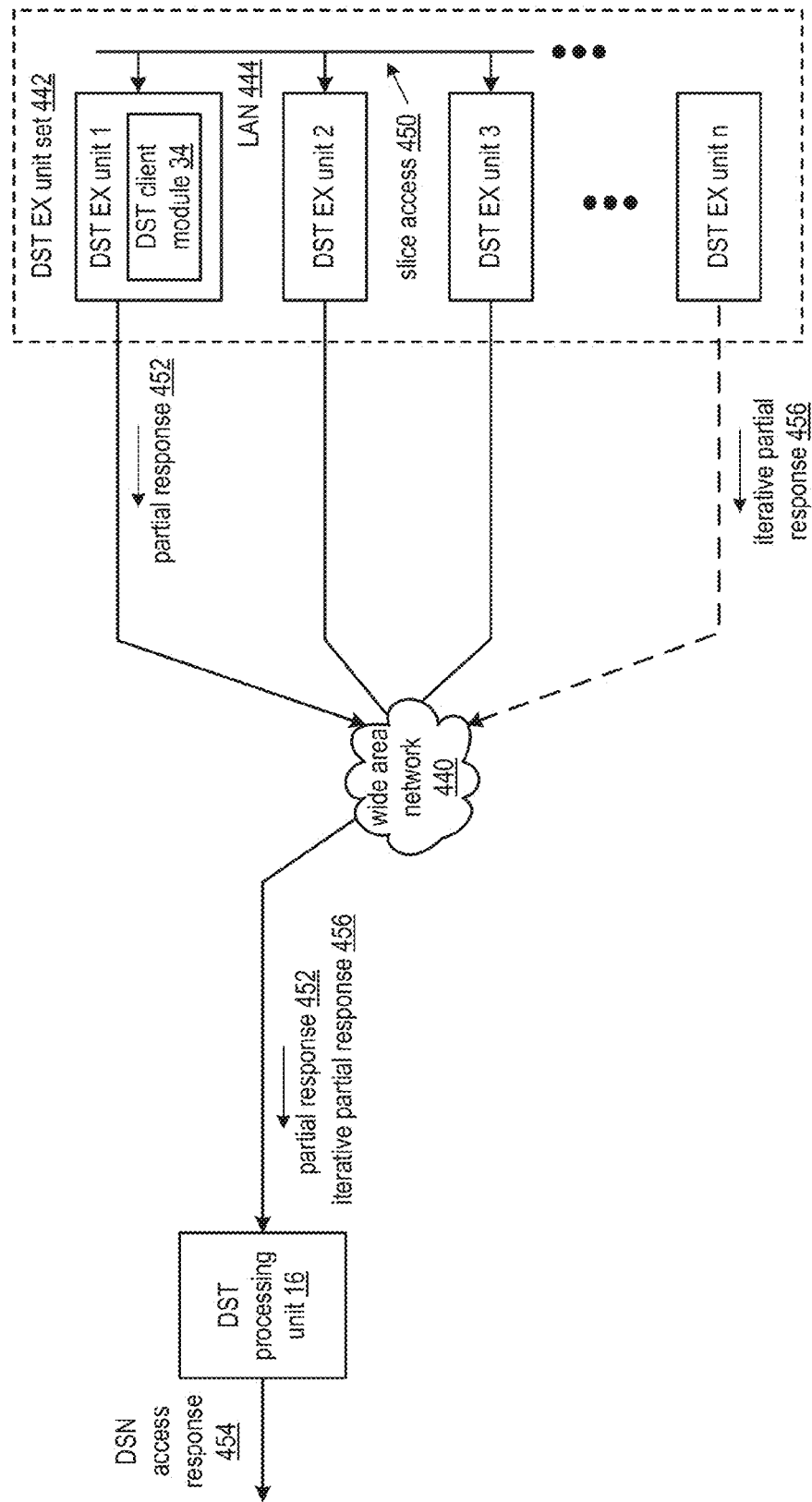

FIGS. 42A and 42B are a schematic block diagram of another embodiment of a dispersed storage network (DSN) that includes the distributed storage and task (DST) processing unit 16 of FIG. 1, a wide area network 440, and a DST execution (EX) unit set 442. The wide area network 440 may be implemented utilizing a wide area portion of the network 24 of FIG. 1. The DST execution unit set 442 includes a set of DST execution units 1-*n*. At least one DST execution unit includes the DST client module 34 of FIG. 1. Each DST execution unit may be implemented utilizing the DST execution unit 36 of FIG. 1. Hereafter, each DST execution unit may be referred to interchangeably as a storage unit of a plurality of storage units and/or a set of storage units. At least two or more of the DST execution units are operably coupled by a local area network 444. The local area network 444 may be implemented utilizing a local area network portion of the network 24.

The DSN functions to delegate an iterative storage unit access process to provide access to data stored in the DST execution unit set 442. The iterative storage unit access process includes one or more processing modules (e.g., of the DST processing unit 16, of the DST client module 34) performing one or more data storage address determination steps to produce addressing information with regards to the data to enable access to the data utilizing the addressing information.

The one or more data storage address determination steps includes iteratively accessing an addressing information structure utilizing information associated with the data to produce the addressing information. The addressing information structure includes at least one of a DSN directory (e.g., a flat list), utilization of a deterministic function (e.g., performing the deterministic function on the information associated with the data to produce at least a portion of the addressing information), and a dispersed hierarchical index (e.g., an index tree). The dispersed article index includes a tree index structure utilizing a plurality of levels where a top-level includes a root node for entry into the index for searches, a series of intermediate levels including index nodes that include index key references pointing to other nodes of the tree (e.g., iteratively searched utilizing index keys as the information associated with the data, and a lowest level of leaf nodes, where each leaf node includes an association of a search index key and a DSN address associated with the data storage. For example, a dispersed hierarchical index associated with the data is stored as a plurality of index nodes in the DST execution unit set 442, where each index node is dispersed storage error encoded to produce a set of index slices that are stored in the set of DST execution units 1-*n*. As such, one or more of the DST processing unit 16 and the DST client module 34 accesses one or more of the index nodes by accessing the stored index slices from the DST execution unit set 442. For instance, the DST client module 34 accesses five index nodes of the dispersed article index by iteratively recovering five index node objects from the set of DST execution units 1-*n* to ultimately produce the DSN address associated with the data to enable recovery of the data.

FIG. 42A illustrates steps of an example of operation of the delegating of the iterative storage unit access process where the DST processing unit 16 receives a DSN access request 446 from a requesting entity to access the data. The accessing includes at least one of storing the data, retrieving the data, listing the data, and deleting the data. The DSN access request 446 includes at least one of a request for the addressing information regarding data having one or more search criteria (e.g., index keys), where the iterative storage unit access process is executed to traverse the index tree to identify the data based on the one or more search criteria, and a request for the data having the one or more search criteria.

Having received the DSN access request 446, the DST processing unit 16 determines whether the DSN access request 446 involves the iterative storage unit access process. For example, the DST processing unit 16 indicates that the DSN access request 446 involves the iterative storage unit access process when the DSN access request 446 includes the search criteria.

When the DSN access request 446 involves the iterative storage unit access process, the DST processing unit 16 determines, based on configuration of the plurality of storage units storing data objects associated with the DSN access request 446, that a storage unit of the plurality of storage units is capable of executing at least a portion of the iterative storage unit access process better than the DST processing unit 16 (e.g., a computing device). For example, the DST processing unit 16 indicates that the DST execution unit 1 is capable of executing the at least a portion of the iterative storage in the process better than the DST processing unit 16 when the DST processing unit 16 determines that the DST execution unit 1 is capable of executing the at least a portion of the iterative storage unit access process better than the DST processing unit 16 when the DST execution unit 1 is coupled to a desired number (e.g., a decode threshold number minus 1, where a decode threshold number per set of encoded data slices is required for recovery) of other DST execution units of the plurality of DST execution units via the LAN connection 444.

As another example, the DST processing unit 16 indicates that the DST execution unit 1 is capable of executing the at least a portion of the iterative storage unit access process better than the DST processing unit 16 when the DST processing unit 16 determines that the DST execution unit 1 is coupled via the local area network (LAN) 444 connection to one or more other DST execution units of the plurality of DST execution units (e.g., storage units) and the DST processing unit 16 determines that a reduction in wide area network (WAN) communications (e.g., via the wide area network 440) constitutes better execution of the at least a portion of the iterative storage unit access process (e.g., more efficient to access the index nodes of the index tree via the land 444 than over the wide area network 440). The reduction in WAN communications includes at least one of a reduction in WAN traffic and a reduction in latency of processing the at least a portion of the iterative storage unit access process.

Having identified the DST execution unit (e.g., DST execution unit 1) that is capable of executing the at least a portion of the iterative storage unit access process better than the DST processing unit 16, the DST processing unit 16 sends, via the wide area network 440 (e.g., when coupled via the wide area network 440), the DSN access request 446 and a control command 448 to the storage unit (e.g., DST execution unit 1), where the control command 448 instructs the storage unit to perform at least a portion of the iterative storage unit access process. The control command 448 includes one or more of an instruction indicating a decode threshold number of storage units of the plurality of storage units to access while executing the at least a portion of the iterative storage unit access process, where at least one of the decode threshold number of storage units is coupled via a WAN connection to the storage unit, instructions to perform the iterative storage unit access process (e.g., the search criteria), and to provide a complete response (e.g., include the data) to the DSN access request.

Alternatively, or in addition to, the DST processing unit 16 sends, via the wide area network 440, the DSN access request 446 and another control command 448 to one or more storage units of a second sub-set of the plurality of storage units when the processing module sends the DSN access request 446 and the control command 448 to the storage unit when the storage unit represents a sub-set of the plurality of storage units to subsequently provide a collective response. For instance, the DST processing unit 16 sends the other control command 448 to the DST execution unit n when the DST execution unit n is required for the iterative storage unit access process but is not operably coupled to the DST execution unit 1 via the LAN 444.

FIG. 42B illustrates further steps of the example of operation of the delegating of the iterative storage unit access process where the DST processing unit 16 receives, via the wide area network 440 from the DST execution unit 1, at least a partial response 452 to the DSN access request 446. The partial response 452 includes at least one of a complete response that includes the recovered data, the addressing information regarding the data, and a group iteration partial response from the DST execution unit 1 that represents the collective response of the sub-set of the plurality of storage units. For example, the DST client module 34 performs slices accesses 450, via the LAN 444, to recover a decode threshold number of index slices for each index node in accordance with the iterative storage unit access process from a decode threshold number of DST execution units to identify the addressing information of the data, retrieves at least a decode threshold number of encoded data slices for each set of a plurality of encoded data slices of the data from the decode threshold number of DST execution units, for each set of encoded data slices, dispersed storage error decodes the retrieved decode threshold number of encoded data slices to reproduce the data, and issues, via the wide area network 440, the partial response 452 to the DST processing unit 16, where the partial response 452 includes the reproduced data. Having received the reproduced data, the DST processing unit 16 issues a DSN access response 454 to the requesting entity, where the DSN access response 454 includes the reproduced data.

Alternatively, or in addition to, for each iteration of the iterative storage unit access process, while receiving a group iteration partial response from the DST execution unit 1 that represents a collective response of a sub-set of the plurality of storage units, the DST processing unit 16 receives iterative partial responses from one or more DST execution units of the second sub-set of the plurality of storage units (e.g., an iterative partial response 456 from the DST execution unit n) and processes the group iterative partial response 456 and the iterative partial response 452 to produce the DSN access response 454 that includes an iterative response (e.g., the recovered data).

Figure 42C:
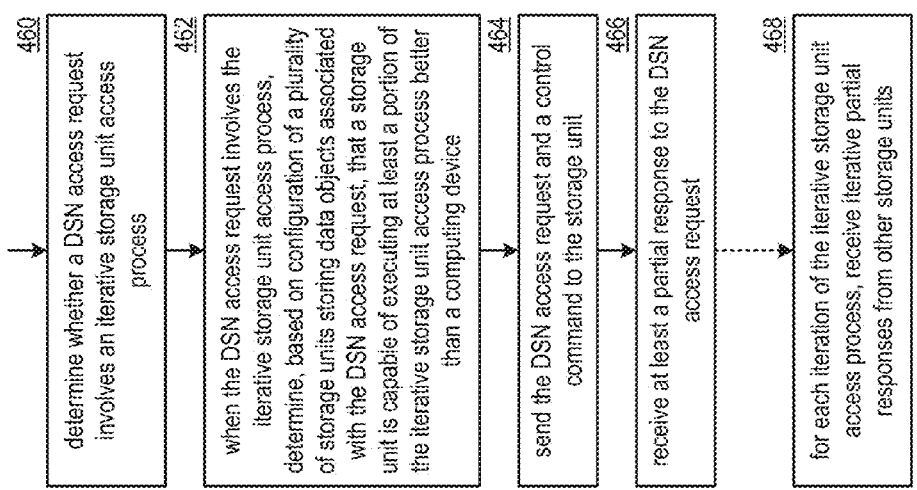
FIG. 42C is a flowchart illustrating an example of delegating an iterative storage unit access process in accordance with the present invention.

FIG. 42C is a flowchart illustrating an example of delegating an iterative storage unit access process. In particular, a method is presented for use in conjunction with one or more functions and features described in conjunction with FIGS. 1-39, 42A-B, and also FIG. 42C. The method begins at step 460 where a processing module of a computing device of one or more computing devices of a dispersed storage network (DSN) determines whether a DSN access request involves an iterative storage unit access process. For example, the processing module indicates that the DSN access request involves the iterative storage unit process when receiving search criteria for data to be retrieved.

When the DSN access request involves the iterative storage unit access process, the method continues at step 462 where the processing unit determines, based on configuration of a plurality of storage units storing data objects associated with the DSN access request, that a storage unit of the plurality of storage units is capable of executing at least a portion of the iterative storage unit access process better than the computing device. For example, the processing module indicates that the storage unit is capable of executing the at least a portion of the iterative storage unit access process better than the computing device (e.g., associated with the processing module) when the storage unit is coupled to a desired number of other storage units (e.g., a decode threshold number in total) of the plurality of storage units via a LAN connection. As another example, the processing module indicates that the storage unit is capable of executing the at least a portion of the iterative storage unit process better than the computing device when the processing module determines that the storage unit is coupled via a local area network (LAN) connection to one or more other storage units of the plurality of storage units and the processing module determines that a reduction in wide area network (WAN) communications constitutes better execution of the at least a portion of the iterative storage unit access process.

The method continues at step 464 where the processing module sends the DSN access request and a control command to the storage unit, where the control command instructs the storage unit to perform at least a portion of the iterative storage unit access process. The control command includes one or more of an instruction indicating a decode threshold number of storage units of the plurality of storage units to access while executing the at least a portion of the iterative storage unit access process, where at least one of the decode threshold number of storage units is coupled via a WAN connection to the storage unit, and instructions to perform the iterative storage unit access process and to provide a complete response to the DSN access request. Alternatively, or in addition to, the processing module sends the DSN access request and another control command to storage units of a second sub-set of the plurality of storage units when the processing module sends the DSN access request and the control command to the storage unit when the storage unit represents a sub-set of the plurality of storage units to subsequently provide a collective response (e.g., the recovered data).

The method continues at step 466 where the processing module receives, from the storage unit, at least a partial response to the DSN access request. The partial response includes at least one of a complete response that includes the recovered data, the addressing information regarding the data, and a group iteration partial response from the storage unit that represents the collective response of the sub-set of the plurality of storage units. When the other control command is utilized, for each iteration of the iterative storage unit access process, the method continues at step 468, while receiving a group iteration partial response from the storage unit that represents a collective response of a sub-set of the plurality of storage units, the processing module receives iterative partial responses from storage units of the second sub-set of the plurality of storage units and the processing module processes the group iterative partial response and the iterative partial responses to produce an iterative response (e.g., the recovered data).

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

Figure 43A:
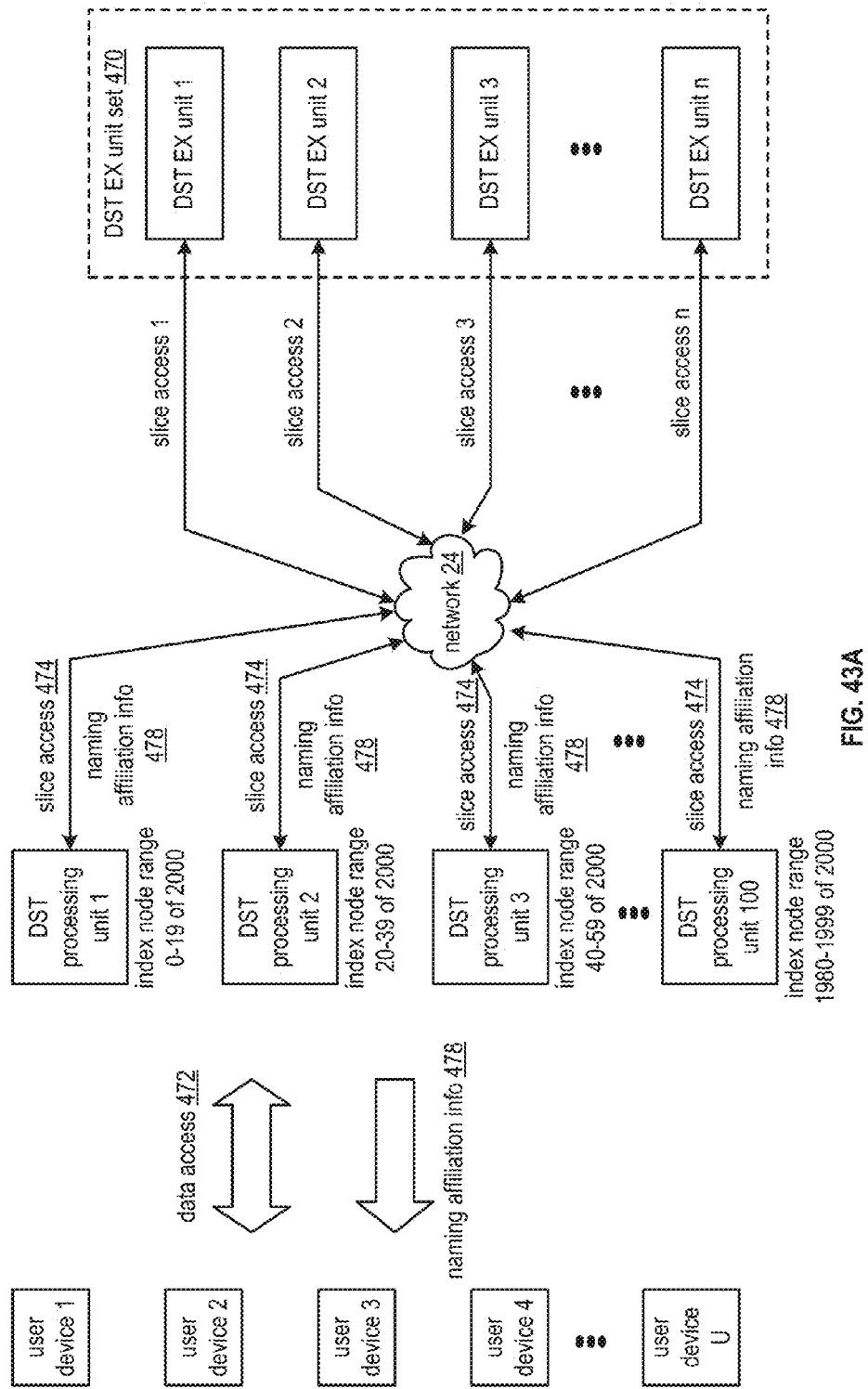
FIG. 43A is a schematic block diagram of another embodiment of a dispersed storage network (DSN) in accordance with the present invention.

FIG. 43A is a schematic block diagram of another embodiment of a dispersed storage network (DSN) that includes a plurality of user devices 1-U, a plurality of distributed storage and task (DST) processing units 1-100, the network 24 of FIG. 1, and a DST execution (EX) unit set 470. The DST execution unit set 470 includes a set of DST execution units 1-n. Each DST execution unit may be implemented utilizing the DST execution unit 36 of FIG. 1. Each user device may be implemented utilizing at least one of user device 12 of FIG. 1 and user device 14 of FIG. 1. Each DST processing unit may be implemented utilizing the DST processing unit 16 of FIG. 1.

The DSN functions to utilize multiple data access resources (e.g., the DST processing units) when accessing data stored in the DSN. In an example of operation of utilizing the multiple data access resources, a DST processing unit determines whether to update naming affiliation information 478 that associates index node index key range assignments of a dispersed hierarchical index to the plurality of DST processing units 1-100. The determining includes at least one of indicating to update based on detecting a branching factor change (e.g., a number of nodes at a level below a reference node), detecting a change in a number of available DST processing units, and interpreting performance information of one or more DST processing units.

The dispersed hierarchical index includes one root index node, one or more parent index nodes, and one or more index nodes. Each of the nodes (e.g., root index node, parent index nodes, index nodes) may be implemented utilizing a data object and includes entries of one or more of an associated index key range, pointers to other nodes, and pointers to data objects stored in a dispersed storage network (DSN). Such pointers includes a virtual DSN address (e.g., a source name) corresponding to a storage location the node and/or the data object within the DST execution unit set. Parent index nodes include pointers to child index nodes forming parent-child relationships. Nodes may also include pointers to sibling level nodes on a common level of the index. Each node is dispersed storage error encoded to produce a set of node slices and each set of node slices is stored via slice access 474 in the set of storage units of the DSN at a location corresponding to the DSN address of the node.

The dispersed hierarchical index may be constructed and maintain to include dimensions associated with one or more index attributes. Index attributes includes one or more of a maximum number of levels, a minimum number of levels (e.g., from the root index node at a top-level to the index nodes at a lowest level, a maximum number of child nodes in a parent-child node relationship, a minimum number of child nodes in the parent-child node relationship, a maximum number of sibling nodes and a common level, a minimum number of sibling nodes at the common level, a maximum number of entries in an index node, and a minimum number of entries in the index node.

The dispersed hierarchical index may be utilized to locate a storage location associated with a data object stored in the DST execution unit set of the DSN. For example, starting with the root index node, the dispersed hierarchical index is searched by matching a desired index key to an index key within an entry of an index node at the lowest level, where the entry of the index node corresponds to the desired data object. The search may include accessing successive lower levels of the index by comparing the desired index key to the index key ranges associated with nodes between the root index node and the index node of the lowest level that is associated with the desire data object. The lowest level of index nodes includes entries associated with the data objects stored in the DSN Each DST processing unit is associated with an index node index key range and may be associated with any level of the dispersed hierarchical index. For example, DST processing unit 1 is associated with an index node index key range of 0-19 of a maximum of 2000, DST processing unit 2 is associated with an index node index key range of 20-39 of the maximum of 2000, etc., through DST processing unit 100 is associated with an index node index key range of 1980-1999 of the maximum of 2000 when the index key range at one level below the root node level includes the maximum of 2000 and a mapping scheme includes even distribution of portions of the index key range.

When updating the naming affiliation information 478, the DST processing unit identifies a number of available DST processing units. The identifying includes at least one of initiating a query, receiving a query response, performing a lookup, and interpreting an error message. Having identified the number of available DST processing units, the DST processing unit determines a reference branching factor of the dispersed hierarchical index. For example, the DST processing unit counts a number of children nodes one level below the root node as the branching factor.

Having determined the branching factor, the DST processing unit identifies an index key type associated with the dispersed hierarchical index. For example, the DST processing unit accesses a metadata file associated with the dispersed particle index to extract the index key type. Having identified the index key type, the DST processing unit partitions the branching factor based on the number of available DST processing units in accordance with a partitioning scheme to produce an index node to DST processing unit mapping. For example, the DST processing unit indicates how many index nodes are to be associated with each DST processing unit, and which index nodes are to be associated with each DST processing unit.

Having partitioned the branching factor, the DST processing unit generates the updated naming affiliation information 478 based on the index node to the DST processing unit mapping and the index key type. For example, the DST processing unit identifies breakpoints in a continuum of index keys in accordance with the index key type for the branching factor number of index nodes and associates the breakpoints with each of the available DST processing units to produce the updated naming affiliation information 478. Having generated the updated naming affiliation information 478, the DST processing unit facilitates distribution of the updated naming affiliation information 478 to one or more of the plurality of DST processing units and the plurality of user devices.

With the naming affiliation updated, the DSN facilitates data access 472 by the user devices with the DST processing units in accordance with the updated naming affiliation information 478. As a specific example, a user device 3 selects DST processing unit 4 affiliated with an index key 62 based on the index node range of the DST processing unit 4 in accordance with the updated data affiliation information 478. Having selected the DST processing unit, the user device 3 exchanges data access 472 (e.g., sends data access requests to the DST processing unit 4, receives data access responses from the DST processing unit 4) with the selected DST processing unit 4. The DST processing unit 4 exchanges slice accesses 474 (e.g., slice access 1-n) with the set of DST execution units 1-n to facilitate the data access 472.

Figure 43B:
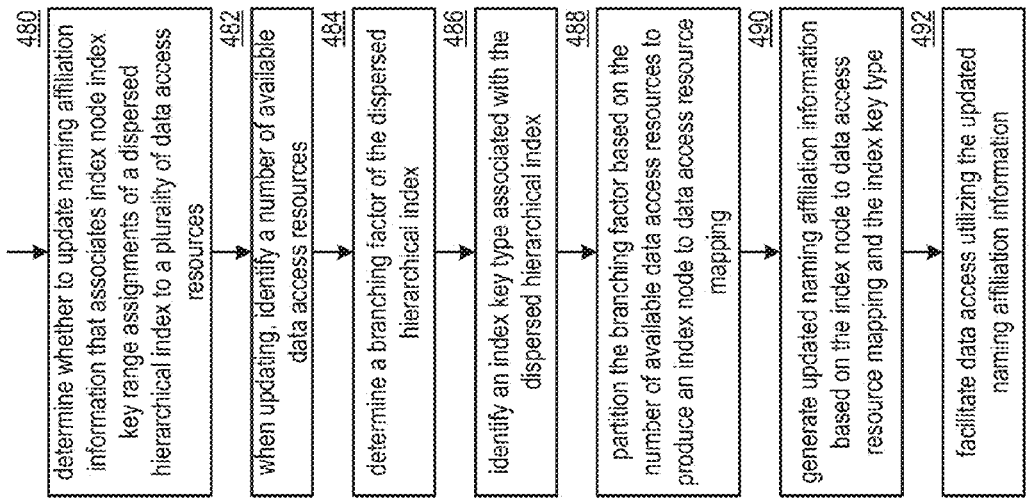
FIG. 43B is a flowchart illustrating an example of associating data access resources with an index in accordance with the present invention.

FIG. 43B is a flowchart illustrating an example of associating data access resources with an index. The method begins or continues at step 480 where a processing module (e.g., of a distributed storage and task (DST) processing unit) determines whether to update naming affiliation information that associates index node index key range assignments of a dispersed hierarchical index to a plurality of data access resources (e.g., to a plurality of DST processing units). The determining may be based on one or more of interpreting an update schedule, detecting a branching factor change, detecting a number of available data access resources, and interpreting performance information.

When updating, the method continues at step 482 where the processing module identifies a number of available data access resources. The identifying includes at least one of interpreting an error message, initiating a query, receiving a query response, and performing a lookup. The method continues at step 484 where the processing module determines a branching factor of the dispersed hierarchical index. The determining includes at least one of accessing the dispersed hierarchical index and counting a number of index nodes associated with at least one level below a root node level.

The method continues at step 486 where the processing module identifies an index key type associated with the dispersed hierarchical index. For example, the processing module accesses common index information associated with the dispersed hierarchical index to extract the index key type. The method continues at step 488 where the processing module partitions the branching factor based on the number of available data access resources to produce an index node to data access resource mapping. For example, the processing module divides the branching factor by the number of available data access resources to produce the index node to data access resource mapping.

The method continues at step 490 where the processing module generates updated naming affiliation information based on the index node to data access resource mapping and the index key type. For example, the processing module identifies index key ranges associated with each of the data access resources in accordance with the data access resource mapping and the index key type. The method continues at step 492 where the processing module facilitates data access utilizing the updated naming affiliation information. For example, the processing module distributes the updated naming affiliation information to accessing devices and to the data access resources. As another example, the access devices utilize the updated naming affiliation information to access the data access resources.

Figure 44A:
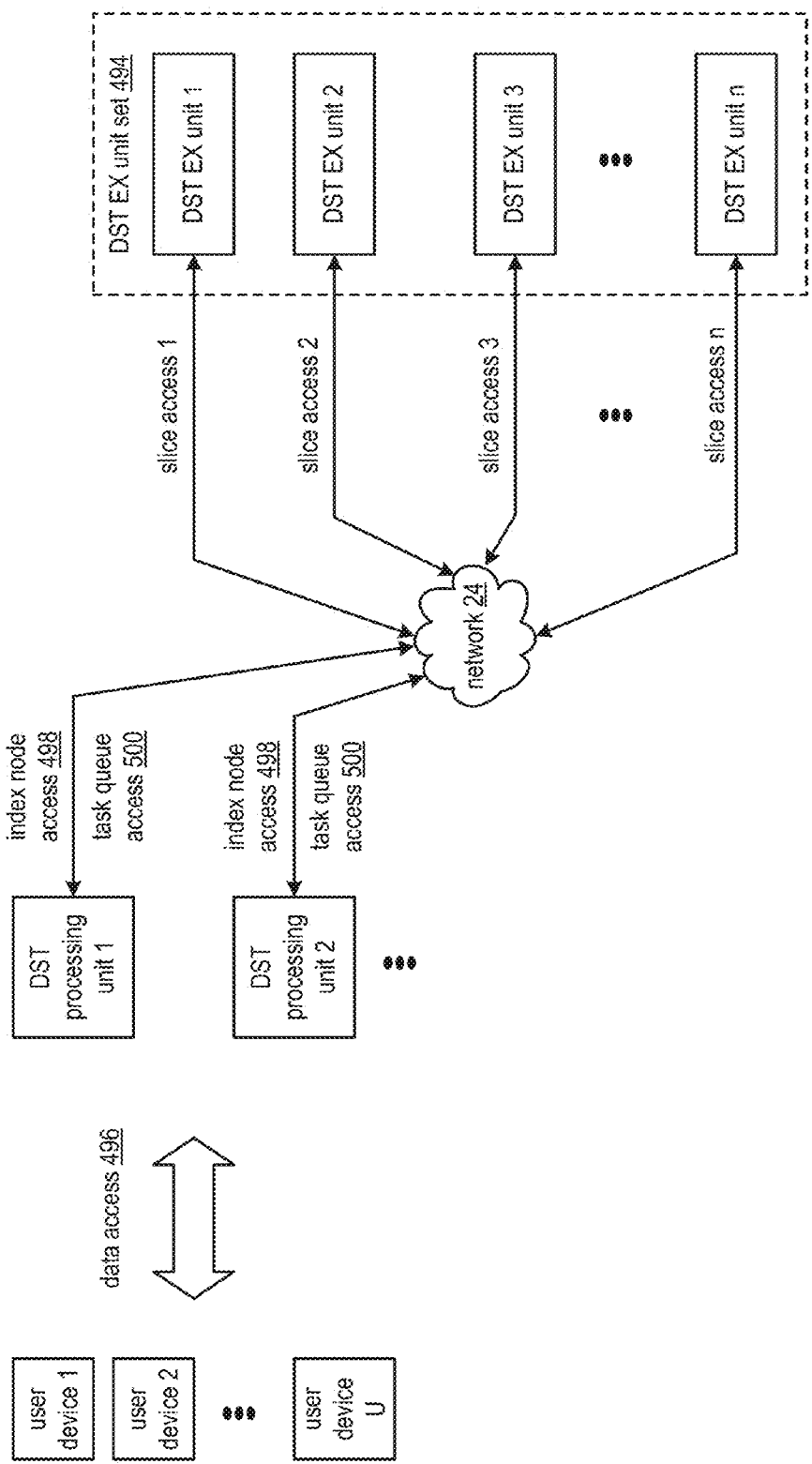
FIG. 44A is a schematic block diagram of another embodiment of a dispersed storage network (DSN) in accordance with the present invention.

FIG. 44A is a schematic block diagram of another embodiment of a dispersed storage network (DSN) that includes a plurality of user devices 1-U, two or more distributed storage and task (DST) processing units 1-2, the network 24 of FIG. 1, and a DST execution unit set 494. The DST execution unit set 494 includes a set of DST execution units 1-n. Each DST execution unit may be implemented utilizing the DST execution unit 36 of FIG. 1. Each user device may be implemented utilizing at least one of user device 12 of FIG. 1 and user device 14 of FIG. 1. Each DST processing unit may be implemented utilizing the DST processing unit 16 of FIG. 1.

The DSN functions to provide data access 496 to the plurality of user devices to data stored in the DST execution unit set 494 as sets of encoded data slices, where virtual DSN addresses of the sets of encoded data slices is maintained in a dispersed hierarchical index. The DSN further functions to update the dispersed hierarchical index that is stored in the DST execution unit set. In an example of operation of the updating of the dispersed hierarchical index, the DST processing unit 1 determines to update an index node of the dispersed hierarchical index in accordance with a pending update (e.g., identify a new entry, identify a modified entry, and identifying an entry for deletion). Having determined to update the index node, the DST processing unit 1 initiates the updating of the index node. For example, the DST processing unit 1 updates the index node to produce an updated index node; dispersed storage error encodes the updated index node to create a set of updated index node slices; issues index node access 498 by sending, via the network 24, slice access requests 1-n to the set of DST execution units to request storage of the set of updated index node slices associated with the updated index node; and receives index node access 498 as slice access responses 1-n indicating whether the storage of the set of updated index node slices is successful.

When the updating of the index node is not successful (e.g., the DST processing unit 1 interprets the slice access responses and indicates unsuccessful writing of the updated index node), the DST processing unit 1 generates a task entry of a task queue associated with the index node. The DST processing unit 1 generates the entry to include the updated index node and/or an update to a portion of the index node. Having generated the task entry, the DST processing unit 1 stores the task entry in the task queue. For example, the DST processing unit 1 generates a DSN address for the task entry by performing a deterministic function on a source name of the index node and an increment (e.g., increment an entry count by one) and stores the task entry using the source name. The storing includes dispersed storage error encoding the task entry to produce a set of task slices, generating a set of task slice names for the set of task slices based on the DSN address of the task entry, generating task queue access 500 to include a set of write slice requests 1-n that includes the set of task slices and the set of task slice names, and sending the set of write slice requests 1-n to the set of DST execution units 1-n.

The DST processing unit 2 subsequently accesses the index node. Having accessed the index node, the DST processing unit 2 determines whether the task queue associated with the index node includes at least one entry. The determining includes at least one of interpreting an entry count from the index node and interpreting results of attempting to access a first entry of the task queue.

When the task queue includes the at least one entry, the DST processing unit 2 initiates updating of the index node in accordance with the at least one entry. For example, the DST processing unit 2 updates the index node with a recovered updated index node of the entry or a recovered update of the entry to generate a newly updated index node. Having generated the newly updated index node, the DST processing unit 2 attempts to store the newly updated index node in the set of DST execution units (e.g., issuing write slice requests, receiving write slice responses). When the updating of the newly updated index node is successful, the DST processing unit 2 deletes the at least one entry from the task queue associated with the index node. For example, the DST processing unit 2 issues delete slice requests to the set of DST execution units, where the delete slice requests includes the set of slice names associated with the entry of the queue.

Figure 44B:
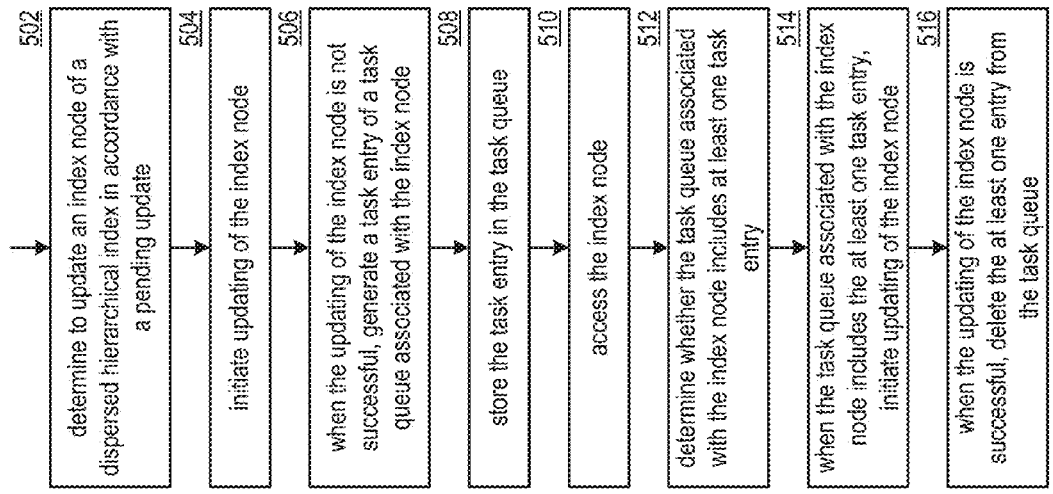
FIG. 44B is a flowchart illustrating an example of updating a dispersed hierarchical index in accordance with the present invention.

FIG. 44B is a flowchart illustrating an example of updating a dispersed hierarchical index. The method begins or continues at step 502 where a processing module (e.g., of a distributed storage and task (DST) processing unit) determines to update an index node of a dispersed hierarchical index in accordance with a pending update. The method continues at step 504 where the processing module initiates updating of the index node. For example, the processing module generates an updated index node, encodes the updated index node to produce a set of index slices, issues write slice requests to the set of storage units that includes the set of index slices, receives write slice responses, and determines whether the updating is successful based on the received write slice responses. For instance, the processing module indicates that updating his unsuccessful when not receiving a write threshold number of favorable write slice responses.

When the updating of the index node is not successful, the method continues at step 506 where the processing module generates a task entry of a task queue associated with the index node. For example, the processing module generates the task entry to include a pending update of the index node. The method continues at step 508 where the processing module stores the task entry in the task queue. For example, the processing module generates a DSN address for the task entry based on a DSN address of the index node, and generates a set of encoded task slices, generates a set of write slice requests that includes the set of encoded task slices and slice names derived from the DSN address for the task entry, and sends the set of write slice requests to the set of storage units.

The method continues at step 510 where the processing module subsequently accesses the index node. For example, the processing module identifies a DSN address of the index node, issues a set of read slice requests to the set of storage units utilizing the DSN address of the index node, receives read slice responses, and decodes index node slices of the received read slice responses to reproduce the index node.

The method continues at step 512 where the processing module determines whether the task queue associated with the index node includes at least one task entry. For example, the processing module interprets an entry count of the reproduced index node and indicates that the index node includes the at least one task entry when the count is greater than zero. As another example, the processing module initiates access to a first task entry and indicates that the at least one task entry is included when successfully decoding the first task entry.

When the task queue associated with the index node includes the at least one task entry, the method continues at step 514 where the processing module initiates updating of the index node. For example, for each task entry of the task queue, a processing module facilitates updating of the index node in accordance with the task entry. For instance, the processing module modifies the reproduced index node in accordance with the task entry, dispersed storage error encodes the modified index node to produce a set of modified index slices, sends the set of modified index slices to the set of storage units, receives write slice responses, and interprets the received read slice responses to determine whether the updating of the index node is successful.

When the updating of the index node is successful, the method continues at step 516 where the processing module deletes the at least one entry from the task queue. For example, the processing module issues a set of delete slice requests to a DSN address associated with each corresponding successfully updated entry of the task queue.

Figure 45A:
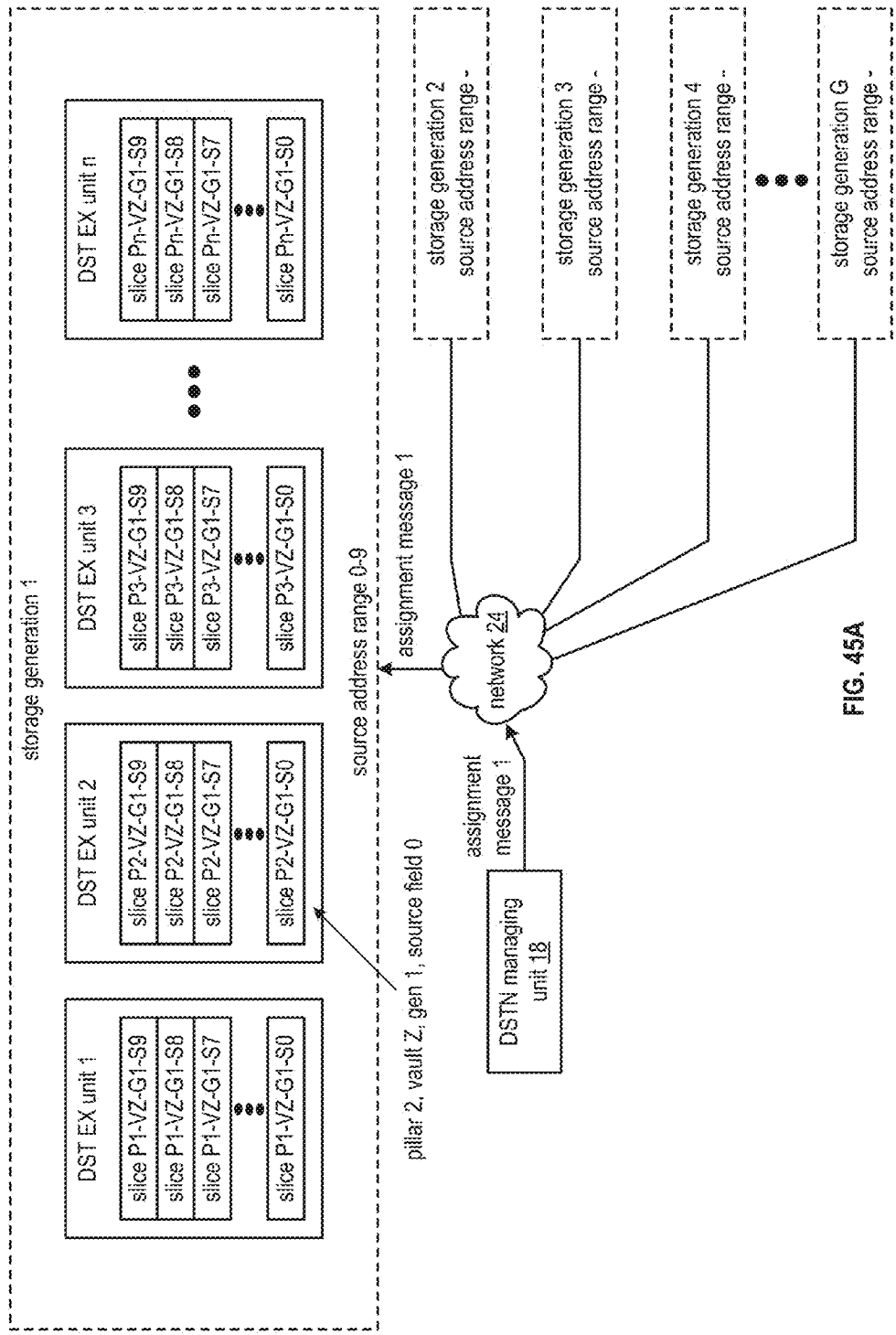
FIG. 45A is a schematic block diagram of another embodiment of a dispersed storage network (DSN) in accordance with the present invention.

FIG. 45A is a schematic block diagram of another embodiment of a dispersed storage network (DSN) that includes a plurality of storage generations 1-G, the distributed storage and task network (DSTN) managing unit 18 of FIG. 1, and the network 24 of FIG. 1. Each storage generation includes a set of DST execution (EX) units **1-*n*. Each DST execution unit may be implemented utilizing the DST execution unit 36 of FIG. 1**.

The DSN functions to store data as sets of encoded data slices associated with a source address range. The source address range includes a portion of slice names associated with the sets of encoded data slices. Each storage generation is associated with two states of readiness of operation. The two states includes active and inactive. The storage generation is available to store and retrieve sets of encoded data slices when the storage generation is active. The storage generation is not available to store and retrieve sets of encoded data slices when the storage generation is inactive (e.g., dormant and not yet assigned). For example, at a time t0, storage generation 1 is active and storage generations 2-G are inactive.

When a storage generation is active, the storage generations associated with a portion of a source address range. The source address range includes a portion of a range of slice names such that the DSN accesses encoded data slices associated with the range of slice names by utilizing the associated storage generation. The slice name includes a pillar index (e.g., **1-*n* for an information dispersal algorithm (IDA) width of 1), a vault identifier, a generation identifier, and a source field. The source field may include an object number associated with a data object for storage and a segment number based on divisions of the data object are required to produce a plurality of data segments. For example, the storage generation 1, at time t0, is associated with an entire source address range of 0-9 such that all encoded data slices associated with the source address range 0-9 are accessed utilizing the storage generation 1. While a first-generation of data is being stored for a vault Z, the DST execution unit 1 of the storage generation 1 is associated with encoded data slices with slice names ranging from P1-VZ-G1-S0 through P1-VZ-G1-S9, the DST execution unit 2 of the storage generation 1** is associated with encoded data slices with slice names ranging from P2-VZ-G1-S0 through P2-VZ-G1-S9, etc.

In an example of operation, the DSTN managing unit 18 determines to establish a first storage generation. The determining may be based on one or more of receiving a manager input, interpreting a schedule, receiving and activation request, interpreting configuration information, detecting that a new set of storage units is available, and detecting that additional storage capacity is required (e.g., another storage generation utilization level compares unfavorably to a maximum storage generation utilization threshold level).

When determining to establish the first storage generation, the DSTN managing unit 18 assigns storage parameters for at least one vault to be associated with the storage generation. The storage parameters includes one or more of a vault ID, and IDA type, and IDA width, a write threshold number, a read threshold number, a rebuilding threshold number, and a decode threshold number. The assigning includes one or more of receiving a manager input, interpreting a system registry, estimating DSN performance, and interpreting a DSN performance goal level. For example, the DSTN managing unit 18 establishes the storage parameters to include a vault ID of Z based on a manager input.

Having assigned the storage parameters, the DSTN managing unit 18 determines a generation number and a source address range to generation map for the storage generation. For example, the DSTN managing unit 18 determines generation 1 when establishing a first storage generation. As another example, the DSTN managing unit 18 determines a source address range of 0-9 mapped to the storage generation 1 based on a manager input.

Figure 45B:
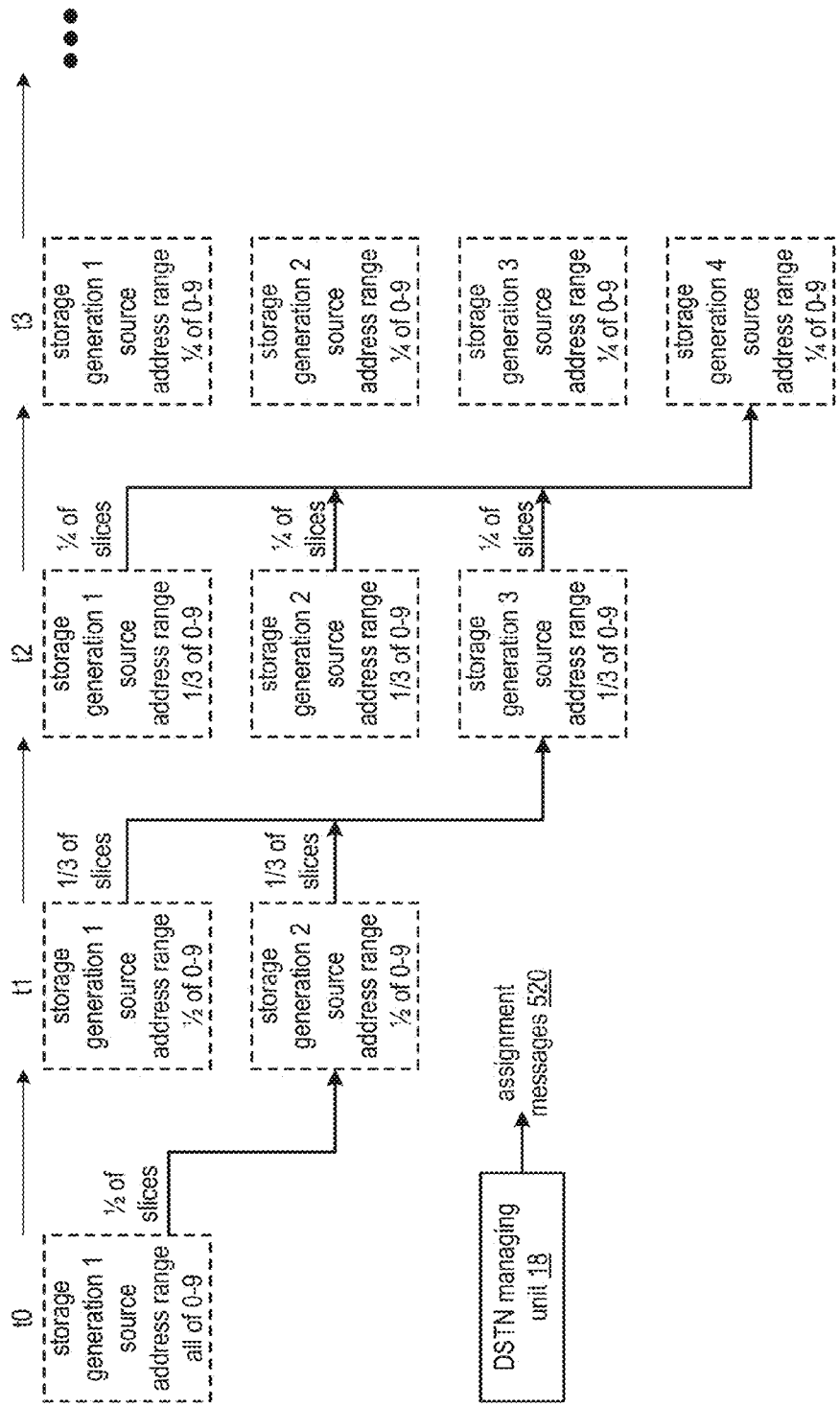
FIG. 45B is a schematic block diagram of a plurality of storage generations in accordance with the present invention.

Having determined the generation number and the source address range to generation map, the DSTN managing unit 18 issues and assignment message to a set of DST execution units associated with the storage generation, where the message includes one or more of the generation number, source address range, identifiers of the DST execution units, and a portion of the assigned a storage parameters. For example, the DSTN managing unit 18 sends, via the network 24, an assignment message 1 to the set of DST execution units 1-*n* of the storage generation 1 to associate the set of DST execution units with the source address range of 0-9, for generation 1 for vault Z. The method to add a new storage generation is discussed in greater detail with reference to FIG. 45B FIG. 45B is a schematic block diagram of a plurality of storage generations 1-4 activated over times t0-t3 by the DSTN managing unit 18 of FIG. 45A in accordance with a storage generation activation scheme. In an example of operation of the activation of the storage generations, the DSTN managing unit 18 determines, to add another storage generation to one or more current storage generations. The determining may be based on one or more of detecting an unfavorable storage utilization level, detecting an unfavorable level of input/output operations, detecting an unfavorable number of metadata objects stored in the one or more current storage generations, receiving a manager input, interpreting a schedule, receiving an activation request, interpreting configuration information, detecting that a new set of storage units is available, and detecting that additional storage capacity is required.

Having determined to add another storage generation, the DSTN managing unit 18 obtains the source address range to generation map. The obtaining includes at least one of retrieving from a DST execution unit, retrieving from a local memory, and extracting from a system registry. Having obtained the source address range to generation map, the DSTN managing unit 18 determines a number of generations when adding a generation to the one or more current storage generations. The determining may be based on one or more of interpreting a level of unfavorable storage utilization, interpreting a level of unfavorable input/output operations, and interpreting a level of number of metadata objects stored in the one or more current generations. For example, the DSTN managing unit 18 determines to add one new storage generation when the level of unfavorable storage utilization is greater than a maximum threshold level and less than a critical threshold level.

Having determined the number of generations, the DSTN managing unit 18 updates the source address range to generation map based on the number of generations and a deterministic address reallocation scheme, where each storage generation is assigned an equal portion of the source address range in accordance with the number of generations and where, for each current generation, a portion of a current assignment of the source address range is reassigned to the other storage generation. For example, at time t1, the DSTN managing unit 18 updates the source address range to generation map such that one half of the source address range remains with the storage generation 1 and another half of the source address range is now assigned to a new storage generation 2. As another example, at time t2, the DSTN managing unit updates the source address range to generation map such that each of storage generation 1, 2 and new storage generation 3 is associated with one third of the source address range. As yet another example, at time t3, each storage generation is associated with one fourth of the source address range.

Having updated the source address range to generation map, the DSTN managing unit 18 facilitates distribution of the updated source address range to generation map each of the other generations and the one or more current generations. For example, the DSTN managing unit 18 issues assignment messages 520 to the storage generations, where the assignment messages 520 includes the updated source address range of generation map.

Having distributed the updated source address range to generation map, the DSTN managing unit 18 facilitates migration of encoded data slices from each of the one or more current storage generations to a the other storage generations in accordance with the updated source address range to generation map. The facilitation includes at least one of retrieving and starring slices, sending a request to each other storage generation to issue a read slice requests, and issuing a request to each of the one or more current storage generations to issue a write slice requests. For example, at time t1, one half of the slice is stored in the storage generation 1 are migrated to storage generation 2. As another example, at time t2, one third of the slices stored in the storage generation 1 are migrated to the storage generation 3 and one third of the slices stored in the storage generation 2 are migrated to the storage generation 3. As yet another example, at time t3, one fourth of the slices stored in the storage generation 1 are migrated to the storage generation 4, one fourth of the slices stored in the storage generation 2 are migrated to the storage generation 4, and one fourth of the slices stored in the storage generation 3 are migrated to the storage generation 4.

Figure 45C:
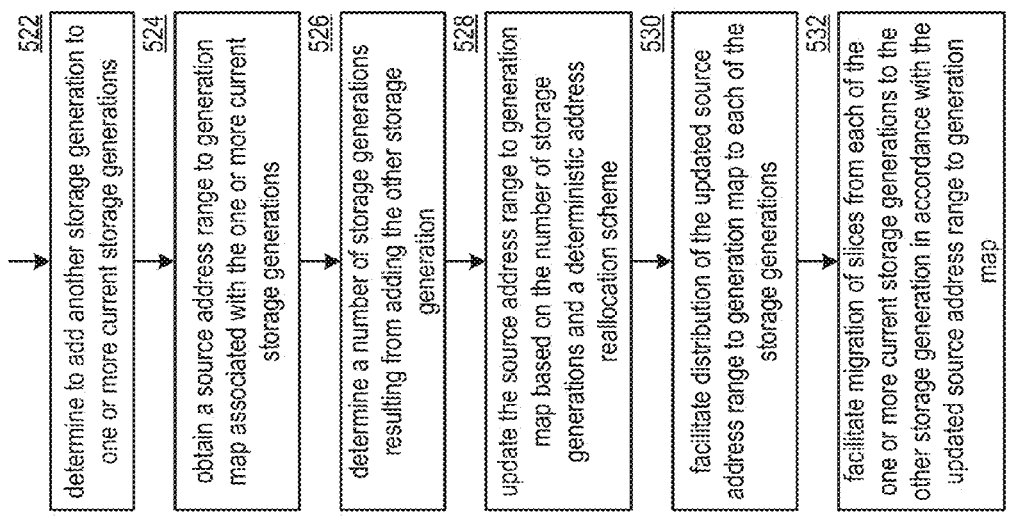
FIG. 45C is a flowchart illustrating an example of adding a storage generation to a dispersed storage network (DSN) in accordance with the present invention.

FIG. 45C is a flowchart illustrating an example of adding a storage generation to a dispersed storage network (DSN). The method begins or continues at step 522 where a processing module (e.g., of a distributed storage and task network (DSTN) managing unit) determines to add another storage generation to one or more current storage generations. The determining may be based on one or more of detecting an unfavorable storage utilization level, detecting an unfavorable level of input/output operations, and detecting an unfavorable number of meta-data objects stored in the one or more current generations.

The method continues at step 524 where the processing module obtains a source address range to generation map associated with the one or more current storage generations. The obtaining includes at least one of retrieving from a storage generation, extracting from a system registry, initiating a query, and receiving a query response.

The method continues at step 526 where the processing module determines a number of storage generations resulting from adding the other storage generation. For example, the processing module adds a number of current generations from the source address range to generation map and a number of new generations to produce a number of generations N.

The method continues at step 528 where the processing module updates the source address range to generation map based on the number of storage generations and a deterministic address reallocation scheme. For example, the processing module applies the deterministic address reallocation scheme to the address range to provide equal sized address ranges. For instance, the total range is divided by N to produce the portion for each generation such that equal sized portions of the previous address range assignments are assigned to the new generation (e.g., 1/N from each). The address reallocation scheme may further include utilizing contiguous address ranges one possible.

The method continues at step 530 where the processing module facilitates distribution of the updated source address range to generation map to each of the storage generations. For example, the processing module publishes the map to all generations and adds the map to system registry information for future publishing. The method continues at step 532 where the processing module facilitates migration of slices from each of the one or more current storage generations to the other storage generation in accordance with the updated source address range to generation map. For example, the processing module sends migration requests to the one or more current generations. As another example, the processing module sends a migration request to the other storage generation where the migration message includes instructions to issue a read slice requests to the one or more current storage generations for address ranges of the slices for migration.

Figure 46A:
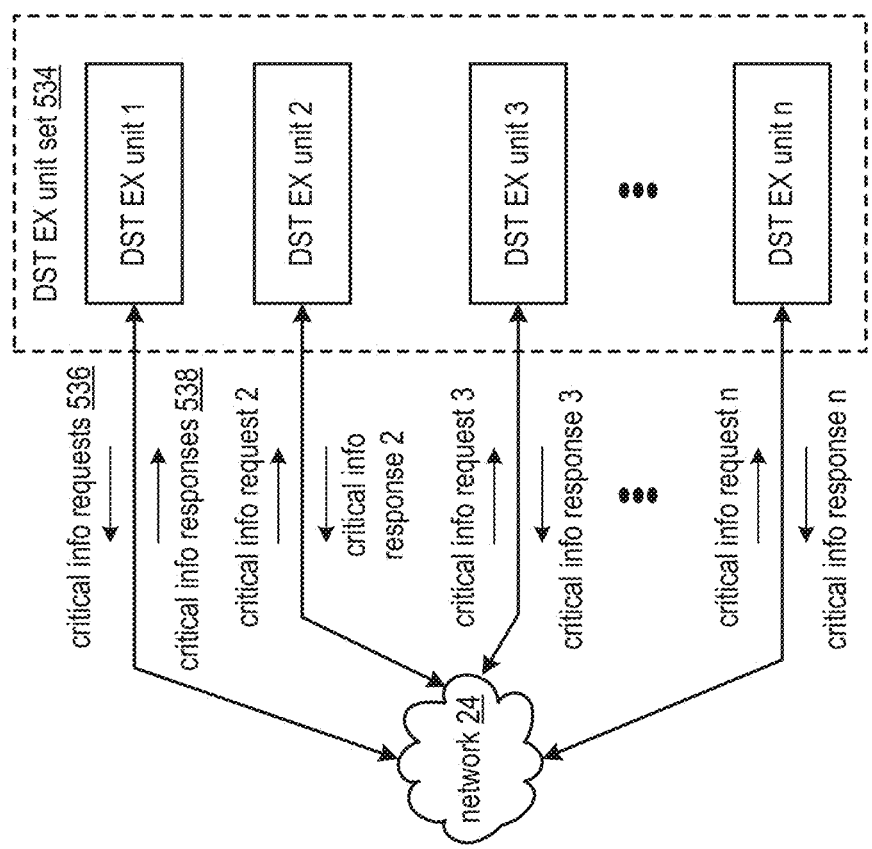
FIG. 46A is a schematic block diagram of another embodiment of a dispersed storage network (DSN) in accordance with the present invention.

FIG. 46A is a schematic block diagram of another embodiment of a dispersed storage network (DSN) that includes the network 24 of FIG. 1, and a distributed storage and task (DST) execution (EX) unit set 534. The DST execution unit set 534 includes a set of DST execution units 1-$n$. Each DST execution unit may be implemented utilizing the DST execution unit 36 of FIG. 1. The DSN functions to store critical information for subsequent retrieval. The critical information includes one or more of software, a security credential, a certificate chain, an encryption key, an encryption keys seed, configuration information, operational parameters, an access control list, system registry information, system management information, and any other information that is critical to the operation of the DSN.

An example of operation to retrieve previously stored critical information, the DST execution unit 1 determines to externally acquire the critical information. The determining may be based on one or more of detecting missing previously locally stored critical information, detecting a corrupted critical information, and identifying a need for the critical information. For example, the DST execution unit 1 determines to externally acquire the critical information when the need for the critical information is identified and the critical information is not available in the DST execution unit 1 (e.g., never stored locally).

Having determined to externally acquire the critical information, the DST execution unit 1 identifies a quorum number of candidate devices associated with storage of the critical information, where the quorum number of candidate devices may be storing duplicate copies of the critical information. The identifying includes at least one of interpreting a system registry information, accessing a list, initiating a query, receiving a query response, and determining a minimum number of desired candidate devices to achieve a retrieval reliability goal level. For example, the DST execution unit 1 identifies each other DST execution unit of the set of DST execution units as the quorum number of candidate devices when a list of candidate devices indicates the set of DST execution units.

Having identified the quorum number of candidate devices, the DST execution unit 1 selects devices from the quorum number of candidate devices for a critical information query. The selecting may be based on one or more of a device performance level, a device level of trust indicator, historical device response information, a predetermination, a request, device availability information, and a minimum number of selected devices. For example, the DST execution unit 1 selects DST execution units 2-$n$ when each DST execution unit is associated with a level of trust that is greater than a minimum trust threshold level.

Having selected the devices, DST execution unit 1 issues the critical information query to the selected devices. For example, the DST execution unit 1 issues, via the network 24, critical information requests 536 (e.g., critical information requests 2-$n$) to the DST execution units 2-$n$. Each of the DST execution units authenticates and authorizes a received critical information request 536 and, when authorized and authenticated, issues a critical information response 538 to the DST execution unit 1.

The DST execution unit 1 receives critical information responses 538 from at least some of the selected devices. For example, the DST execution unit 1 receives critical information responses 2-$n$. Having received the critical information responses 538, the DST execution unit 1 identifies two or more favorably comparing (e.g., received critical information is substantially the same) received critical information responses.

Having identified the two or more favorably comparing received critical information responses, the DST execution unit 1 compares a number of the two or more favorably comparing received critical information responses to a minimum threshold number. When the comparison is favorable (e.g., the number is greater than the minimum threshold number), the DST execution unit 1 indicates that the critical information of the two or more favorably comparing received critical information responses is valid. Having identified the valid critical information, the DST execution unit 1 utilizes the valid critical information. Having utilized the valid critical information, the DST execution unit 1 may immediately delete the valid critical information. For example, the DST execution unit 1 deletes the valid critical information that includes an access control list when processing an access request has been completed.

Figure 46B:
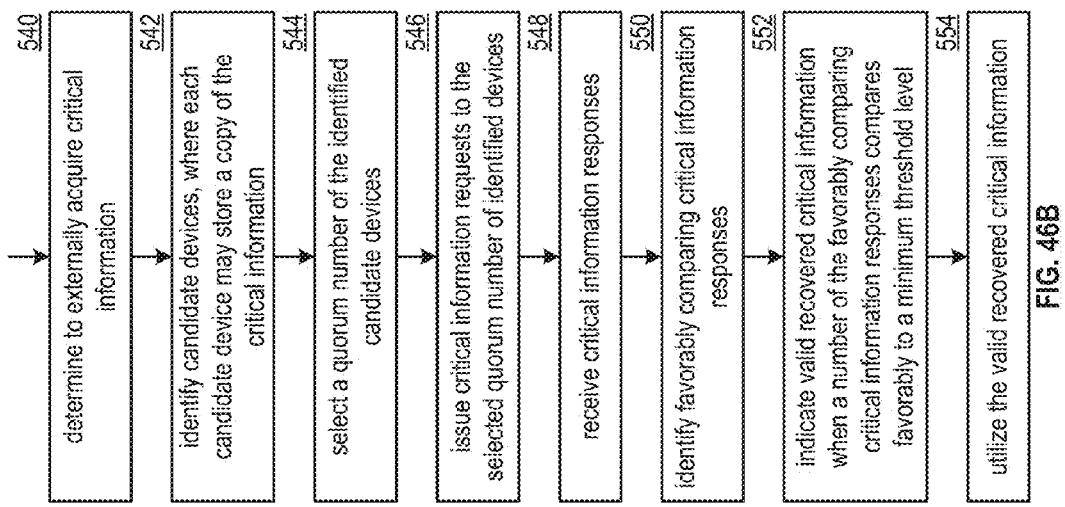
FIG. 46B is a flowchart illustrating an example of acquiring critical information in accordance with the present invention.

FIG. 46B is a flowchart illustrating an example of acquiring critical information. The method begins or continues at step 540 where a processing module (e.g., of a distributed storage and task (DST) execution unit) determines to externally acquire critical information. The determining may be based on one or more of receiving a request for the critical information, detecting a corrupted locally stored critical information, detecting missing critical information, and detecting a change in the critical information.

The method continues at step 542 where the processing module identifies candidate devices, where each candidate device may store a copy of the critical information. The identifying includes one or more of identifying affiliated devices (e.g., other DST execution units), identifying trusted devices, receiving a list, initiating a query, and receiving a query response. The method continues at step 544 where the processing module selects a quorum number of the identified candidate devices. The selecting includes identifying the quorum number from a system registry, identifying best-performing devices, identifying devices associated with the critical information, identifying most trusted devices, and identifying most available devices.

The method continues at step 546 where the processing module issues critical information requests to the selected quorum number of identified devices. For example, the processing module generates the critical information request to include an identifier of the critical information and sends the critical information request to the selected quorum number of identified devices. The method continues at step 548 where the processing module receives critical information responses.

The method continues at step 550 where the processing module identifies favorably comparing critical information responses. For example, the processing module indicates that two critical information responses favorably compare when critical information of the two critical information responses is substantially the same. The method continues at step 552 where the processing module indicates valid recovery critical information when a number of the favorably comparing critical information responses compares favorably to a minimum threshold level. For example, the processing module obtains the minimum threshold level (e.g., retrieve, determine as a majority number of the quorum number), compares the number and threshold, and indicates valid when the number is greater than the minimum threshold level.

The method continues at step 554 where the processing module utilizes the valid recovery critical information. For example, the processing module stores the valid recovery critical information in a local memory and invokes further processing that utilizes the valid recovery critical information. Alternatively, or in addition to, the processing module deletes the locally stored valid recovery critical information when determining that the further processing has been completed and the critical information is to be deleted.

Figure 47A:
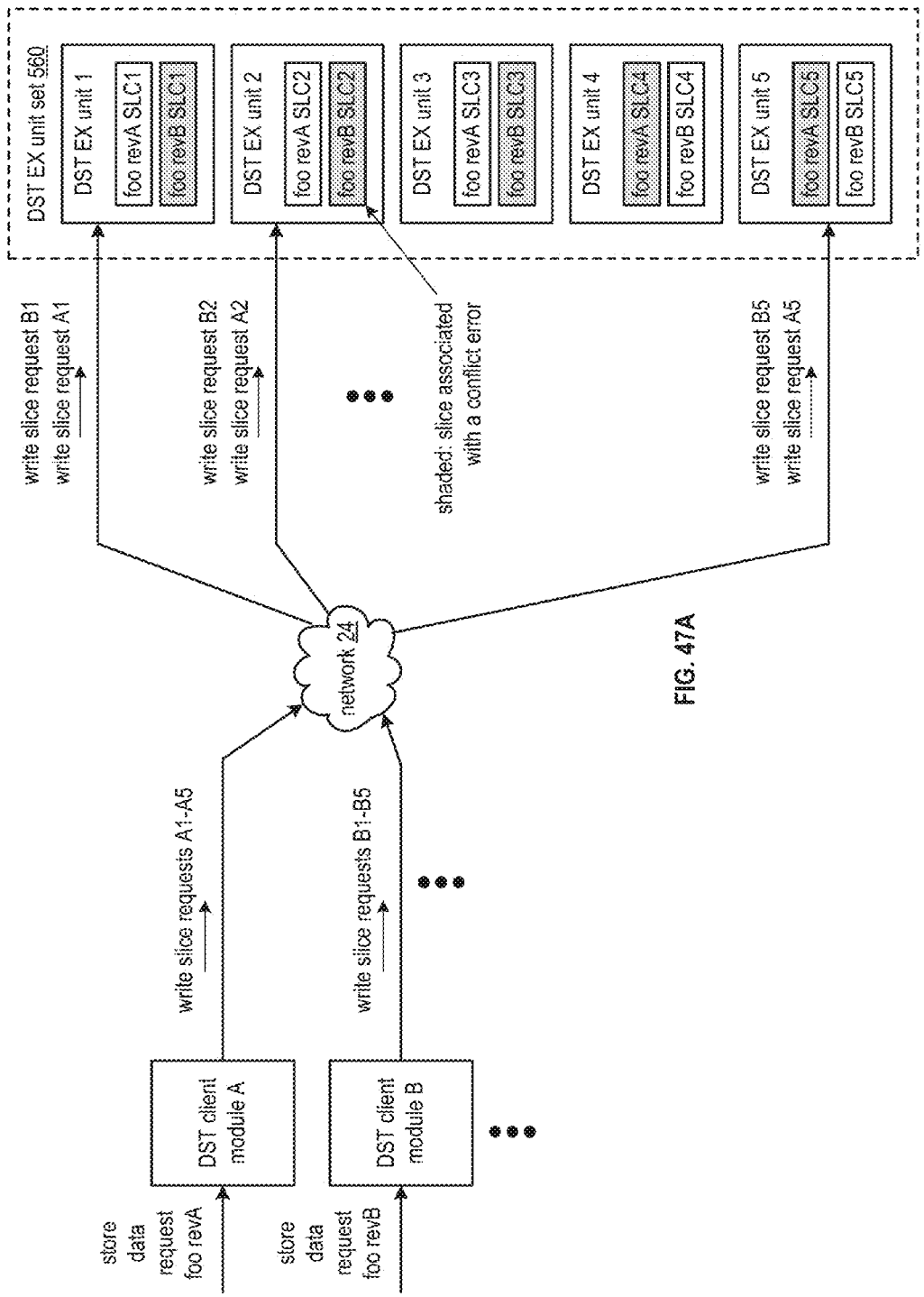
FIGS. 47A and 47B are a schematic block diagram of another embodiment of a dispersed storage network (DSN) in accordance with the present invention.
Figure 47B:
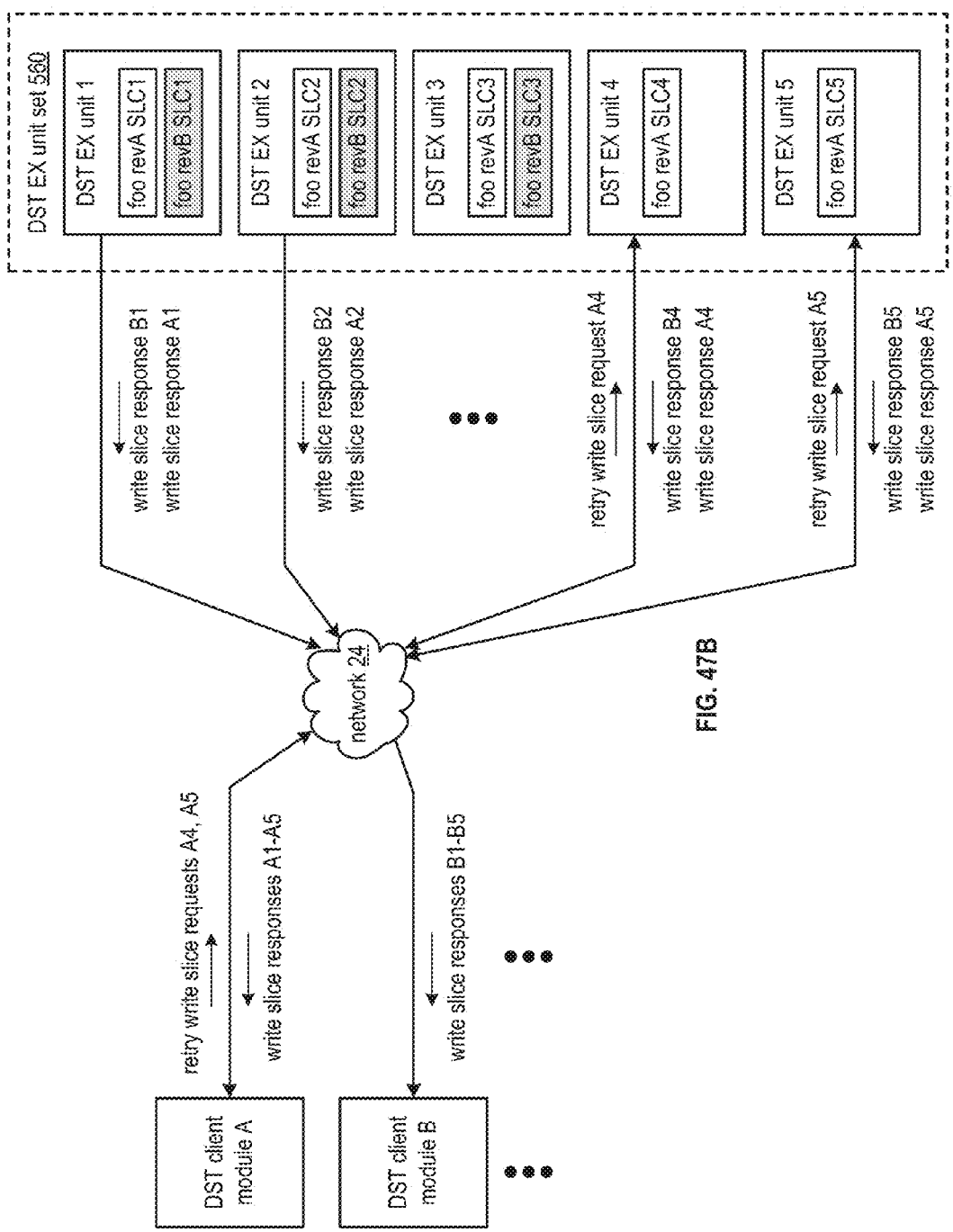

FIGS. 47A and 47B are a schematic block diagram of another embodiment of a dispersed storage network (DSN) that includes two or more distributed storage and task (DST) client modules A, B, etc., the network 24 of FIG. 1, and a DST execution (EX) unit set 560. The DST execution unit set 560 includes a number of DST execution units in accordance with dispersal parameters of an information dispersal algorithm (IDA). For example, the DST execution unit set 560 includes five DST execution units 1-5 when an IDA with is five. Each DST execution unit may be implemented utilizing the DST execution unit 36 of FIG. 1. Hereafter, each DST execution unit may be interchangeably referred to as a storage unit and the set of DST execution units may be interchangeably referred to as a set of storage units. Each DST client module may be implemented utilizing the DST client module 34 of FIG. 1.

The DSN functions to resolve write request conflicts arising from substantially concurrent storage of a data object in the set of DST execution units 1-5 utilizing a multi-phase storage process. In particular, each of the DST client modules A, B, C, D, etc., function to resolve the write request conflicts while storing the data object in the DST execution unit set 560. The multiphase storage process includes a writing phase where a set of encoded data slices are sent to the storage units that provide a temporary locking of received encoded data slices, a committing phase where encoded data slices received by the storage units are made available for retrieval (e.g., committed) when a write threshold number of the set of encoded data slices have been received by the set of storage units, and a finalizing phase 2 and the multiphase storage process and the locking of the received encoded data slices enabling subsequent updating of stored data.

FIG. 47A illustrates steps of an example of operation of the resolving of the write request conflicts where the DST client module A receives a store data request foo that includes data object foo of a revision A for storage. Having received the data object foo for storage, the DST client module A issues, via an interface associated with the DST client module A and the network 24, a write request for a dispersed storage error encoded version of the data object foo to the storage units of the DSN, where substantially concurrent write requests (e.g., from the DST client modules B, C, D, etc.) regarding the data object includes the write request. The issuing of the write request includes the DST client module A dispersed storage error encoding the data object foo to produce a plurality of sets of encoded data slices. Having produced the plurality of sets of encoded data slices, the DST client module A generates a plurality of sets of slice names corresponding to the data object foo. Having produced the plurality of sets of slice names, the DST client module A generates one or more sets of write slice requests that includes the plurality of sets of encoded data slices and the plurality of sets of slice names. For example, the DST client module A generates write slice requests A1-A5. Having generated the one or more sets of write slice requests, the DST client module A sends, via the network 24, write slice requests A1-A5 to the set of DST execution units 1-5.

Substantially simultaneously, at least the DST client module B receives another store data request foo that includes a revision B (e.g., earlier or later version as compared to revision A) of the data object foo. In a similar fashion to the producing of the write slice requests by the DST client module A, the DST client module B generates another set of write slice requests B1-B5 that includes another plurality of sets of encoded data slices and another plurality of sets of slice names, where the other plurality of sets of slice names is substantially the same as the plurality of sets of slice names associated with the write slice requests A1-A5. Having produced the set of write slice requests B1-B5, the DST client module B sends, via the network 24, the set of write slice requests B1-B5 to the set of DST execution units 1-5.

Write contention may occur between the writing of the set of write slice requests A1-A5 and the set of write slice requests B1-B5. Each DST execution unit receiving write slice requests receives a first write slice request of write slice request A and B and a second write slice request of the write slice requests A and B subsequent to the receiving of the first write slice request, where the first write slice request is associated with locking and associated slice name to enable further steps of writing and the second write slice request is associated with a conflict error. For example, DST execution unit 1 receives the write slice request A1 as the first write slice request and associates the write slice request A1 with locking and receives the write slice requests B1 as the second write slice request and associates the write slice requests B1 with the conflict error when the write slice request A1 is already associated with the locking.

The writing phase of the DST client module A and the writing phase of the DST client module B may advance to the committing phase when either of the DST client module A or B receives an indication that a corresponding write threshold number of encoded data slices are associated with locks. As a further example of locking during the writing phase of the multiphase storage process, the DST client module A is associated with locking of encoded data slices 1, 2, and 3 while the DST client module B is associated with locking of encoded data slices 4, and 5. As such, a temporary stalemate has occurred when none of the DST client modules achieves locking of the write threshold number of encoded data slices due to the write conflict.

FIG. 47B illustrates further steps of the example of operation of the resolving of the write request conflicts where, in response to the write request, the DST client module A receives write responses (e.g., write slice responses A1-A5) from at least some of the DST execution units, where each of the write responses includes either a lock indication or a non-lock indication and conflict information. For example, the DST client module A receives write slice responses A1-A3 including the lock indication and receives write slice responses A4-A5 with the non-lock indication and the conflict information.

The conflict information includes one or more of identity of a second write request (e.g., write slice request B4 or B5) for the dispersed storage error encoded version of the data object issued by a second computing device (e.g., DST client module B) that has received the lock indication, identity of the second computing device (e.g., DST client module B), identity of a third write request for the dispersed storage error encoded version of the data object issued by a third computing device (e.g., DST client module C) that did not receive the lock indication, identity of the third computing device (e.g., DST client module C), and information regarding write request processing characteristics of the one of the at least some of the storage units. The information regarding the write request processing characteristics includes one or more of duration of the lock, number of conflicts generated over various time frames, number of unique requesters over the various time frames, average lock duration for a previous lock, timestamps associated with receipt of multiple write requests, ordering of receipt of the multiple write requests, and a requesting entity priority level.

Having received the write responses, the DST client module A determines whether at least a write threshold number of write responses have been received that include the lock indication. For example, the DST client module A indicates that less than the at least a write threshold number of write responses have been received that includes the lock indication when only receiving the write slice responses A1-A3 (e.g., 3 responses) that includes the lock indication and the write threshold number is 4.

When less than the at least a write threshold number of write responses have been received that include the lock indication, the DST client module processes the conflict information to identify one or more other write requests of the substantially concurrent write requests that have a higher priority than the write request. As a specific example, the DST client module B determines that, in response to each of the one or more other write requests, a greater number of lock indications were received than were received for the write request (e.g., noting that the DST client module A received three lock indications while the DST client module B received only to lock indications). As another specific example, the DST client module determines that, in response to one of the one or more other write requests, an equal number of lock indications were received as were received for the write request (e.g., a tie), executes a retry tie-breaking protocol when the equal number of lock indications were received for the one of the one or more other write requests as were received for the write request.

The retry tie-breaking protocol includes the DST client module granting priority to the one of the one or more other write requests when another computing device (e.g., another DST client module) associated with the one of the one or more other write requests has a higher device priority than the computing device. For example, the DST client module B grants priority to the requests of the DST client module A when, in another scenario, a tie has occurred. Alternatively, the retry tie-breaking protocol includes the DST client module interpreting the conflict information from the storage units of the at least some of the storage units that did not provide the lock indication to the write request of the computing device or to the one or more other write requests of the other computing devices to determine a retry priority between the write request and the one or more other write requests. For example, the DST client module determines whether the write requests of the DST client module are ahead in priority or behind in priority of the other DST client modules.

Having identified the one or more other write requests of the substantially concurrent write requests that have a higher priority than the write request, the DST client module A establishes a write request retry time frame based on the one or more other write requests that have the higher priority. For example, the DST client module A establishes the write request retry time frame based on an estimation of when the two write slice requests of the DST client module B that are associated with the lock condition are released (e.g., timeout within the storage unit, storage unit receives an undue request from the DST client module B).

Having established the write request retry time frame, at expiration of the write request retry time frame, the DST client module A issues a retry write request for the dispersed storage error encoded version of the data object. For example, the DST client module A issues, via the network 24, retry write slice requests A4 and A5 to the DST execution units 4 and 5 when the DST client module A determines that the locks on the encoded data slices 1-3 associated with DST execution units 1-3 will not expire while attempting the retry write request. As another example, the DST client module A issues, via the network 24, retry write slice requests A1-A5 when the DST client module A determines that the locks on the encoded data slices 1-3 will likely expire while attempting the retry write request.

Having issued the retry write request, the DST client module A receives, in response to the retry write request, retry write responses from at least some of the storage units, where each of the retry write responses includes either the lock indication or the non-lock indication and updated conflict information. For example, the DST client module A receives retry write responses that includes another write slice response A4 and another write slice response A5, where at least one write slice response includes the lock indication.

Having received the retry write responses, the DST client module A determines whether at least a write threshold number of retry write responses (e.g., write slice responses from the write slice requests and/or the retry write slice requests) have been received that include the lock indication. For example, the DST client module A indicates that the write threshold number of retry write responses has been received when receiving the write slice responses A1-A5 indicating the lock condition and when receiving the other write slice responses A4-A5 indicating at least one more lock condition. When the at least a retry write threshold number of retry write responses have been received that include the lock indication, the DST client module A issues a commit command to the at least some of the storage units. For example, the DST client module A issues, via the network 24, commit transaction requests to each DST execution unit of the DST execution unit set 560 to execute the commit phase. Subsequent to confirmation of receipt of the write threshold number of the commit transaction requests by the set of DST execution units, the DST client module A issues, via the network 24, finalize transaction requests to the DST execution units of the DST execution unit set 560 to complete the finalize phase.

FIG. 47C is a table illustrating an example of resolving write request conflicts. In particular, the table represents steps of another example of operation of the resolving of the write request conflicts where 4 DST processing modules A-D are contending to write the data object to the set of storage units 1-5 of FIGS. 47A-B. The table includes a request sequencing section 562, a lock information section 564, and a deduce priority section 566. The request sequencing section 562 includes a storage unit field 568, a lock owner field 570, and a received order of requests field 572. The lock information section 564 includes fields for priority order responses each of the DST processing modules A-D. The deduced priority section 566 includes fields for self ranking and priority order deduction by each of the DST processing modules A-D.

In the example of operation, entries of the storage unit field 568 indicates a particular storage unit of the storage units 1-5. Entries of the lock owner field 570 indicates a locking selection by a corresponding storage unit. For example, storage unit 2 returns a write response that includes the lock indication for the DST processing module B. Entries of the received order of requests field 572 indicates an ordering of received write requests from the DST processing modules by a corresponding storage unit. For example, storage unit 2 receives a write slice request from DST processing module B first, a write slice request from the DST processing module A second, a write slice request from the DST processing module D third, and a write slice request from the DST processing module C fourth.

When receiving a write request, each storage unit issues a write response to a corresponding requesting DST processing module. When receiving the first write slice request, the storage unit issues a write response that includes the lock indication (e.g., indicating that at this point in time the corresponding DST processing module owns the lock and there is no contention). For example, the storage unit 2 receives the first write slice request from the DST processing module B and issues a first write slice response to the DST processing module B indicating that the DST processing module B owns the lock. When receiving the second write slice request, the storage unit issues a second write slice response that includes the non-lock indication and the conflict information. For example, the storage unit 2 receives the second write slice request from the DST processing module A and issues a second write slice response to the DST processing module A indicating, where the second write slice response includes the non-like indication and the conflict information, where the conflict information indicates that DST processing module B owns the lock and that the DST processing module A is associated with the second write slice request (e.g., a second priority).

Each DST processing module receiving a write slice response interprets one or more of the lock indication, the non-lock indication, and the conflict information to deduce a priority ranking vis-à-vis other DST processing modules. The deducing includes processing the conflict information to identify one or more other write requests of the substantially concurrent write requests that have a higher priority than the write request. For example, the DST processing module B determines that, in response to each of the one or more other write requests, a greater number of lock indications received that were received for the write request associated with DST processing module B (e.g., both DST processing modules A and C received two locks while DST processing module B only receive one lock).

As another example, the DST processing modules A and C both determine that, in response to one of the one or more other write requests, an equal number of lock indications were received as were received for the write requests associated with the DST processing modules A and C (e.g., DST processing modules A and C both received two locks). When the equal number of lock indications were received, the DST processing modules A and C both execute a retry tie-breaking protocol. The retry tie-breaking protocol includes granting priority to the one of the one or more other write requests when another computing device associated with the one of the one or more other write requests has a higher device priority than the computing device. For instance, the DST processing module C deduces that the DST processing module A has higher priority based on the write slice response issued to the DST processing module C (e.g., priority order response B, A, D, C) and associates a second priority level with the DST processing module C. In a similar instance, the DST processing module A also deduces that the DST processing module A has the higher priority and associates a first priority level with the DST processing module A.

The DST processing module B interprets the five write slice responses that the DST processing module B received from the five storage units to deduce a rank of 3 when the lock indications indicate that the DST processing modules A and C each own two locks and the DST processing module B has a greater priority as indicated by the priority order responses than the DST processing module D. The DST processing module B interprets the five write responses that the DST processing module B received from the five storage units to deduce a rank of 4 when the lock indications indicate that the DST processing modules A and C each own the two locks and the priority order of the DST processing module B is always greater than that of the DST processing module D.

Having deduced a priority ranking, each DST processing module establishes a write request retry time frame based on the one or more other write requests that have the higher priority and at the expiration of the write request retry time frame, issue a retry write request to one or more the storage units. The establishing of the write request retry time frame may be further based on one or more aspects of the conflict information. For example, the DST processing module establishes the write request retry time frame based on one or more of an estimated time to process the multiphase write process, an estimated lock duration, a lock timeout duration, a historical rate of conflicts, and a historical probability of success of each retry. For instance, the DST processing module A establishes an associated write request retry time frame to be substantially the same as the estimated time to execute the multiphase write process when deducing the first priority ranking, the DST processing module C establishes an associated write request retry time frame to be twice the estimated write time to execute the multiphase write process when deducing the second priority ranking, the DST processing module B establishes an associated write request retry time frame to be three times the estimated write time to execute the multiphase write process when deducing the third priority ranking, and the DST processing module D establishes an associated write request retry time frame to be four times the estimated write time to execute the multiphase write process when deducing the fourth priority ranking. As such, the method may provide an improved level of system operation to efficiently process the contending write requests in a sequential efficient manner without further contention.

FIG. 47D is a flowchart illustrating an example of resolving write request conflicts regarding a data object arising from substantially concurrent write requests. In particular, a method is presented for use in conjunction with one or more functions and features described in conjunction with FIGS. 1-39, 47A-C, and also FIG. 47D. The method begins at step 580 where a processing module of a computing device (e.g., a distributed storage and task processing module) of one or more computing devices of a dispersed storage network (DSN) issues a write request for a dispersed storage error encoded version of the data object to storage units of the DSN. For example, the computing device dispersed storage error encodes the data object to produce a plurality of sets of encoded data slices and sends the plurality of sets of encoded data slices to a set of storage units of the DSN.

The method continues at step 582 where the computing device receives, in response to the write request, write responses from at least some of the storage units, where each of the write responses includes either a lock indication or a non-lock indication and conflict information. The method continues at step 584 where computing device determines whether at least a write threshold number of write responses have been received that include the lock indication.

When less than the at least a write threshold number of write responses have been received that include the lock indication, the method continues at step 586 where the computing device processes the conflict information to identify one or more other write requests of the substantially concurrent write requests that have a higher priority than the write request. For example, the computing device determines that, in response to each of the one or more other write requests, a greater number of lock indications were received than were received for the write request. As another example, the computing device determines that, in response to one of the one or more other write requests, an equal number of lock indications were received as were received for the write request. When the equal number of lock indications were received for the one of the one or more other write requests as were received for the write request, the computing device executes a retry tie-breaking protocol. For example, the computing device grants priority to the one of the one or more other write requests when another computing device associated with the one of the one or more other write requests has a higher device priority than the computing device. As another example, the computing device interprets the conflict information from the storage units of the at least some of the storage units that did not provide the lock indication to the write request of the computing device or to the one or more other write requests of the other computing devices to determine a retry priority between the write request and the one or more other write requests.

The method continues at step 588 where the computing device establishes a write request retry time frame based on the one or more other write requests that have the higher priority. At expiration of the write request retry time frame, the method continues at step 590 where the computing device issues a retry write request for the dispersed storage error encoded version of the data object. The method continues at step 592 where the computing device receives, in response to the retry write request, retry write responses from at least some of the storage units, where each of the retry write responses includes either the lock indication or the non-lock indication and updated conflict information.

The method continues at step 594 where the computing device determines whether at least a write threshold number of retry write responses have been received that include the lock indication (e.g., from a total number of write responses and retry write responses that include the lock indication). When the at least a retry write threshold number of retry write responses have been received that include the lock indication, the method continues at step 596 where the computing device issues a commit command to the at least some of the storage units.

The method described above in conjunction with the processing module can alternatively be performed by other modules of the dispersed storage network or by other devices. In addition, at least one memory section (e.g., a computer readable storage medium) that stores operational instructions can, when executed by one or more processing modules of one or more computing devices of the dispersed storage network (DSN), cause the one or more computing devices to perform any or all of the method steps described above.

Figure 48A:
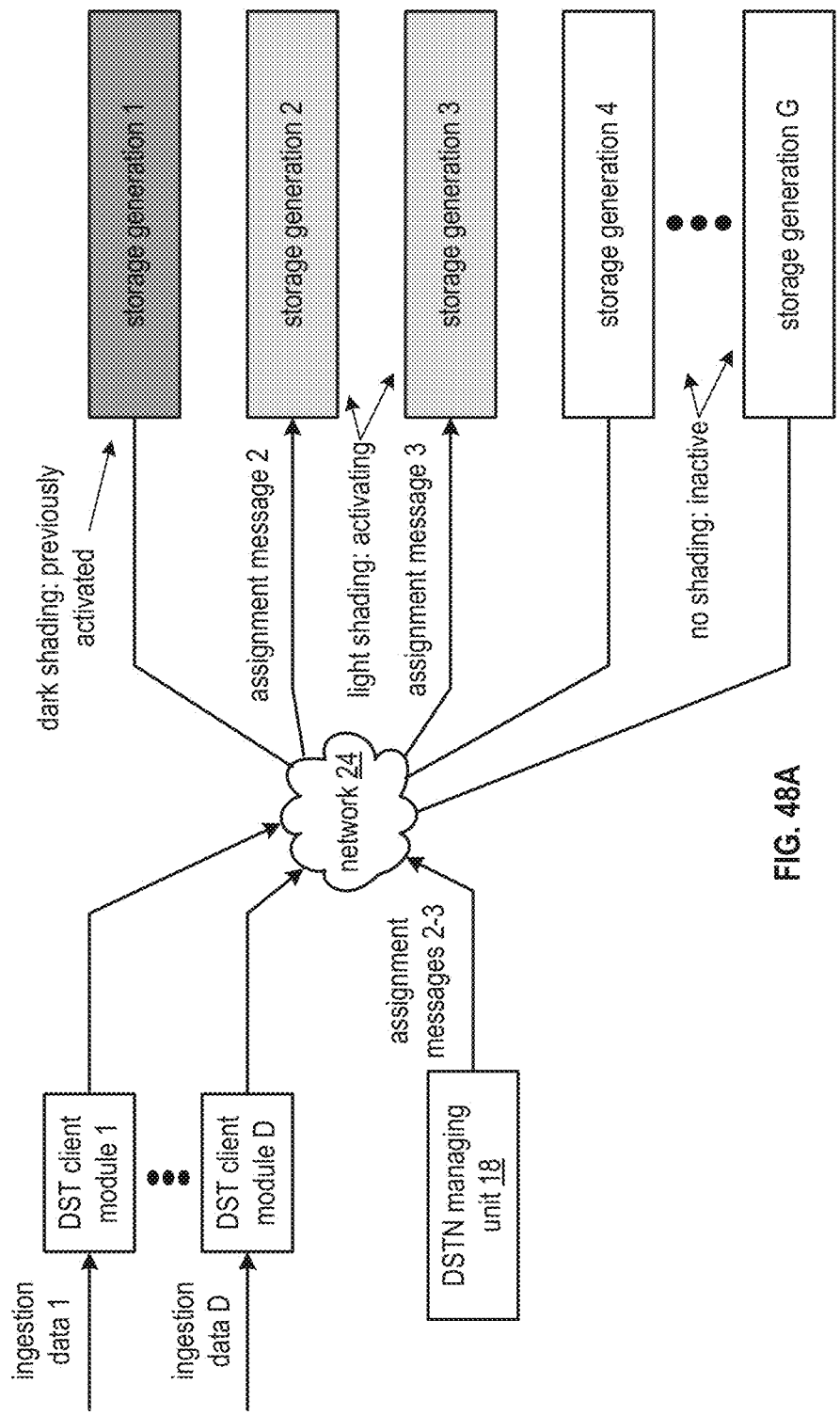
FIG. 48A is a schematic block diagram of another embodiment of a dispersed storage network (DSN) in accordance with the present invention.

FIG. 48A is a schematic block diagram of another embodiment of a dispersed storage network (DSN) that includes a plurality of distributed storage and task (DST) client modules 1-D, the distributed storage and task network (DSTN) managing unit 18 of FIG. 45A, the network 24 of FIG. 1, and the plurality of storage generations 1-G of FIG. 45A. The DSN functions to ingest large amounts of data storage in one or more of the storage generations and to activate storage generations in accordance with the ingesting of the data. For example, the DST client module 1 receives ingestion data 1, dispersed storage error encodes the ingestion data to produce sets of encoded data slices, and stores the sets of encoded data slices in previously activated storage generation 1.

In an example of operation, the DSTN managing unit 18 obtains a storage utilization level for each currently active storage generation. The obtaining includes at least one of issuing a storage utilization level request, receiving a storage utilization level response, interpreting an error message, interpreting a DSN log, interpreting storage indicators within a dispersed hierarchical index, and performing a lookup.

Having obtained the storage utilization level, the DSTN managing unit 18 obtains a data ingestion rate for each of the currently active storage generations. The obtaining includes at least one of issuing a data ingestion rate request, receiving a data ingestion rate response, interpreting the DSN log, interpreting storage indicators within a dispersed hierarchical index, performing a lookup, issuing a query to one or more DST client modules, receiving a query response from at least one DST client module, and performing a lookup.

Having obtained the data ingestion rate, the DSTN managing unit 18 determines whether to activate one or more other storage generations based on the storage utilization level and the data ingestion rate. For example, the DSTN managing unit 18 indicates to activate an additional storage generation when the storage utilization level is greater than a maximum storage utilization threshold level. As another example, the DSTN managing unit 18 indicates to activate the additional storage generation when the data ingestion rate is greater than a maximum data ingestion threshold level.

When activating the one or more other storage generations, the DSTN managing unit 18 determines a number of storage generations to activate based on one or more of the storage utilization level, the data ingestion rate, and the maximum data ingestion threshold level. For example, the DSTN managing unit 18 determines to activate two or more generations when the data ingestion rate is greater than the maximum data ingestion threshold level. As another example, the DSTN managing unit 18 estimates a number of required generation such that a maximum data ingestion rate threshold level is not compromised for any storage generations.

Having determined the number of storage generations to activate, the DSTN managing unit 18 issues assignment messages to inactive storage generations in accordance with the number of storage generations to activate, where the assignment messages includes one or more of an indication to activate, an assigned DSN address range, and an amount of storage capacity to allocate for storage. For example, the DSTN managing unit 18 issues, via the network 24, assignment messages 2-3 to storage generations 2-3 to initiate activation.

Figure 48B:
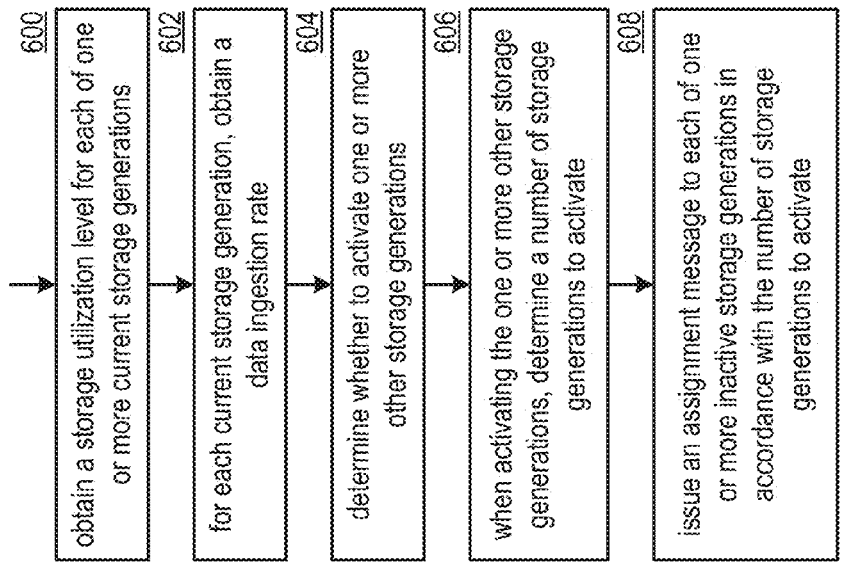
FIG. 48B is a flowchart illustrating an example of activating a storage generation in accordance with the present invention.

FIG. 48B is a flowchart illustrating an example of activating a storage generation. The method begins or continues at step 600 where a processing module (e.g., of a distributed storage and task network (DSTN) managing unit) obtains a storage utilization level for each of one or more current storage generations. The obtaining includes at least one of initiating a query, receiving a query response, performing a lookup, and interpreting system activity logs. For each current storage generation, the method continues at step 602 where the processing module obtains a data ingestion rate. The obtaining includes at least one of initiating a query, receiving a query response, performing a lookup, and interpreting system activity logs.

The method continues at step 604 where the processing module determines whether to activate one or more other storage generations. For example, the processing module indicates to activate when at least one of the storage utilization level is greater than a maximum storage utilization threshold level and when the data ingestion rate is greater than a maximum data ingestion threshold level.

When activating the one or more other storage generations, the method continues at step 606 where the processing module determines a number of storage generations to activate. For example, the processing module estimates a number of required generations such that the data ingestion rate for each of the one or more current storage generations in each of the one or more other storage generations is less than a low data ingestion threshold level.

The method continues at step 608 where the processing module issues and assignment message to each of one or more inactive storage generations in accordance with the number of storage generations to activate. For example, the processing module generates the assignment message to include an assigned DSN address range and amount of storage capacity to allocate, and sends the assignment message to storage units of the one or more other storage generations.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the DSN including a plurality of storage generations, each of the plurality of storage generations utilizing a plurality of storage units, the method comprises:

generating, based on a data object name, a first retrieval request for retrieving metadata addressing information, wherein the first retrieval request is formatted in accordance with a read request format of the DSN;

generating, based on retrieved metadata addressing information, a second retrieval request for retrieving metadata, wherein the second retrieval request is formatted in accordance with the read request format of the DSN; and generating, based on retrieved metadata, a third retrieval request for retrieving at least a portion of a data object associated with the data object name, wherein the third retrieval request is formatted in accordance with the read request format of the DSN, wherein at least two of the metadata addressing information, the metadata, and the data object are stored in differing storage generations of the plurality of storage generations.

2. The method of claim 1, wherein the generating the first retrieval request comprises:

performing a deterministic function on the data object name to produce a digital value;

using a first portion of the digital value as a generation identifier in a generation identifier field of the read request format of the DSN; and using a second portion of the digital value as an object identifier of the read request format of the DSN.

3. The method of claim 2, wherein the generating the first retrieval request comprises:

determining a vault identifier associated with the data object; and using the vault identifier in a vault identifier field of the read request format of the DSN.

4. The method of claim 1 further comprises:

generating, based on the data object name, the first retrieval request by:

generating a set of first level read requests for retrieving at least a decode threshold number of metadata addressing information slices, wherein the metadata addressing information includes addressing information regarding storage of the metadata within the DSN, wherein the metadata addressing information was dispersed storage error encoded to produce a set of metadata addressing information slices, and wherein the decode threshold number of metadata addressing information slices represents a minimum number of metadata addressing information slices of the set of metadata addressing information slices that is required to recover the metadata addressing information; and decoding the at least a decode threshold number of metadata addressing information slices to recover the metadata addressing information.

5. The method of claim 1, wherein the generating the second retrieval request comprises:
generating, based on the metadata addressing information, a set of second level read requests for retrieving at least a decode threshold number of metadata slices, wherein the metadata includes addressing information regarding storage of a plurality of sets of encoded data slices of the data object within the DSN, wherein the metadata was dispersed storage error encoded to produce a set of metadata slices, and wherein the decode threshold number of metadata slices represents a minimum number of metadata slices of the set of metadata slices that is required to recover the metadata.

6. The method of claim 5 further comprises:
decoding the at least a decode threshold number of metadata slices to recover the metadata.

7. The method of claim 1, wherein the generating the second retrieval request comprises:
extracting a generation identifier and an object identifier from the metadata addressing information, the generation identifier indicating one of the plurality of storage generations;
determining a vault identifier associated with the data object;
using the generation identifier in a generation identifier field of the read request format of the DSN;
using the object identifier in an object identifier field of the read request format of the DSN; and
using the vault identifier in a vault identifier field of the read request format of the DSN.

8. The method of claim 1, wherein the generating the third retrieval request comprises:
generating, based on the metadata, at least one set of third level read requests for retrieving at least a decode threshold number of encoded data slices, wherein the data object was dispersed storage error encoded to produce a plurality of sets of encoded data slices, and wherein the decode threshold number of encoded data slices represents a minimum number of encoded data slices of a set of the plurality of sets of encoded data slices that is required to recover the portion of the data object.

9. A non-transitory computer readable storage medium comprises:
at least one memory section that stores operational instructions that, when executed by one or more processing modules of one or more computing devices of a dispersed storage network (DSN), causes the one or more computing devices to:
generate, based on a data object name, a first retrieval request for retrieving metadata addressing information, wherein the first retrieval request is formatted in accordance with a read request format of the DSN;
generate, based on retrieved metadata addressing information, a second retrieval request for retrieving metadata, wherein the second retrieval request is formatted in accordance with the read request format of the DSN; and
generate, based on retrieved metadata, a third retrieval request for retrieving at least a portion of a data object associated with the data object name, wherein the third retrieval request is formatted in accordance with the read request format of the DSN, the DSN including a plurality of storage generations, each of the plurality of storage generations utilizing a plurality of storage units, and further wherein at least two of the metadata addressing information, the metadata, and the data object are stored in differing storage generations of the plurality of storage generations.

10. The non-transitory computer readable storage medium of claim 9, wherein the one or more processing modules functions to execute the operational instructions stored by the at least one memory section to cause the one or more computing devices of the DSN to generate the first retrieval request by:
performing a deterministic function on the data object name to produce a digital value;
using a first portion of the digital value as a generation identifier in a generation identifier field of the read request format of the DSN; and
using a second portion of the digital value as an object identifier of the read request format of the DSN.

11. The non-transitory computer readable storage medium of claim 10, wherein the one or more processing modules functions to execute the operational instructions stored by the at least one memory section to cause the one or more computing devices of the DSN to generate the first retrieval request by:
determining a vault identifier associated with the data object; and
using the vault identifier in a vault identifier field of the read request format of the DSN.

12. The non-transitory computer readable storage medium of claim 9 further comprises:
the at least one memory section stores further operational instructions that, when executed by the one or more processing modules, causes the one or more computing devices of the DSN to:
generate, based on the data object name, the first retrieval request by:
generating a set of first level read requests for retrieving at least a decode threshold number of metadata addressing information slices, wherein the metadata addressing information includes addressing information regarding storage of the metadata within the DSN, wherein the metadata addressing information was dispersed storage error encoded to produce a set of metadata addressing information slices, and wherein the decode threshold number of metadata addressing information slices represents a minimum number of metadata addressing information slices of the set of metadata addressing information slices that is required to recover the metadata addressing information; and
decode the at least a decode threshold number of metadata addressing information slices to recover the metadata addressing information.

13. The non-transitory computer readable storage medium of claim 9, wherein the one or more processing modules functions to execute the operational instructions stored by the at least one memory section to cause the one or more computing devices of the DSN to generate the second retrieval request by:
generating, based on the metadata addressing information, a set of second level read requests for retrieving at least a decode threshold number of metadata slices, wherein the metadata includes addressing information regarding storage of a plurality of sets of encoded data slices of the data object within the DSN, wherein the metadata was dispersed storage error encoded to produce a set of metadata slices, and wherein the decode threshold number of metadata slices represents a minimum number of metadata slices of the set of metadata slices that is required to recover the metadata.

14. The non-transitory computer readable storage medium of claim 13 further comprises:
the at least one memory section stores further operational instructions that, when executed by the one or more processing modules, causes the one or more computing devices of the DSN to:
decode the at least a decode threshold number of metadata slices to recover the metadata.

15. The non-transitory computer readable storage medium of claim 9, wherein the one or more processing modules functions to execute the operational instructions stored by the at least one memory section to cause the one or more computing devices of the DSN to generate the second retrieval request by:
extracting a generation identifier and an object identifier from the metadata addressing information, the generation identifier indicating one of the plurality of storage generations;
determining a vault identifier associated with the data object;
using the generation identifier in a generation identifier field of the read request format of the DSN;
using the object identifier in an object identifier field of the read request format of the DSN; and
using the vault identifier in a vault identifier field of the read request format of the DSN.

16. The non-transitory computer readable storage medium of claim 9, wherein the one or more processing modules functions to execute the operational instructions stored by the at least one memory section to cause the one or more computing devices of the DSN to generate the third retrieval request by:
generating, based on the metadata, at least one set of third level read requests for retrieving at least a decode threshold number of encoded data slices, wherein the data object was dispersed storage error encoded to produce a plurality of sets of encoded data slices, and wherein the decode threshold number of encoded data slices represents a minimum number of encoded data slices of a set of the plurality of sets of encoded data slices that is required to recover the portion of the data object.

17. A computing device of a group of computing devices of a dispersed storage network (DSN), the DSN including a plurality of storage generations, each of the plurality of storage generations utilizing a plurality of storage units, the computing device comprises:
an interface;
a local memory; and
a processing module operably coupled to the interface and the local memory, wherein the processing module functions to:
generate, based on a data object name, a first retrieval request for retrieving metadata addressing information, wherein the first retrieval request is formatted in accordance with a read request format of the DSN;
generate, based on retrieved metadata addressing information, a second retrieval request for retrieving metadata, wherein the second retrieval request is formatted in accordance with the read request format of the DSN; and
generate, based on retrieved metadata, a third retrieval request for retrieving at least a portion of a data object associated with the data object name, wherein the third retrieval request is formatted in accordance with the read request format of the DSN, wherein at least two of the metadata addressing information, the metadata, and the data object are stored in differing storage generations of the plurality of storage generations.

18. The computing device of claim 17, wherein the processing module functions to generate the first retrieval request by:
performing a deterministic function on the data object name to produce a digital value;
using a first portion of the digital value as a generation identifier in a generation identifier field of the read request format of the DSN, the generation identifier indicating one of the plurality of storage generations; and
using a second portion of the digital value as an object identifier of the read request format of the DSN.

19. The computing device of claim 18, wherein the processing module functions to generate the first retrieval request by:
determining a vault identifier associated with the data object; and
using the vault identifier in a vault identifier field of the read request format of the DSN.

20. The computing device of claim 17, wherein the processing module further functions to:
generate, based on the data object name, the first retrieval request by:
generating a set of first level read requests for retrieving at least a decode threshold number of metadata addressing information slices, wherein the metadata addressing information includes addressing information regarding storage of the metadata within the DSN, wherein the metadata addressing information was dispersed storage error encoded to produce a set of metadata addressing information slices, and wherein the decode threshold number of metadata addressing information slices represents a minimum number of metadata addressing information slices of the set of metadata addressing information slices that is required to recover the metadata addressing information; and
decode the at least a decode threshold number of metadata addressing information slices to recover the metadata addressing information.

21. The computing device of claim 17, wherein the processing module functions to generate the second retrieval request by:
generating, based on the metadata addressing information, a set of second level read requests for retrieving at least a decode threshold number of metadata slices, wherein the metadata includes addressing information regarding storage of a plurality of sets of encoded data slices of the data object within the DSN, wherein the metadata was dispersed storage error encoded to produce a set of metadata slices, and wherein the decode threshold number of metadata slices represents a minimum number of metadata slices of the set of metadata slices that is required to recover the metadata.

22. The computing device of claim 21, wherein the processing module further functions to:
decode the at least a decode threshold number of metadata slices to recover the metadata.

23. The computing device of claim 17, wherein the processing module functions to generate the second retrieval request by:

extracting a generation identifier and an object identifier from the metadata addressing information, the generation identifier indicating one of the plurality of storage generations;

determining a vault identifier associated with the data object;

using the generation identifier in a generation identifier field of the read request format of the DSN;

using the object identifier in an object identifier field of the read request format of the DSN; and using the vault identifier in a vault identifier field of the read request format of the DSN.

24. The computing device of claim 17, wherein the processing module functions to generate the third retrieval request by:

generating, based on the metadata, at least one set of third level read requests for retrieving at least a decode threshold number of encoded data slices, wherein the data object was dispersed storage error encoded to produce a plurality of sets of encoded data slices, and wherein the decode threshold number of encoded data slices represents a minimum number of encoded data slices of a set of the plurality of sets of encoded data slices that is required to recover the portion of the data object.

* * * * *